United States Patent
McNamee et al.

(10) Patent No.: US 9,306,891 B2
(45) Date of Patent: *Apr. 5, 2016

(54) METHODS, SYSTEMS AND DEVICES FOR DYNAMICALLY MODIFYING ROUTED MESSAGES

(71) Applicant: OPENET TELECOM LTD., Dublin (IE)

(72) Inventors: Alan McNamee, Drumcondra (IE); Cameron Ross Dunne, Kildare (IE); Fergus McCann, Dublin (IE); Michael O'Sullivan, Dublin (IE); Niall Byrne, Dublin (IE); Joe Hogan, Malahide (IE)

(73) Assignee: OPENET TELECOM LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,249

(22) Filed: Dec. 12, 2014

(65) Prior Publication Data

US 2015/0100640 A1    Apr. 9, 2015

Related U.S. Application Data

(63) Continuation of application No. 13/309,221, filed on Dec. 1, 2011, now Pat. No. 8,943,221.

(60) Provisional application No. 61/423,986, filed on Dec. 16, 2010, provisional application No. 61/494,300, filed on Jun. 7, 2011.

(51) Int. Cl.
*G06F 15/173* (2006.01)
*H04L 12/58* (2006.01)
(Continued)

(52) U.S. Cl.
CPC ............. *H04L 51/18* (2013.01); *H04L 45/42* (2013.01); *H04M 15/66* (2013.01); *H04L 45/306* (2013.01); *H04L 67/1014* (2013.01)

(58) Field of Classification Search
None
See application file for complete search history.

(56) References Cited

U.S. PATENT DOCUMENTS 6,427,173 B1   7/2002   Boucher et al.
6,862,281 B1   3/2005   Chandrasekaran
(Continued)

FOREIGN PATENT DOCUMENTS

EP   2 066 080 A1   3/2009
EP   2 242 205 A1   10/2010
(Continued)

OTHER PUBLICATIONS

P. Calhoun et al., Diameter Base Protocol, Network Working Group, Request for Comments: 3588, Category: Standards Track, Sep. 1, 2003.
(Continued)

*Primary Examiner* — Brendan Higa
*Assistant Examiner* — Padma Mundur
(74) *Attorney, Agent, or Firm* — The Marbury Law Group, PLLC

(57) ABSTRACT

Methods, servers and systems for communicating signaling information in a telecommunications signaling network implement methods that include receiving a first message encoding signaling information from a source component and processing the message using a fixed pipeline having a plurality of modules, each module having at least one procedure for performing a specific set of tasks. Application level routing operations may be performed to identify a suitable destination component. Information contained in the first message may be used to generate a second message encoding signaling information, which is sent to the identified destination component.

15 Claims, 28 Drawing Sheets

(51) Int. Cl.
*H04L 12/717* (2013.01)
*H04M 15/00* (2006.01)
*H04L 12/725* (2013.01)
*H04L 29/08* (2006.01)

(56) References Cited

U.S. PATENT DOCUMENTS

| | | |
|---|---|---|
| 7,107,334 B1 | 9/2006 | Shaffer et al. |
| 2002/0150094 A1 | 10/2002 | Cheng et al. |
| 2003/0065812 A1 | 4/2003 | Beier et al. |
| 2003/0195919 A1 | 10/2003 | Watanuki et al. |
| 2006/0047836 A1 | 3/2006 | Rao et al. |
| 2006/0085549 A1 | 4/2006 | Hasti et al. |
| 2006/0165053 A1 | 7/2006 | Bhatnagar et al. |
| 2006/0271813 A1 | 11/2006 | Horton et al. |
| 2007/0143442 A1 | 6/2007 | Zhang et al. |
| 2007/0153995 A1 | 7/2007 | Fang et al. |
| 2008/0046573 A1 | 2/2008 | Ropolyi et al. |
| 2008/0183991 A1 | 7/2008 | Cosmadopoulos et al. |
| 2008/0212602 A1 | 9/2008 | Hobbs et al. |
| 2009/0049201 A1 | 2/2009 | Albert et al. |

FOREIGN PATENT DOCUMENTS

| | | |
|---|---|---|
| EP | 2 262 199 A1 | 12/2010 |
| EP | 2 346 210 A1 | 7/2011 |
| WO | 2008/038862 A1 | 4/2008 |
| WO | 2009/129840 A1 | 10/2009 |
| WO | 2010/141727 A1 | 12/2010 |

OTHER PUBLICATIONS

P. Eronen Ed. et al., Diameter Extensible Authentication Protocol (EAP) Application, Network Working Group, Request for Comments: 4072, Category: Standards Track, Aug. 31, 2005.

J. Wood et al., A Web Services Architecture for Visualization, Fourth IEEE International Conference on eScience, IEEE Computer Society, Dec. 7, 2008.

J. Korhonen Ed. et al., Clarifications on the Routing of Diameter Requests Based on the Username and the Realm, Network Working Group, Request for Comments: 5729, Updates: 3588 Category: Standards Track, Dec. 31, 2009.

http://www.3gpp.org, 3rd Generation Partnership Project; Technical Specification Group Services and System Aspects; Policy and Charging control architecture (Release 108), 3GPP TS 23.203 V10.1.0, Sep. 29, 2010. Valbonne, France.

http://www.3gpp.org, 3rd Generation Partnership Project; Technical Specification Group Core Network and Terminals; Policy and Charging Control signalling flows and Quality of Service (QoS) parameter mapping (Release 8), 3GPP TS 29.213 V8.9.1, Oct. 4, 2010. Valbonne, France.

V. Fajardo, Ed. Et al., Diameter Base Protocol draft-ietf-dime-rfc3588bis-33.txt, Network Working Group, Internet-Draft, Obsoletes: 3588 5719 (if approved), Intended status: Standards Track, May 7, 2012. (Expires: Nov. 8, 2012).

European Search Report dated Mar. 26, 2012, issued in EP Application No. 11193496, mailed on Apr. 2, 2012.

European Search Report dated Mar. 20, 2012, issued in EP Application No. 11193537, mailed on Apr. 2, 2012.

European Search Report dated Mar. 8, 2012, issued in EP Application No. 11193476, mailed on Apr. 2, 2012.

European Search Report dated Mar. 12, 2012, issued in EP Application No. 11193460, mailed on Apr. 11, 2012.

European Search Report dated Mar. 14, 2012, issued in EP Application No. 11193499, mailed on Apr. 11, 2012.

European Search Report dated May 25, 2012, issued in EP Application No. 11193561, mailed on Jun. 4, 2012.

European Applicaton No. 11193476.6; Office Action issued on Jul. 22, 2013 by the European Patent Office.

Examination Report received from the European Patent Office on Jul. 23, 2013 in related European Application 11193537.

Examination Report received from the European Patent Office on Jul. 24, 2013 in related European Application 11196460.

Policy and Charging Control (PCC) Architecture

Communication Interfaces/Protocols

PCC Architecture -- DCR

METHODS, SYSTEMS AND DEVICES FOR DYNAMICALLY MODIFYING ROUTED MESSAGES

RELATED APPLICATIONS

This application is a continuation of U.S. application Ser. No. 13/309,221, titled "Methods, Systems and Devices for Pipeline Processing" filed on Dec. 1, 2011, which claims the benefit of priority to U.S. Provisional Application No. 61/423,986, titled "Dynamic Connector Router" filed Dec. 16, 2010 and U.S. Provisional Application No. 61/494,300, titled "Methods, Systems and Devices for Dynamic Context-Based Routing" filed Jun. 7, 2011, the entire contents of all of which are hereby incorporated by reference for all purposes.

BACKGROUND

Wireless and cellular communication technologies have seen dramatic improvements over the past few years. Cellular service providers now offer users a wide array of services, higher usage limits and attractive subscription plans. Wireless dongles and embedded wireless modem cards allow users to use tablet computers, netbooks and laptops to access wireless Internet protocol (IP) and data services through the cellular networks. Internet-enabled smart phones, tablets and gaming consoles have become essential personal accessories, connecting users to friends, work, leisure activities and entertainment. Users now have more choices and expect to have access to content, data and communications at any time, in any place. As more users utilize these services, telecommunication system operator networks must expand to meet the increase in user demand, support the array of new services and provide fast, reliable communications. This expansion has greatly increased the complexity of wireless and cellular networks, and the efficient routing and management of signalling traffic is becoming an ever more challenging task.

SUMMARY

The various embodiments provide methods, devices and systems for enabling communications between multiple instances of components in a telecommunications network. The various embodiments provide protocol agnostic interfaces that allow communications between source and destination nodes in a telecommunication system operator network. Routing and load-balancing decisions may be made dynamically based on a context and content of the information being communicated. Messages being communicated may be opened and the information contained therein used to make intelligent connection management and control/rules routing decisions. Calls may be made to external systems requesting additional information for a specific message being communicated. Information from external systems may be used to modify the contents of the information being communicated or to aid in routing and/or load balancing operations within the operator's network. Information specific to a particular network node, protocol, application, message or message type may be stored in an internal memory and referenced for future routing and/or load balancing operations. Routing and load balancing algorithms may be updated as internal/external data changes.

The various embodiments include methods of communicating signaling information in a telecommunications signaling network that may include receiving, in a first processor, a first message encoding signaling information from a source component, decoding the received first message into an internal representation of the message, processing the internal representation of the message via a pipeline having a plurality of stages, in which each stage may contain one or more procedures for performing a specific set of tasks, performing application level routing operations using contextual information derived from the internal representation to identify a destination component, encoding the signaling information contained in the internal representation into a second message, and sending the second message encoding the signaling information to the identified destination component. In an embodiment, performing application level routing operations using contextual information derived from the internal representation to identify a destination component includes using at least one pipeline stage to make a routing decision using a discrete number of configurable procedures. In a further embodiment, the pipeline type is one of a request handler pipeline, a response handler pipeline, a failover handler pipeline, or a redirect handler pipeline. In a further embodiment, the pipeline type and instance is selected on a per message type or on a per application basis. In a further embodiment, the pipeline may have a plurality of stages that include at least one stage from the group consisting of a realm routing lookup stage, a session lookup stage, a gather data stage, a routing core stage, a prepare AVS stage, a filter stage, a dispatcher stage, a session update stage, and a redirect stage.

Further embodiments include a server configured with server-executable instructions to perform operations that may include receiving a first message encoding signaling information from a source component, decoding the received first message into an internal representation of the message, processing the internal representation of the message via a pipeline having a plurality of stages, in which each stage may contain one or more procedures for performing a specific set of tasks, performing application level routing operations using contextual information derived from the internal representation to identify a destination component, encoding the signaling information contained in the internal representation into a second message, and sending the second message encoding the signaling information to the identified destination component. In an embodiment, the processor may be configured with processor-executable instructions to perform operations such that performing application level routing operations using contextual information derived from the internal representation to identify a destination component includes using at least one pipeline stage to make a routing decision using a discrete number of configurable procedures. In a further embodiment, the processor may be configured with processor-executable instructions to perform operations such that the pipeline type is one of a request handler pipeline, a response handler pipeline, a failover handler pipeline, or a redirect handler pipeline. In a further embodiment, the processor may be configured with processor-executable instructions to perform operations such that the pipeline type and instance is selected on a per message type or on a per application basis. In a further embodiment, the pipeline may feature a plurality of stages that include at least one stage from the group consisting of a realm routing lookup stage, a session lookup stage, a gather data stage, a routing core stage, a prepare AVS stage, a filter stage, a dispatcher stage, a session update stage, and a redirect stage.

Further embodiments include a non-transitory server-readable storage medium having stored thereon server-executable instructions configured to cause a server to perform operations that may include receiving a first message encoding signaling information from a source component, decoding the received first message into an internal representation of the message, processing the internal representation of the message via a pipeline having a plurality of stages, in which each stage may contain one or more procedures for performing a specific set of tasks, performing application level routing operations using contextual information derived from the internal representation to identify a destination component, encoding the signaling information contained in the internal representation into a second message, and sending the second message encoding the signaling information to the identified destination component. In an embodiment, the stored server-executable instructions may be configured to cause a server to perform operations such that performing application level routing operations using contextual information derived from the internal representation to identify a destination component includes using at least one pipeline stage to make a routing decision using a discrete number of configurable procedures. In a further embodiment, the stored server-executable instructions may be configured to cause a server to perform operations such that the pipeline type is one of a request handler pipeline, a response handler pipeline, a failover handler pipeline, or a redirect handler pipeline. In a further embodiment, the stored server-executable instructions may be configured to cause a server to perform operations such that the pipeline type and instance is selected on a per message type or on a per application basis. In a further embodiment, the stored server-executable instructions may be configured to cause a server to perform operations such that the pipeline has a plurality of stages that include at least one stage from the group consisting of a realm routing lookup stage, a session lookup stage, a gather data stage, a routing core stage, a prepare AVS stage, a filter stage, a dispatcher stage, a session update stage, and a redirect stage.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
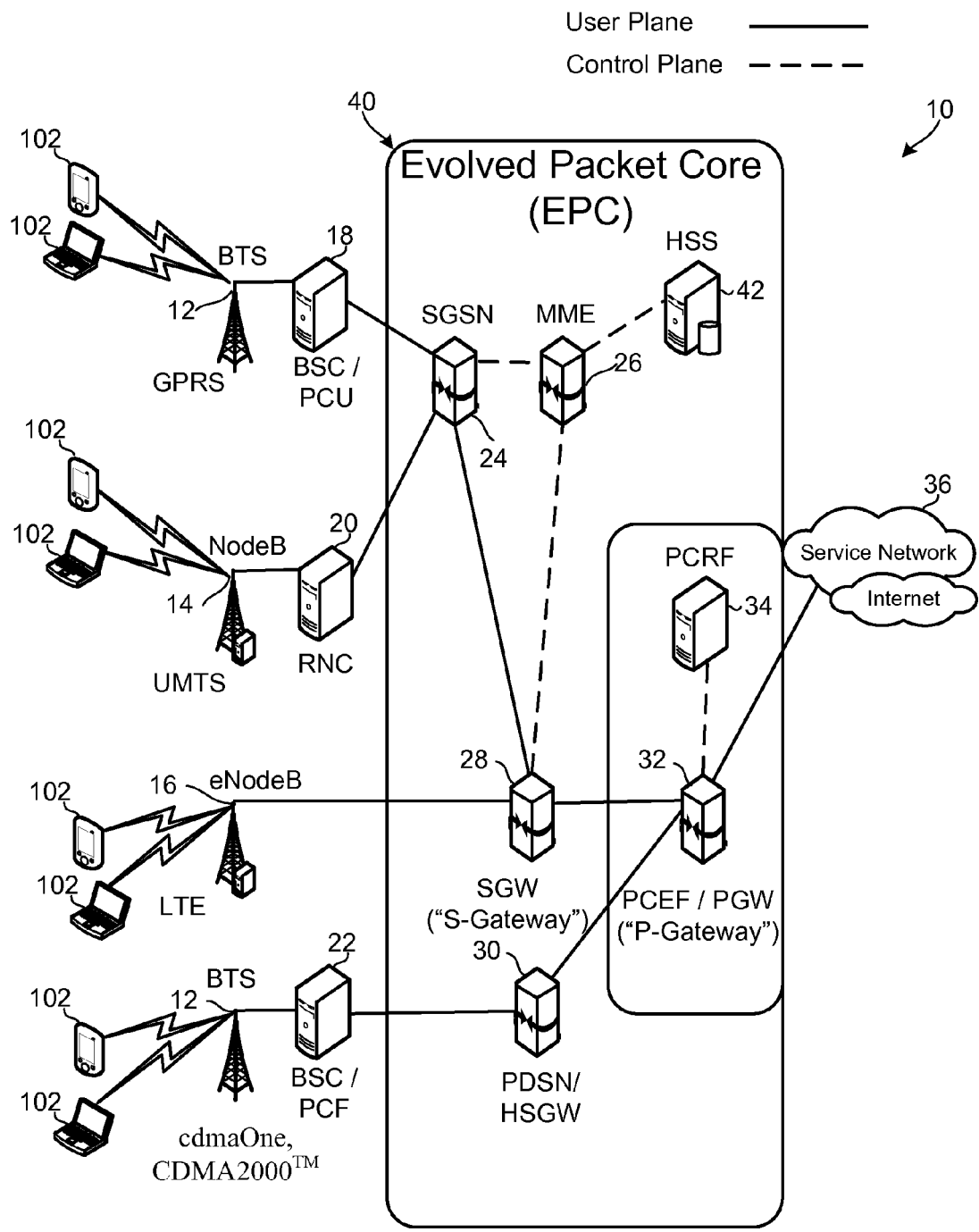
FIG. 1 is a communication system block diagram illustrating network components of a communication system having an evolved packet core (EPC) architecture suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "wireless device" and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wireline devices, devices implementing Machine-to-Machine (M2M) technologies, multimedia/Internet enabled cellular telephones, and similar electronic devices capable of sending and receiving wireless communication signals. A wireless device may include a programmable processor and memory. In a preferred embodiment, the wireless device is a cellular handheld device (e.g., a mobile device), which can communicate via a cellular telephone communications network.

The phrases "Diameter reference points," "Diameter applications," and "Diameter interfaces" may be used interchangeably and refer to specific implementations of the Diameter protocol. However, when possible, the phrase "Diameter application" is used to describe an extension of the Diameter base protocol (which is built on top of the Diameter base protocol) and the phrase "Diameter reference point" is used to describe an interface between network components that employ the Diameter protocol to realize communications (i.e., network components realize communications over a reference point). Diameter applications may use the same name as Diameter reference points (e.g., Gx reference point and Gx Diameter application), the distinction being that at each end of the reference point there may be a client node and a server node.

As used herein, the word "domain" refers to a logical entity configured entirely within the DCR system that can be used to represent any routing destination based on a scenario. It should be understood that the domains discussed herein differ from, and provide functionality over and above those provided by, the domain-like concepts present in the Diameter protocol standard. Examples include the "Destination-Realm" and "Destination-Host" attribute-value-pairs (AVPs).

The term "attribute value stream" and its acronym "AVS" are used herein to refer to a message structure that stores information corresponding to information carried by a telecommunications network message (e.g., a Diameter message). Each AVS may include one or more structured fields (e.g., a session identification field, a policy and charging rules function identification field, a domain field, an origin-host field, a subscriber identification field, an address field, etc.), and may be used by a dynamic context router (DCR) system as internal representation of a telecommunications network message (e.g., a Diameter message).

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

The various embodiments provide methods, devices and systems for managing communications in a network. The various embodiments provide a dynamic context router (DCR) that operates as a flexible, protocol agnostic, application-level router and load balancer. The dynamic context router may perform message routing, relay, and redirect operations. The dynamic context router may identify communication partners and/or determine resource availability. The dynamic context router may make routing and load-balancing decisions dynamically based on the context and content of the information being communicated. The dynamic context router may look inside the messages being communicated and make intelligent decisions based on the content of the messages. The dynamic context router may make calls to external systems requesting additional information for a specific message being communicated. The dynamic context router may request information from external systems and use the information to modify the contents of the information being communicated or to aid in the routing and/or load balancing operations. The dynamic context router may store information specific to a particular network node, protocol, application, message or message type in an internal memory and reference the internal memories when processing future communications related to that node, protocol, application, message or message type. The dynamic context router may update its routing and load balancing algorithms as internal/external data changes.

In an embodiment, the dynamic context router may provide pipelining, topology hunting, and/or message forking operations.

In an embodiment, the dynamic context router may access subscriber information stored in subscriber profile repositories (SPRs) and use the subscriber information to aid its routing and load balancing operations. In an embodiment, the dynamic context router may modify the contents of the messages being communicated with subscriber information retrieved from a subscriber profile repository. In an embodiment, the dynamic context router may access online charging systems (OCSs) or off-line changing systems (OFCSs), and use charging and/or billing information from those systems to aid its routing and load balancing operations and/or to modify the contents of the messages being communicated. In an embodiment, the dynamic context router may access additional business support systems (BSS)/operations support systems (OSS) to aid its routing and load balancing operations and/or to modify the contents of the messages being communicated.

In an embodiment, the dynamic context router (DCR) may generate, procure and/or use a topology tree, referred to herein as a "DCR topology tree." The DCR topology tree may be used to efficiently identify and locate nodes in the network. In an embodiment, the dynamic context router may use the DCR topology tree to perform routing and load balancing operations by hierarchy.

In an embodiment, the dynamic context router may perform message destination hunting operations to identify a correct instance of a destination node that cannot otherwise be ascertained from information included within the message or otherwise available. In an embodiment, the dynamic context router may use the DCR topology tree to performing hunting operations by hierarchy.

In an embodiment, the dynamic context router may communicate with a dictionary to receive decoding rules that can be used for decoding message types with which the dynamic context router is unfamiliar. In an aspect, the dictionaries may be implemented as databases, and the dictionary databases may be internal to the dynamic context router or external to the dynamic context router (e.g., may exist on dictionary servers). In an embodiment, the external dictionaries may be hosted "in the cloud" as part of a cloud computing implementation. In an embodiment, external dictionary servers may be used to centralize the configuration of the protocol capabilities. In an embodiment, the dynamic context router may access partial dictionaries to receive only the minimum amount of a rule or rules required to successfully decode messages, reducing latency and improving processing speeds.

In an embodiment, the dynamic context router may decode messages in multiple phases. For example, the dynamic context router may decode only a small portion of a message in a first phase and, if necessary, perform more extensive decoding operations in a second phase. In an embodiment, the need for the second phase of decoding may be determined based on the first phase decoding results and/or any combination of contextual and static information.

In an embodiment, the dynamic context router may incrementally decode messages. In this embodiment, incremental decoding may begin with decoding an initial portion of the message, and determining if the decoded portion identifies a destination component or if the destination component can be derived from the decoded portion. When it is determined that the previously decoded portions do not identify the destination component and/or that the destination component cannot be derived using the previously decoded portions, the dynamic context router may then recursively decode subsequent portions of the message. The need for the continued decoding of additional portions of the message may be based on whether or not information extracted from the decoded portions may be used by the dynamic context router to identify a destination component.

In an embodiment, the dynamic context router may perform opaque proxy operations. In this embodiment, if the dynamic context router receives a message that is either partially syntactically or semantically invalid (and thus "opaque"), instead of sending an error message, the dynamic context router may decode only a portion of the message, leaving the rest of the message in the original format (e.g., binary wire format), package the message into a network transparent container, and send the container including the message to the destination node. In this manner, the dynamic context router may operate in a loose, tolerant mode that improves processing speeds, while supporting network nodes that do not fully comply with a particular standard.

In an embodiment, the dynamic context router may perform protocol translation operations. In an embodiment, the dynamic context router may include a flexible protocol translator module which converts received messages from a first protocol into a second protocol. In various embodiments, the first protocol may be the same as the second protocol, a subset of the second protocol, a superset of the second protocol, compatible with the second protocol, or completely independent of the second protocol.

In an embodiment, the dynamic context router may perform protocol translation operations even when the first and second protocols are the same.

Often, network nodes vary in their implementation of the same set of standards. This often occurs when the nodes are manufactured by different vendors or are operating different versions of software. For example, a vendor's implementation of a standard may not fully comply with the standards, the standards may have changed since the nodes were deployed, or there may be differences in implementations due to non-standard extensions. In such cases, messages originating from a source node may not be accepted by a destination node, even though the source node and the destination node implement the same protocol. In such cases, the dynamic context router may identify the differences in the implementations and change the structure and/or the content of the messages to ensure that the messages will be accepted by the destination node. This embodiment improves network efficiency by providing a protocol agnostic interface between source and destination nodes in a network. Source nodes may communicate with the dynamic context router using any protocol supported by the dynamic context router, and do not need to be informed of the protocols supported by the destination nodes. New instances of any destination node may be added to the network without informing the source nodes of the existence of the new destination node or of the protocols associated with the new node. Likewise, new instances of the source nodes may be added to the network without requiring the new source nodes to be informed of the other nodes in the network, their protocols, or the other intimate details of the network.

In an embodiment, the dynamic context router may perform protocol translation operations when the first protocol is completely independent of the second protocol. For example, the dynamic context router may receive hypertext transfer protocol (HTTP) messages and convert the messages into Diameter messages.

The dynamic context router may provide a protocol agnostic interface between source and destination nodes in a network which may serve to provide topology hiding and allow inter-protocol communication within a network. In an embodiment, the dynamic context router may operate as both a server and a client to further facilitate topology hiding. As mentioned above, the dynamic context router may receive messages from source nodes in a first protocol and send messages to a destination node in a second protocol. In an embodiment, the dynamic context router may remove all network specific information for each of the messages that it relays such that the source and destination nodes cannot determine the network topology through which the messages where routed. In an embodiment, the dynamic context router may perform physical topology hiding operations by removing all addressing information that may identify the location of the source nodes to the destination nodes, and the destination nodes to the source nodes.

The various embodiments provide scalable, distributed, highly available dynamic context router (DCR) systems capable of fast and efficient expansion. As discussed above, operator networks are expanding at an unprecedented rate. As these operator networks expand, so will the amount of signaling traffic that must be processed by each dynamic context router. To support this anticipated increase in workload, the various embodiments provide highly-available, highly-scalable dynamic context router systems that can support the addition of resources (e.g., additional cores, memories, servers, etc.), while maintaining high-availability.

The various embodiments provide dynamic context router systems configured to manage component failures. The dynamic context router may manage component failures by performing failover operations that automatically switch over to a redundant component (e.g., blade, server, DCR core, memory, network node, etc.) upon the failure or abnormal termination of a component. As new resources are introduced into the network and the dynamic context router systems, the probability of one or more components (e.g., server, processor, hard drive, DCR core, memory, etc.) failing increases. Various embodiments provide dynamic context router systems configured to perform multi-level and multi-tier failover operations that ensure continued dynamic context router operations in the event of multiple component failures. In an embodiment, the dynamic context router system may be deployed in redundant pairs configured in a distributed array architecture with work load balancing schemes which, in combination, ensure continued dynamic context router operations in the event of failures.

As mentioned above, for reasons of availability and scalability it is common for multiple instances of particular network elements to be deployed within the same operator network. The deployment of multiple instances of the same component within a single network gives rise to both functionality and configuration overhead. Further, in cases where peer relationships traverse administrative boundaries, the network topology may be exposed across that boundary. Telecommunication system operator networks are particularly exposed in this regard, especially with the emergence of inter-operator Diameter applications, such as S9 and S6a. To meet these and other concerns, the various embodiments provide an extensive and flexible routing logic engine that may be configured to act as a network edge termination point or landing zone for roaming partners wishing to participate in these types of (e.g., Diameter) relationships.

In an embodiment, the dynamic context router (DCR) may perform application-level topology hiding operations. Certain protocols (e.g., Diameter) have application-level addresses. For example, each Diameter message includes a Diameter address (e.g., Origin-Host address) built into the structure of the messages that cannot be removed. In various embodiments, the dynamic context router may receive messages from source nodes, decode the message contents and store them in a memory, terminate the message, and create a new message that includes all of the stored contents, but not the address information of the source node.

In an embodiment, the dynamic context router may operate as a software appliance (i.e., may run on commodity hardware) that is capable of routing and load balancing network traffic using both static and context based routing rules.

The various embodiments may be implemented within a variety of communication systems, an example of which is illustrated in FIG. 1. Wireless devices 102 may be configured to send and receive voice, data and control signals to and from a service network 36 (and ultimately the Internet) using a variety of communication systems/technologies (e.g., GPRS, UMTS, LTE, cdmaOne, CDMA2000™). For example, general packet radio service (GPRS) data transmitted from a wireless device 102 is received by a base transceiver station (BTS) 12 and sent to a base station controller (BSC) and/or packet control unit (PCU) component (BSC/PCU) 18. Code division multiple access (CDMA) data transmitted from a wireless device 102 is received by a base transceiver station 12 and sent to a base station controller (BSC) and/or point coordination function (PCF) component (BSC/PCF) 22. Universal mobile telecommunications system (UMTS) data transmitted from a wireless device 102 is received by a NodeB 14 and sent to a radio network controller (RNC) 20. Long term evolution (LTE) data transmitted from a wireless device 102 is received by an eNodeB 16 and sent directly to a serving gateway (SGW) 28 located within the EPC 40.

The BSC/PCU 18, RNC 20 and BSC/PCF 22 components process the GPRS, UMTS and CDMS data, respectively, and send the processed data to a node within the EPC 40. More specifically, the BSC/PCU 18 and RNC 20 units send the processed data to a serving GPRS support node (SGSN) 24 and the BSC/PCF 22 sends the processed data to a packet data serving node (PDSN) and/or high rate packet data serving gateway (HSGW) component (PDSN/HSGW) 30. The PDSN/HSGW 30 may act as a connection point between the radio access network and the IP based PCEF/PGW 32. The SGSN 24 is responsible for routing the data within a particular geographical service area and may send signaling (control plane) information (e.g., information pertaining to call setup, security, authentication, etc.) to a mobility management entity (MME) 26. The MME may request user and subscription information from a home subscriber server (HSS) 42, perform various administrative tasks (e.g., user authentication, enforcement of roaming restrictions, etc.), select a SGW 28, and send administrative and/or authorization information to the SGSN 24.

Upon receiving the authorization information from the MME 26 (e.g., an authentication complete indication, an identifier of a selected SGW, etc.), the SGSN 24 sends the GPRS/UMTS data to a selected SGW 28. The SGW 28 stores information about the data (e.g., parameters of the IP bearer service, network internal routing information, etc.) and forwards user data packets to a policy control enforcement function (PCEF) and/or packet data network gateway (PGW) 32. The PCEF/PGW 32 sends signaling information (control plane) to a policy control rules function (PCRF) 34. The PCRF 34 accesses subscriber databases, creates a set of policy rules and performs other specialized functions (e.g., interacts with online/offline charging systems, application functions, etc.) and sends the intelligent policy rules to the PCEF/PGW 32 for enforcement. The PCEF/PGW 32 implements the policy rules to control the bandwidth, the quality of service (QoS), and the characteristics of the data, and services being communicated between the service network 36 and the end users.

Figure 2:
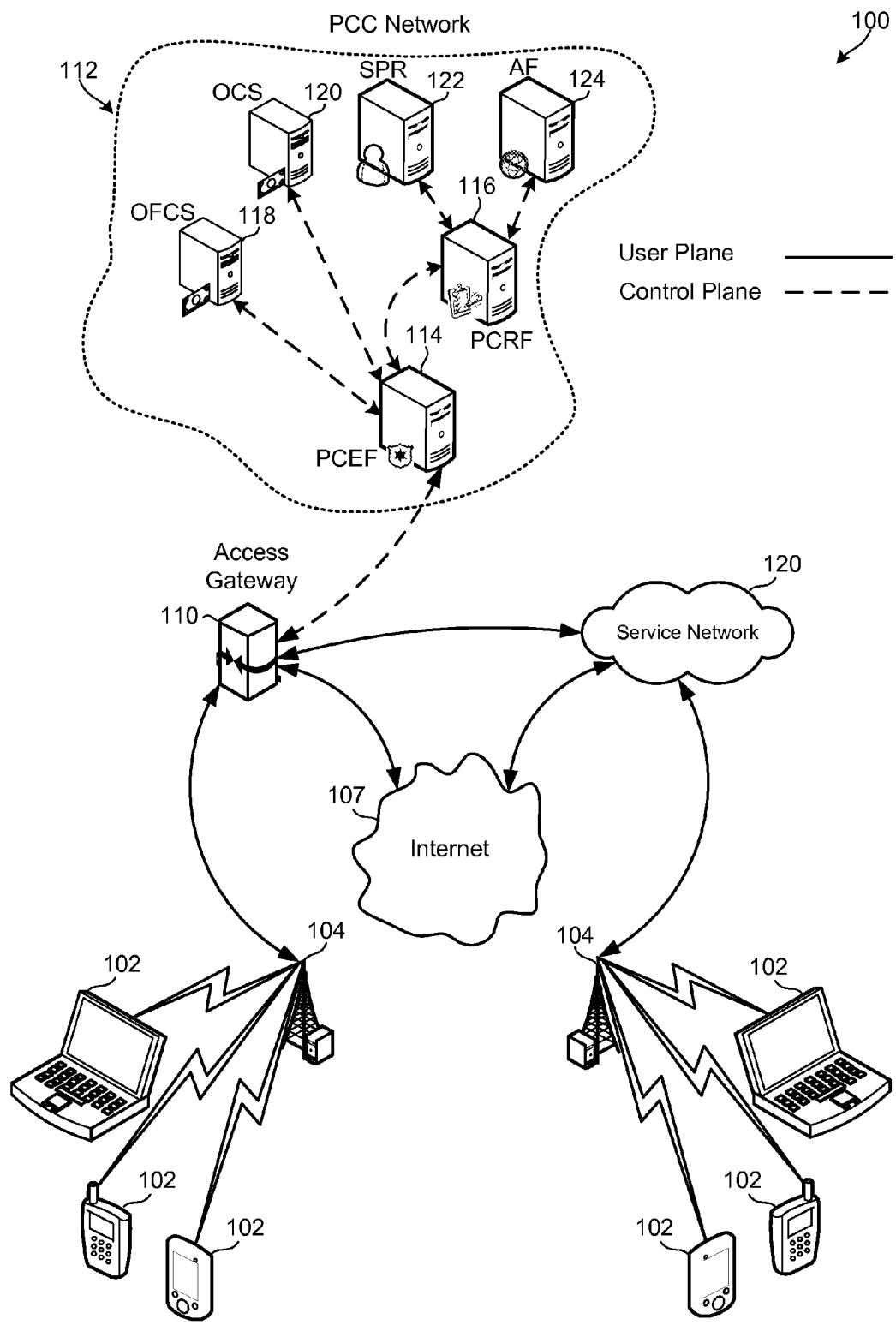
FIG. 2 is a communication system block diagram illustrating network components of an example communication-system having a policy and charging control (PCC) network in accordance with the various embodiments.

FIG. 2 illustrates various logical components in an example communication system 100 suitable for implementing the various embodiments. Wireless devices 102 may be configured to communicate via a cellular telephone network, a radio access network (e.g., UTRAN, RAN, etc.), WiFi network, WiMAX network, and/or other well known technologies (e.g., GPRS, UMTS, LTE, cdmaOne, CDMA2000™). FIG. 2 illustrates that wireless devices 102 may be configured to transmit and receive voice, data, and control signals to and from a base station (e.g., base transceiver station, NodeB, eNodeB, etc.) 104. The base station may be coupled to a controller (e.g., cellular base station, radio network controller, service gateway, etc.) operable to communicate the voice, data, and control signals between mobile devices and to other network destinations. In the illustrated example of FIG. 2, the base station 104 communicates with an access gateway 110, which serves as the primary point of entry and exit of wireless device traffic and connects the wireless devices 102 to their immediate service provider and/or packet data networks (PDNs). The access gateway 110 may include one or more of a controller, a gateway, a serving gateway (SGW), a packet data network gateway (PGW), an evolved packet data gateway (ePDG), a packet data serving node (PDSN), a serving general packet radio service support node (SGSN), or any combination of the features/functions provided thereof. Since these structures are well known, certain details have been omitted in order to focus the descriptions on the most relevant features.

The access gateway 110 forwards the voice, data, and control signals to other network components as user data packets, provides connectivity to external packet data networks, manages and stores contexts (e.g. network internal routing information, etc.), and acts as an anchor between different technologies (e.g., 3GPP and non-3GPP systems). The access gateway 110 may coordinate the transmission and reception of data to and from the Internet 107, as well as the transmission and reception of voice, data and control information to and from an external service network 120 connected to the Internet 107, to other base stations 104 and to wireless devices 102. The access gateway 110 may also route control information to a policy and charging control (PCC) network 112, which may be a part of an implementation of an evolved packet core (EPC)/long term evolution (LTE) architecture. In the various embodiments, the access gateway 110 may be a part of the policy and charging control network 112, and the functions described may be implemented in a single computing device or in many computing devices coupled in a local area network or wide area network using any of the above mentioned telecommunication technologies (e.g., 3G, 4G, GPRS, UMTS, LTE, etc.).

Returning to FIG. 2, as mentioned above, the access gateway 110 routes control/signaling information (e.g., call setup, security, authentication, charging, enforcement of policy rules, etc.) to the policy and charging control (PCC) network 112, which is an example of a telecommunications signaling network. The PCC network 112 provides policy and service control rules, controls charging functionalities, and provides quality of service (QoS) authorizations, as discussed in further detail below. The PCC network 112 may include one or more components for a policy and charging enforcement function (PCEF) 114, a policy charging rules function (PCRF) 116, an off-line charging system (OFCS) 118, an on-line charging system (OCS) 120, a subscriber profile repository (SPR) 122, and an application function (AF) 124. Components in the PCC network 112 (e.g., PCEF, PCRF, OFCS, OCS, SPR, AF) may communicate using a standardized protocol, such as the Diameter protocol, remote authentication dial in user service (RADIUS) protocol, session initiation protocol (SIP), or any other protocol.

To focus the discussion on the relevant features and functionalities, the various embodiments are described with reference to the Diameter protocol. However, it is to be understood that the various embodiments are protocol agnostic and should not be limited to the Diameter protocol unless expressly recited in the claims.

Figure 3:
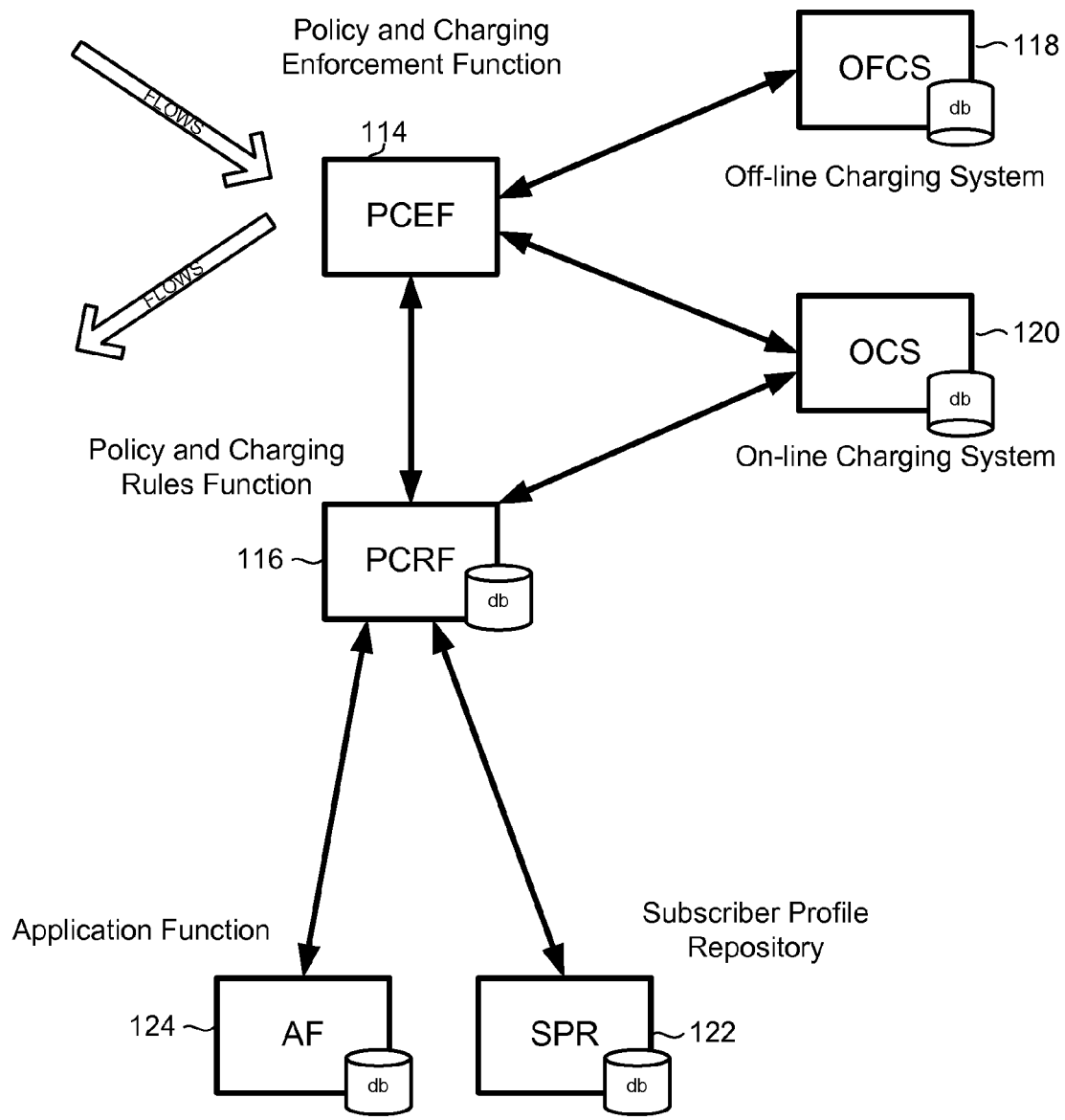
FIG. 3 is a network architectural diagram illustrating logical components and information flows in an example policy and charging control network.

FIG. 3 is an architectural diagram illustrating communications between the various logical components in a PCC network 112. The PCC network 112 may include a policy and charging enforcement function (PCEF) component 114 that serves as the primary enforcement point, gateway and a routing mechanism between the Internet and the radio infrastructure/radio access network. As discussed above, the PCEF component 114 may be a part of, or perform operations typically associated with, a gateway GPRS support node (GGSN), a packet data network gateway (PGW), or other similar components. Detailed information about policy and charging enforcement function operations may be found in "3rd Generation Partnership Project Technical Specification Group Services and System Aspects, Policy and Charging Control Architecture," TS 23.203 (updated Jun. 12, 2011), the entire contents of which are incorporated herein by reference.

The PCEF 114 may receive signaling messages from a gateway (e.g., Access Gateway 110 illustrated in FIG. 2) and use information contained within the signaling messages to select an optimal route and a quality of service (QoS) for a particular type of services, as well as to enforce various policies on those services. The enforcement of policies may include querying, coordinating, removing, revoking and/or adjusting various resources (e.g., network resources, subscriber resources, etc.) based on a set of policy rules.

The PCEF 114 enforces policies by implementing a set of policy rules. Each policy rule may govern the services, QoS, and/or bandwidth that are to be made available to a particular subscriber. The policy rules may also govern the times when certain services are made accessible to the subscriber (e.g. weekdays from 9 AM to 5 PM, etc.) and how long the subscriber may access those services (e.g., 15 minutes at a time, a total of two hours, etc.)

The PCRF 116 is responsible for identifying the appropriate policy rules for a given communication session of a given subscriber or terminal device, and sending the identified policy rules to the PCEF 114 for enforcement. Specifically, the PCRF 116 is responsible for generating, compiling, and selecting a set of business and technology rules that define the policies that are to be enforced for particular call sessions. The PCRF 116 may make rule decisions on a per-subscriber, per-session and/or per-service basis. For example, the PCRF 116 may use subscriber information (e.g., subscriber's city of residence), the current usage parameters (e.g., day of week, time of day, peak hours, etc.), the subscriber's service level (e.g., Gold, Bronze, etc.), and other information related to the subscriber, session, or service to generate and/or select one or more rules or a rule group. The selected rules or rule group may be communicated to the PCEF 116 (e.g., via the Gx interface) as a profile that defines the policies to be enforced. The PCRF 116 may include one or more databases for storing default rules, maintaining generated rules and keeping track of session information.

The PCRF 116 may request subscriber profile information from the subscriber profile repository (SPR) 122, which maintains subscriber profiles (e.g., customer IDs, preferences, subscription levels, balances, etc.) in one or more data stores.

An application function (AF) 124 represents a node involved in the delivery of an application or service (e.g., voice-over-IP, voice and video call, video-on-demand, etc.) that may be used by a subscriber or that may have dealings with the subscriber. The AF 124 may communicate with the PCRF 116 to ensure that the generated rules are sufficient to provide subscribers with a quality of service (QoS) commensurate with the requirements of their requested services/flows. For example, if a current policy is being enforced based on rules for receiving a particular service (e.g., a voice-over-IP call) and the subscriber requests an additional amount of a given service, or another service (e.g., a voice and video call), the application function 124 component may push a new set of rules to the PCRF 116 reflecting the service changes (e.g., QoS, etc.) required for the additional services. The application function may also store information unique to each subscriber, service, session, and/or application.

In addition to receiving rules from the PCRF 116, the PCEF 114 component may also communicate with an on-line charging system (OCS) 120 and an offline charging system (OFCS) 118 to identify the policies that are to be enforced and/or to ensure proper charging. For example, the PCEF 114 may periodically inform the OFCS 118 of the amount of wireless data that is being used by a subscriber. The OFCS 118 may use this information to monitor the aggregate amount of data/service used by each subscriber, and to generate a record that may be collected, processed, formatted, correlated, aggregated, filtered, and/or sent to an external billing system for processing into a billing statement. In order to monitor the data/service usage of each subscriber, the OFCS 118 may store information related to each subscriber, session, and/or service.

The PCEF 114 may also periodically inform the OCS 120 of services requested by a subscriber. The OCS 120 is generally responsible for determining if the subscriber has sufficient funds/credits/access units to receive a requested service. In various embodiments, the OCS 120 may also perform other operations related to charging, balance management and real time rating. The OCS 120 may grant or deny access based on the amount of fund/credits/access units available. In an embodiment, the OCS 120 may manage pre-pay services. In an embodiment, the OCS 120 may manage a combination of pre-pay and post-pay services in which some (or a portion) of the services require a pre-paid balance and some (or a portion) of the services may be billed to the client. In any case, the PCEF 114 may issue requests for service authorization to the OCS 120, and the OCS 120 may respond with a message granting or denying authorization. As part of its operations, the OCS 120 may store information unique to each subscriber, session, and/or service.

Figure 4:
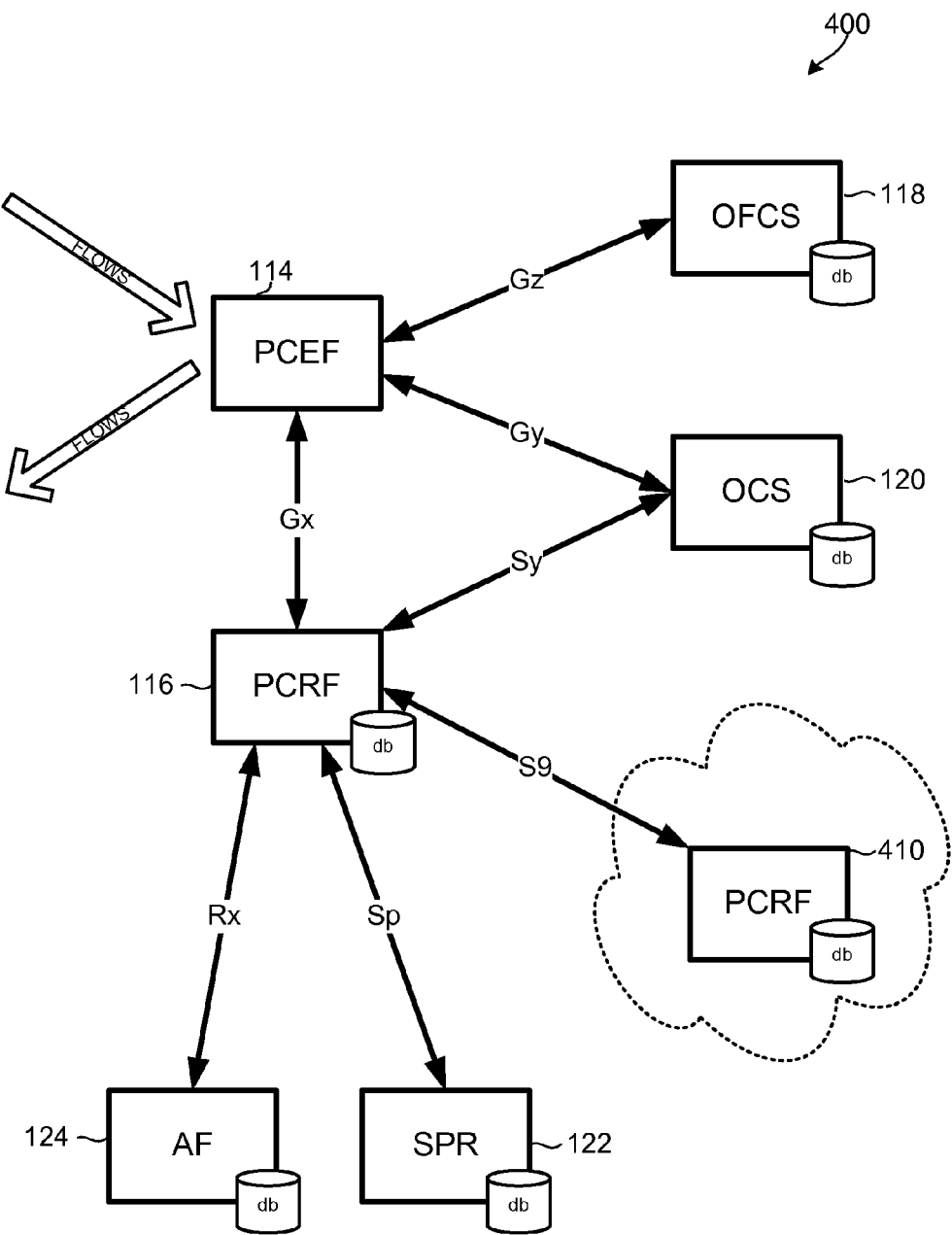
FIG. 4 is a network architectural diagram illustrating logical components and communication protocols in an example policy and charging control network.

FIG. 4 is an architectural diagram illustrating the use of Diameter applications for communications between the various logical components in an example policy and charging control (PCC) network 400. As mentioned above, the logical components may communicate using a protocol, such as RADIUS, SIP or Diameter. Diameter is a protocol standardized by the Internet Engineering Task Force (IETF) and adopted by the Third Generation Partnership Project (3GPP). Diameter is an extensible protocol that provides a general mechanism for two or more nodes in a network to communicate signaling information (e.g., communications involving call setup, security, authentication, charging, enforcement of policy rules). Diameter also includes numerous access control features that make it highly useful in authentication, authorization, and accounting (AAA) systems as well as in the policy and charging control network 112. Detailed information about the Diameter protocol may be found in "Network Working Group Request for Comments: 3588; Diameter Base Protocol," the entire contents of which are hereby incorporated by reference for purposes of disclosing the protocol details.

The Diameter protocol provides a base protocol (i.e., "Diameter base protocol") and a framework for defining custom extensions (i.e., "Diameter applications") to the base protocol. The base protocol defines a set of generic messages useful for low-level operations (e.g., establishing connectivity, hand-shaking, etc.) and the framework allows application-developers to develop Diameter applications (i.e., extensions of the Diameter base protocol) that define custom messages for more specialized operations. By extending the Diameter base protocol, Diameter applications may use all of the features provided by the Diameter base protocol, as well as any custom protocol extensions they define. For example, a Diameter application may use Diameter base protocol components to define exactly how messages are to be communicated and define custom extensions that describe the content of the messages being communicated.

As mentioned above, logical components (e.g., PCEF 114, PCRF 116, AF 124, SPR 122, OCS 120, OFCS 118) in the PCC network 400 may use the Diameter protocol to communicate with each other. Components that use the Diameter protocol may support various standardized Diameter applications (e.g., Gx, Gy, Gz, Rx, Sy, etc.) that are especially well suited for their specialized operations.

The logical components (e.g., PCEF 114, PCRF 116, AF 124, SPR 122, OCS 120, OFCS 118) in the PCC network 400 may also communicate with resources outside of the provider network. For example, the PCRF 116 in a home provider network may need to communicate with a PCRF 410 in another provider network, such as while a subscriber's cell phone roams in the other provider's network. The external PCRF 410 may communicate with the appropriate logical components (e.g., PCRF 116, OCS 1201, etc.) in the home provider network to ensure proper charging, QoS, charging, etc. In the illustrated example, the external PCRF 410 communicates with PCRF 116 through the S9 interface.

To focus the discussion on the relevant features, various logical components (e.g., PCEF, PCRF, AF, SPR, OFCS, OCS, etc.) are described as using specific Diameter protocols. However, it should be understood that any protocol may be used (e.g., RADIUS, SIP, etc.) and nothing in the claims should be limited to a particular interface, protocol or application, unless expressly recited in the claims.

Figure 5:
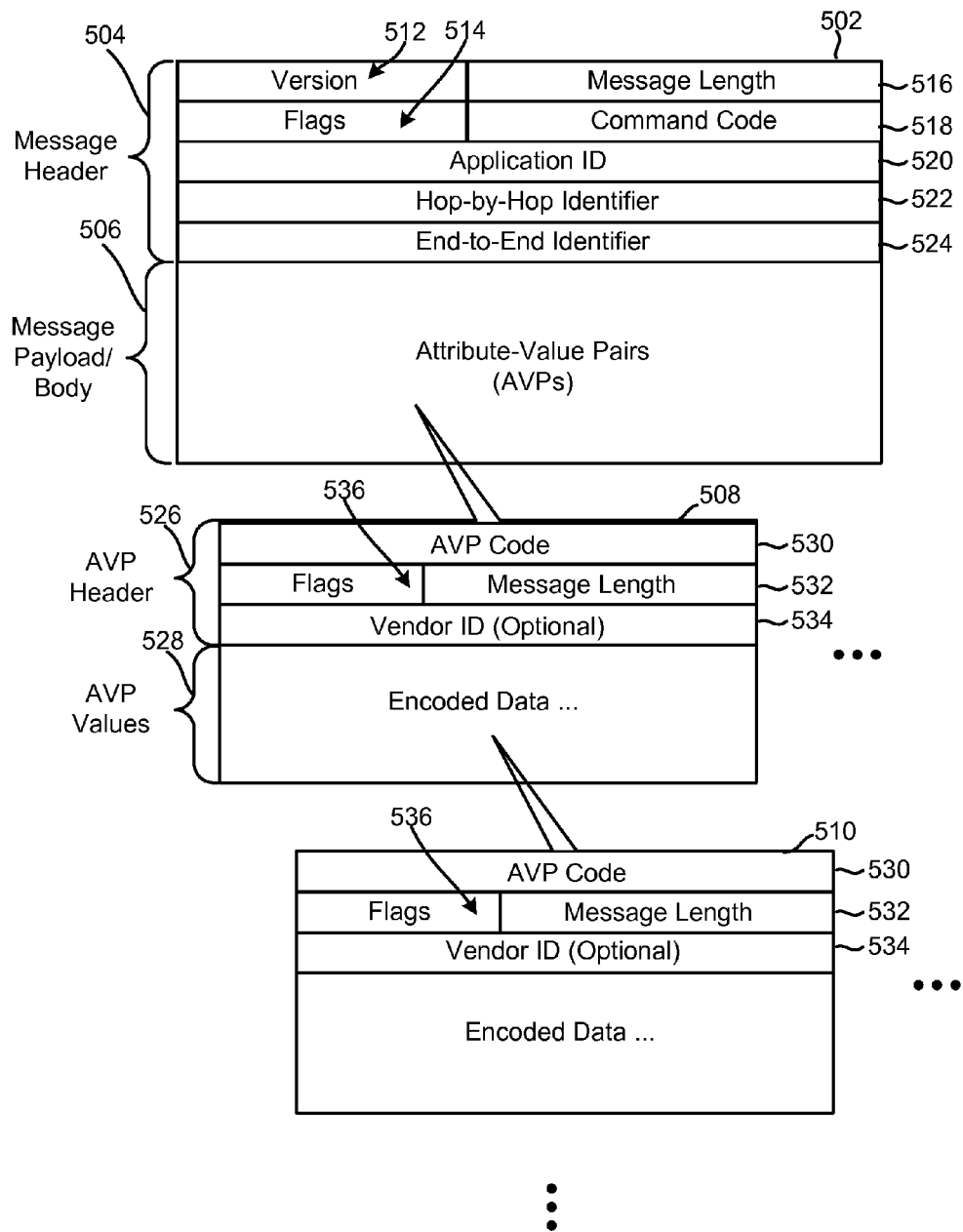
FIG. 5 is an illustration of an example message structure for communicating signaling information suitable for use with an embodiment.

FIG. 5 illustrates the message structure of an example Diameter message 502 suitable for encoding signaling information. Diameter messages 502 have a fixed structure that includes a message header portion 504 and a message payload/body portion 506. The message header 504 contains general information about the message, such as version information 512, bit flags 514, message length 516, a command code 518, an application ID 520, a hop-by-hop identifier 522, and an end-to-end identifier 524. The version information 512 field identifies a Diameter protocol version. The bit flags 514 provide administrative information that may be used to process the message. For example, the first bit ("R") may indicate if the message is a request or an answer, the second bit ("P") may indicate if the messages must be processed locally or is proxiable (e.g., may be proxied, relayed, or redirected), the third bit ("E") may indicate if the message is a standard message or an error message, the fourth bit ("T") may indicate if the messaging is being sent for the first time or if there is a probability that the message is being re-transmitted, etc. The application ID 520 identifies a type of application (authentication, accounting, vendor specific, etc.) to which the message is related. The hop-by-hop identifier 522 is a unique ID that may be used to match requests to answers and send answer messages back to the requesting component. The end-to-end identifier 524 is a time-limited ID generated by the originator of a request message that should not be changed by intermediate network nodes or by the responder to the message. It is used for correlating responses with requests and for detecting duplicate messages.

The command code 518 identifies a message type of the Diameter message 502. There are several standard Diameter message types (e.g., Accounting-Request, Device-Watchdog-Answer, etc.) defined by the Diameter base protocol. Network components may quickly identify the type of information carried by a particular Diameter message 502 by examining the command code message header 504. For example, a node receiving an "Accounting-Request" message needs only examine the command code (e.g., "271") in the message header 504 to identify the message as an accounting message.

The Diameter message body 506 contains the actual data/signaling information that is being communicated. The signaling information may be stored in one or more attribute-value-pairs (AVPs) 508, which may nest other attribute value pairs (nested AVPs) 510. Attribute-value-pairs 508, 510 are extendable data-structures that include a header portion 526 and a data portion 528. The header portion 526 may include general information about the attribute-value-pair, such as an AVP code 530, message length 532, an optional vendor ID 534, and various bit flags 536. The data portion 528 may store simple data (e.g., integer, unsigned, float, etc.) or complex data (e.g., other AVPs), in an encoded format. The data portion 528 may encapsulate protocol-specific data (e.g., routing information) as well as authentication, authorization, or accounting information.

The AVP code 530 field may identify an AVP type. The Diameter base protocol defines a number of standard AVP types (i.e., attributes). Diameter applications extending the base protocol inherit all of the AVP types defined by the base protocol and may define new AVP types unique to each application. AVP codes may be combined with the optional vendor-ID 534 field to uniquely identify an attribute.

Figure 6:
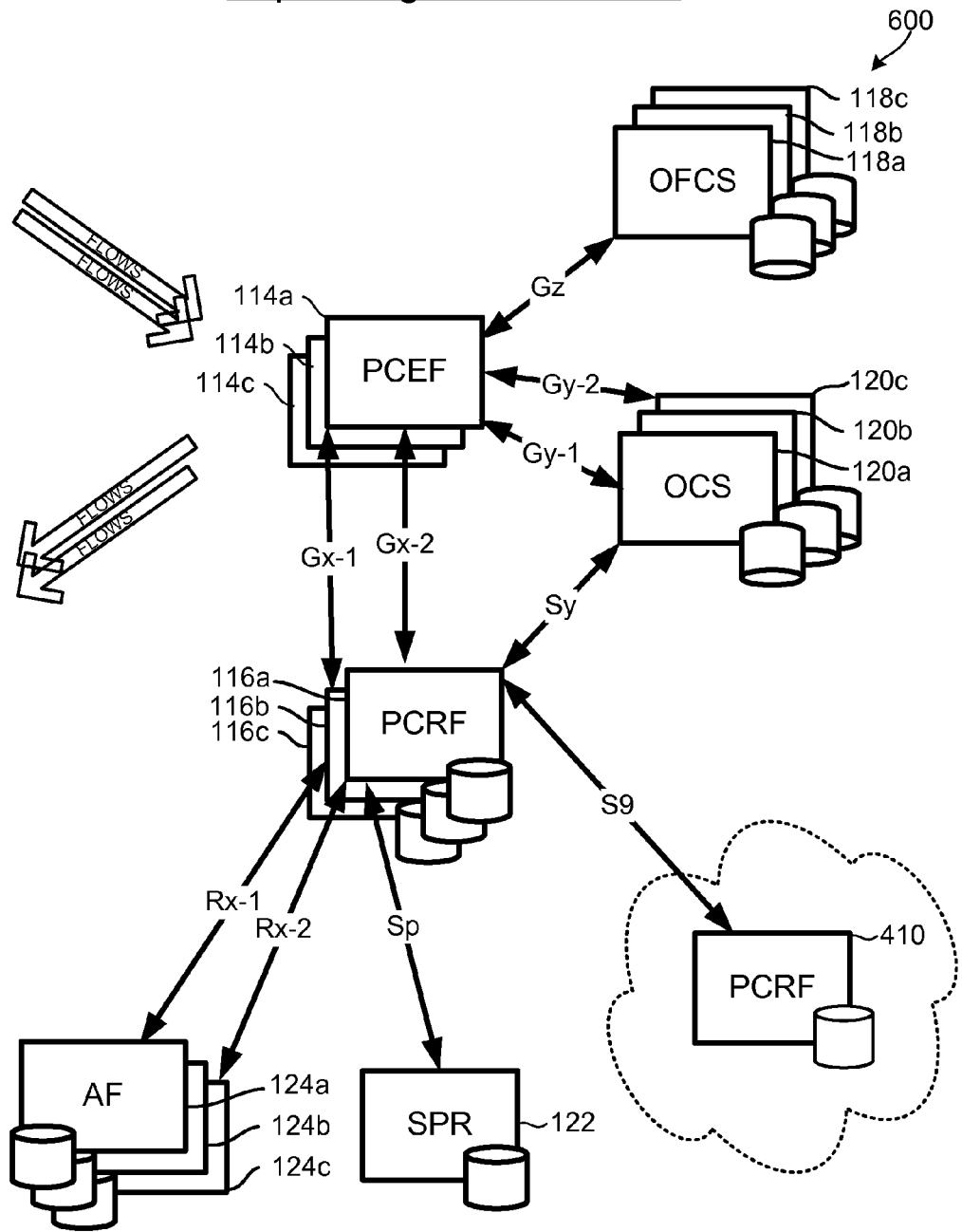
FIG. 6 is a network architectural diagram illustrating an expanded policy and charging control network having multiple instances of the same logical components.

FIG. 6 illustrates an expanded policy and charging control (PCC) network 600 having more than one instances of each of the PCEF (114a-c), PCRF (116a-c), AF (124a-c), OCS (120a-c) and/or OFCS (118a-c) components, as well as a connection to an external PCRF 410. As operator networks expand to meet increased traffic and user demands, multiple instances of the same component may be implemented within a single policy and charging control network 600. Each instance may be uniquely addressable and store information relevant to a particular service, application, session or subscriber in a local memory or database. For example, the first time a destination component (e.g., PCRF 116a) receives a Diameter message from a source component (e.g., PCEF 114a) for a particular subscriber, the destination component (PCRF 116a) may store session information related to that subscriber in a local session database. Subsequent Diameter messages may require access to the session information stored by that particular instance of the destination component (e.g., PCRF 116a). Before the introduction of the DRA there was no method for identifying the desired instances of components within the policy and charging control network 600, and each component was required to discover the correct instance by trial and error. As the operator networks continue to grow, managing communications between the various instances of the various components in a PCC network in a secure and efficient manner is becoming ever more important.

Figure 7A:
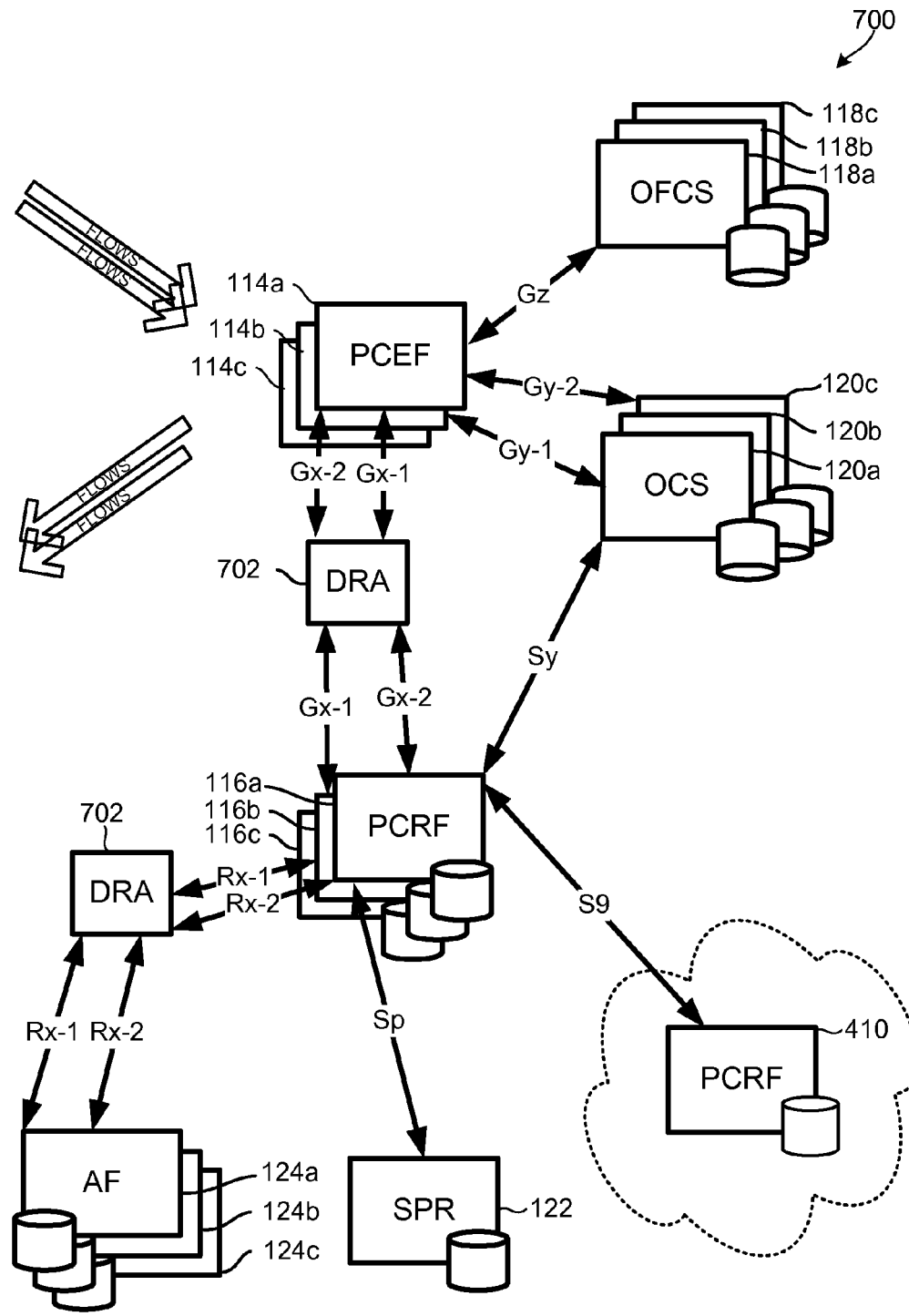
FIG. 7A is a network architectural diagram illustrating an expanded policy and charging control network that includes a Diameter routing agent (DRA).

FIG. 7A illustrates the role of a Diameter routing agent (DRA) 702 in an expanded policy and charging control (PCC) network 700. A Diameter routing agent is a concept introduced by 3GPP in its specifications for facilitating Gx, Gxx, S9, and Rx communications with a particular instance of a PCRF (e.g., 116) when multiple and separately addressable PCRFs (e.g., 116a-c) are deployed in the same Diameter realm. Source components can send messages to a Diameter routing agent (as opposed to the destination node) and rely on the Diameter routing agent to forward the message to the appropriate node. This allows the routing logic required to identify and locate a destination node to be decoupled from the source nodes and included in a specialized component (i.e., the Diameter routing agent).

However, the 3GPP specifications only identify the general role of a Diameter routing agent (DRA) in a Diameter network, which is to provide a proxy, relay or redirect services in networks having multiple PCRFs. For example, in a PCC network 700, the role of a Diameter routing agent (e.g., DRA 702) may be to manage PCEF 114a communications (e.g., Gx-1, Gx-2) with various instances of the PCRF (116a, 116b) by receiving Gx messages and relaying the Gx messages to the correct instance of the PCRF 116. The Diameter routing agent (e.g., DRA 702) may also manage communications (e.g., Rx-1, Rx-2) between the various instances of the PCRF 116 and AF 124 by performing simple proxy, relay or redirect operations.

While the Diameter routing agents (e.g., DRA 702) may simplify routing operations in a policy and charging control (PCC) network, they are primarily focused on routing messages involving policy control rules functions (PCRFs). In particular, Diameter routing agents only support specific interfaces (e.g., Gx, Gxx, S9 and Rx); do not perform intelligent routing operations, are unaware of the context of the messages; cannot augment messages; do not support dynamic operations; do not have built-in support for future protocols/Diameter applications; cannot hide the network topology; cannot perform true translation operations; cannot covert messages into different protocols, and are not resilient in the event of failover.

Figure 7B:
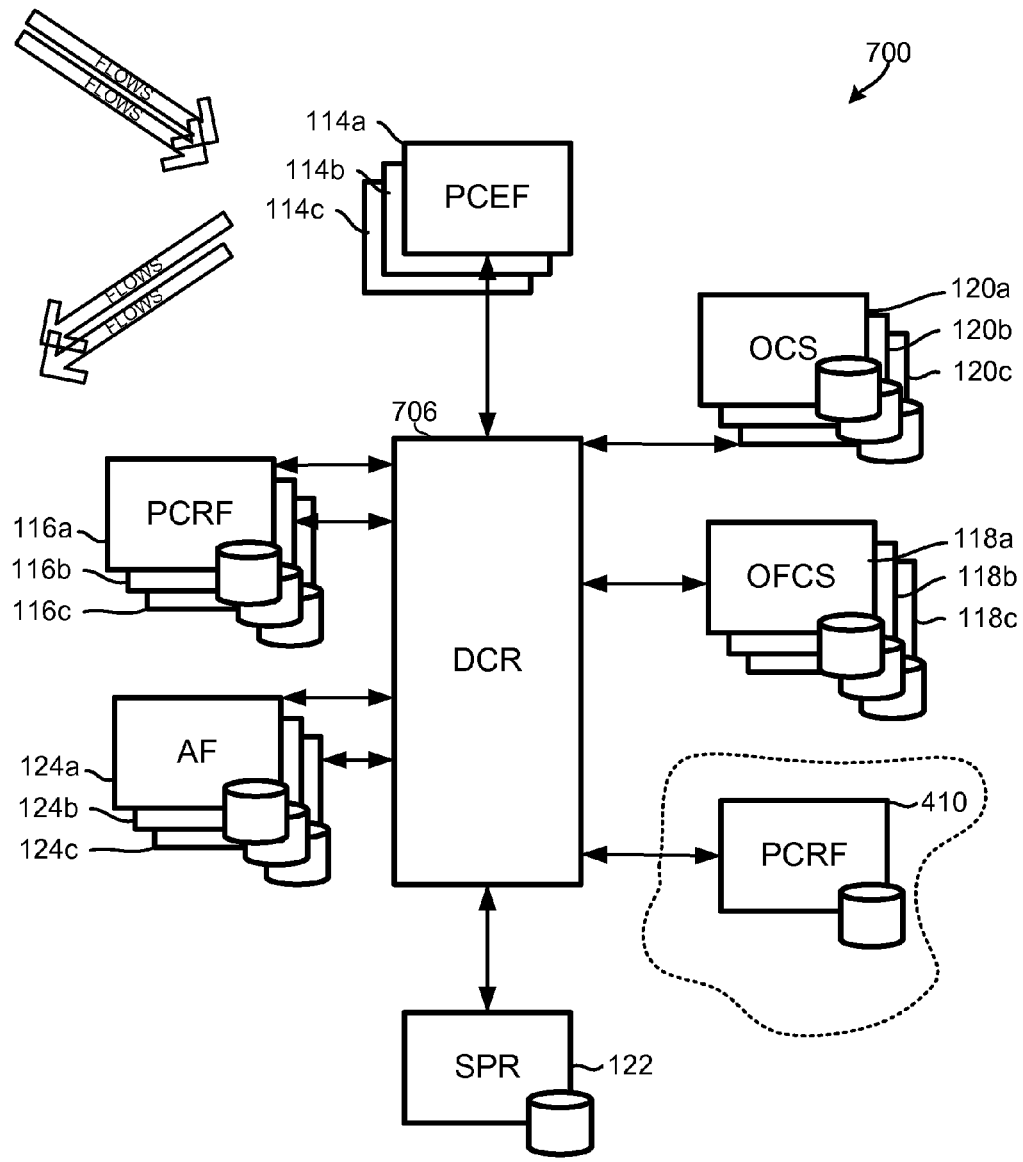
FIG. 7B is an architectural diagram illustrating an expanded policy and charging control network that includes a dynamic context router (DCR) in accordance with various embodiments.

FIG. 7B illustrates an expanded policy and charging control (PCC) network 700 that includes a dynamic context router (DCR) 706 in accordance with the various embodiments. A dynamic context router 706 is flexible, protocol agnostic, application-level router and load balancer that may be used to manage communications between the various instances of the various components in a network to ensure that the correct messages are sent to the correct instances. Some of the application layer functions performed by the dynamic context router 706 may include identifying communication partners, and determining resource availability. The identification of communication partners may include determining the identity and availability of communication partners for an application requesting a communication session to transmit data.

The dynamic context router 706 allows the routing logic required to identify and locate a destination node to be decoupled from the source nodes. Source nodes may communicate with the dynamic context router 706 using any Diameter application (e.g., Gx, Gy, Gz, Rx, Sy, etc.) and do not need to know the protocol requirements and Diameter applications of the destination nodes. In this manner, new instances of any destination node may be added without having to inform the source nodes of the existence of the new destination node or of the protocols associated with the new node. Likewise, new instances of the source nodes may be added to the PCC network 700 without informing the new nodes of the other nodes (and vice versa), their protocols, or other intimate details of the PCC network 700.

The dynamic context router 706 may make routing and load-balancing decisions dynamically for each instance of an application/message based on the context and content of the data being communicated. The dynamic context router 706 may look inside the messages being communicated and make intelligent decisions based on the content of the messages. The dynamic context router 706 may make calls (e.g., function calls, etc.) to external systems to request additional information for a specific message being communicated. The dynamic context router 706 may receive additional information from external systems and use the information to augment the message, to aid in message routing, and/or to accomplish load balancing operations. The dynamic context router 706 may store information specific to a particular network node, protocol, application, message or message type in an internal memory, and reference the internal memories for message processing. As internal/external data changes, the dynamic context router 706 may update the routing and load balancing decision-making logic to reflect the changes in internal/external data.

In an embodiment, the dynamic context router may enable node upgrades without interrupting service. For example, a first PCEF in communication with a single PCRF (e.g., using Gx) may require upgrades or may need to be replaced without interrupting the service. The dynamic context router allows a second PCRF to be introduced into the network without any interruption of service by routing old messages (e.g., all existing Gx session messages) to the first PCRF, and all new message (e.g., new Gx session messages) to the second PCRF. The dynamic context router may indicate when all of the old sessions have terminated, indentifying when the old PCRF can be safely removed. In an embodiment, a dynamic context router may be removed from the network after the new PCRF is introduced without interrupting operations. In an embodiment, a dynamic context router may be introduced into the network along with, or immediately prior to, the second PCRF and removed from the network after the new PCRF is introduced.

In an embodiment, the dynamic context router may use contextual information obtained from response messages to influence future routing decisions. This contextual information may be either intentionally placed within the response message for use by the dynamic context router, or it may normally be there. For example, a dynamic context router that is load balancing between five equal PCRFs may initially use a round-robin algorithm. However, some requests may require more processing than others, and the PCRF loads may differ. In an embodiment, each PCRF may include an additional proprietary parameter in the response messages indicating its current work load, which may be used as contextual information by the dynamic context router when making future load balancing routing decisions.

In an embodiment, the dynamic context router may utilize a PCRF that is highly optimized for a very limited set of functionality (e.g., a "Voice over LTE" optimized PCRF). For example, when the dynamic context router is routing a message to a PCRF it may use contextual information to choose the right type of DCR. As another example, the dynamic context router may be configured to host simple application logic such that if a certain type of service is not permitted in the network (regardless of all other criteria such as user details) the DCR can respond to the request message directly without needing to send the request message to a PCRF. Thus, in an embodiment, the dynamic context router may shield the PCRFs from additional and unnecessary communications and work.

Figure 8:
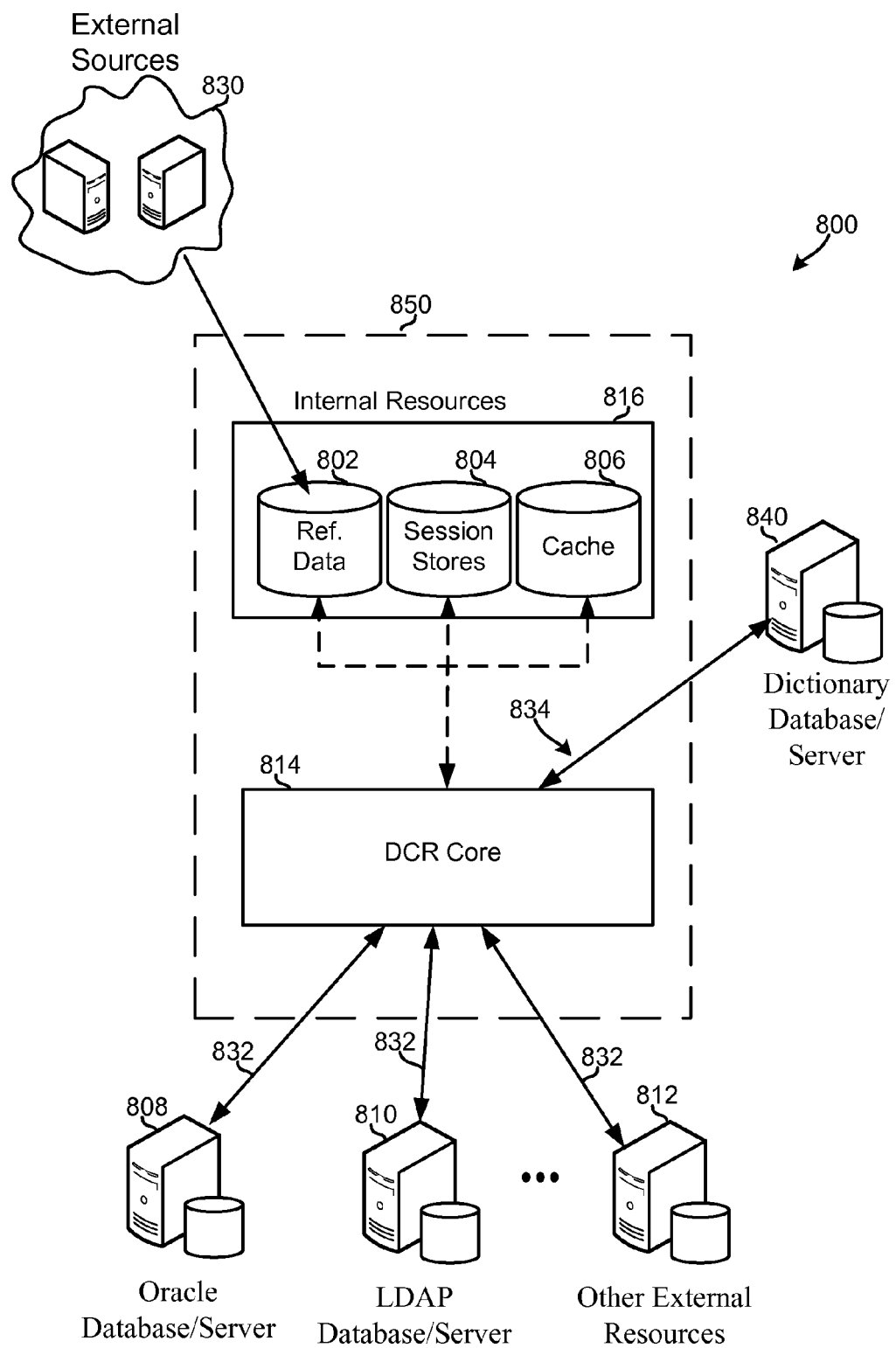
FIG. 8 is a component block diagram illustrating the logical components and communication links of an example dynamic context router system in accordance with various embodiments.

FIG. 8 illustrates logical components and communication links of an example dynamic context router system 800. The dynamic context router system 800 may include a dynamic context router core (DCR core) 814 module, a plurality of internal resources 816, and communication links 832, 834. The communication links 832, 834 may link the dynamic context router system 800 to various external resources, such a dictionary server 840, an Oracle™ server 808, a lightweight directory access protocol (LDAP) server 810, as well as other external resources 812 (e.g., a subscriber profile repository, an online charging system, etc.). The internal resources 816 may include in-memory database technologies such as a reference database 802, as well as a plurality of session stores 804 and a cache memory 806. The internal resources 816 may be on the same chip, on the same computing device, within the same realm, or in the same network as the DCR core 814. The session stores database 804 may include a DCR-specific session store, a general session store and a session store for each message/session/node/Diameter application serviced by the dynamic context router.

The reference database 802 may store any type of information that will aid DCR core 814 operations, such as message formats, message processing rules, validation rules, node IDs, etc. The reference database 802 may be populated by data from external sources 830. In such cases the data may either be pulled by the reference database 802 from the external sources 830, or pushed to the reference database 802 by the external sources 830. As discussed below, the session stores 804 may store session information, which may be used to establish "session stickiness" and/or maintain session states. The cache memory 806 may be populated by the DCR core 814, which may periodically cache data in response to on-going dynamic context router operations. For example, the DCR core 814 may cache information received from external sources useful for processing future messages. In an embodiment, the DCR core 814 may perform cache-optimizing operations to identify the most expensive information requests (e.g., requests made to external systems having slow response times) and store information associated with the most expensive information requests in the cache memory 806. In an embodiment, the DCR core 814 may first seek information from the cache memory 806 before attempting to access external resources. In an embodiment, the dynamic context router may periodically expire or remove information from the cache memory 806. In an embodiment, the dynamic context router may perform cache-optimization operations to determine an optimal cache-expiration rate and expire/remove information at the optimal rate.

The dynamic context router (DCR) may use the communication links 834 to access one or more dictionary servers 840, which may include one or more dictionaries. Each dictionary may define information specific to a particular protocol, application, node or message type. For example, a dictionary may include file definitions, a list of available commands (e.g., "deduct balance," "refund balance," etc.), a list of mandatory message types, a list of optional message types, a list of unsupported message types, field/message descriptions, and message decoding rules. The list of available commands may include a list of specific message types, each of which may be associated with a specific validation rule. A dictionary may also define message requirements, such as rules for storing certain message fields (e.g., session ID must be at the end of the message, session ID cannot be in the middle of the message, etc.) for a given node, protocol, or application.

The dictionary servers 840 enable the dynamic context router to support any current or future Diameter applications and/or message formats through dictionary updates. For example, if a vendor develops a new Diameter application "Z", the vendor may add a new Diameter dictionary (dictionary entries) that defines the rules/requirements of the new application. In an embodiment, the DCR core 814 may dynamically generate and/or update the dictionary definitions, without requiring any of the dictionaries to be taken offline.

Figure 9:
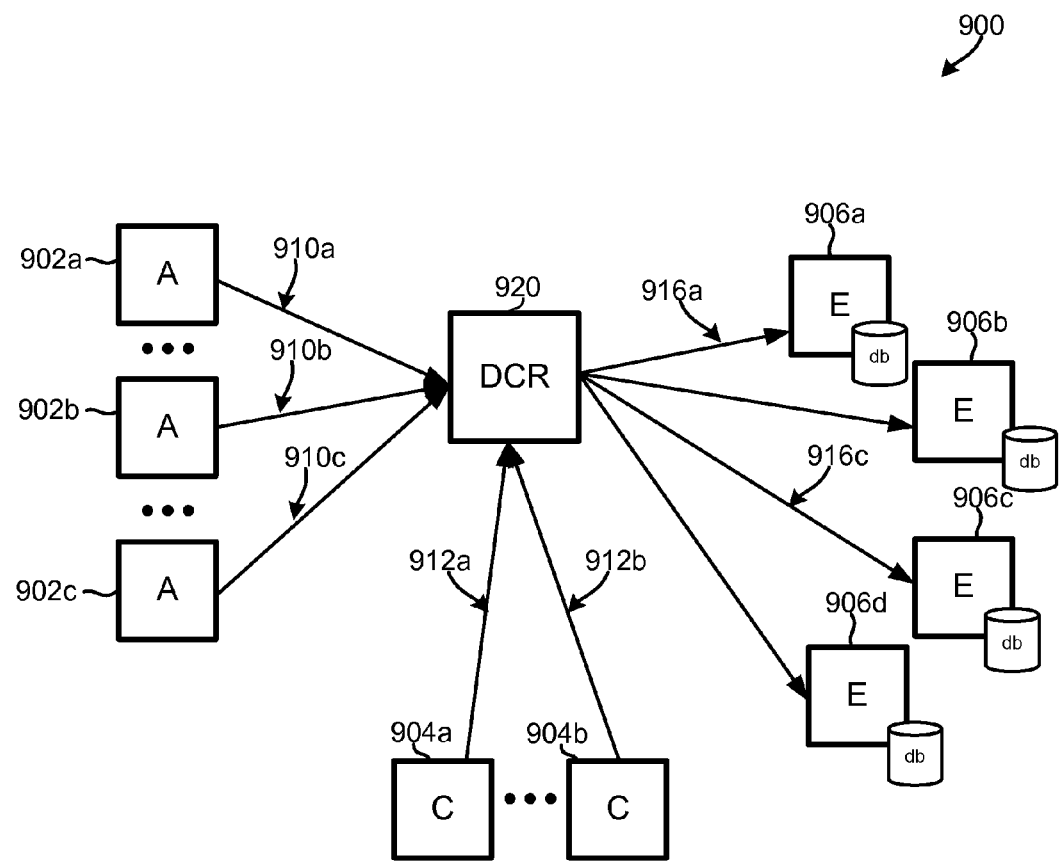
FIG. 9 is an architectural diagram illustrating example signaling and message flows in a network that includes a dynamic context router system in accordance with the various embodiments.

FIG. 9 illustrates example signaling flows in a network 900 in which a dynamic context router 920 has been deployed. The network 900 may include a plurality of nodes (902a-c, 904a-b, 906a-d) that provide specific functions and/or implement specific protocols (A, C, E). Multiple nodes in the network 900 may provide the same function and/or implement the same protocol. Nodes that provide the same functions/implement the same protocol may be different instances of the same node (e.g., Node A, Node C, Node E). In an embodiment, the network 900 may be a policy and charging control network, each of A, C and E may be any of the logical components described above (e.g., PCEF, PCRF, OFCS, OCS, SPR, and/or AF) and each of nodes 902a-c, 904a-b and 906a-d may be an instance of one of the logical components.

Returning to FIG. 9, a source node (e.g., 902a-c, 904a-b) may send a request message (e.g., a connection request) to the dynamic context router 920, which receives the request message and establishes a connection (e.g., 910a-c, 912a-b) with the requesting source node. In an embodiment, the connection may be a physical link layer communication line. Source nodes (902a-c, 904a-b) may send signaling messages that encode signaling data to the dynamic context router 920 over the established connections 910a-c, 912a-b. The signaling messages may encode the signaling data in one or more Diameter messages. Each Diameter message may include a base Diameter message portion and an application specific Diameter message portion. The dynamic context router 920 may receive the signaling messages and examine the base Diameter message portion of the message to determine if the message may processed by performing realm-based routing table look-up operations. If so, the dynamic context router DCR 920 may perform proxy, relay, or redirect operations, which may include performing load balancing operations.

If the message cannot be processed by performing message-based routing (e.g., realm-based routing) table look-up operations, the dynamic context router 920 may perform application-level routing and load balancing operations to identify a suitable destination node (e.g., 906a-d) to which a corresponding signaling message is to be sent. The dynamic context router 920 may determine if a message may be sent to any destination node offering a particular service (e.g., any "E" node) or if the message requires a particular instance (e.g., 906c) of the destination node. If the message may be sent to any destination node offering the service (906a-d), the dynamic context router 920 may perform load-balancing operations to identify a suitable instance (e.g., 906c), establish a connection/association (e.g., connection 916c) to the identified instance (e.g., 906c), encode the signaling information into a message, and transmit the signaling message to the identified instance.

If the dynamic context router 920 determines that the messages should be sent to a particular instance of the destination node (e.g., 906a), the dynamic context router 920 may decode the message, examine the contents of the message, perform application-level routing operations to identify the correct instance (e.g., 906a), establish a connection/association (e.g., connection 916a) to the identified instance (e.g., 906a), re-encode the decoded contents into a new message, encode the signaling information into a message, and transmit the signaling message to the identified instance (e.g., 906a).

Figure 10A:
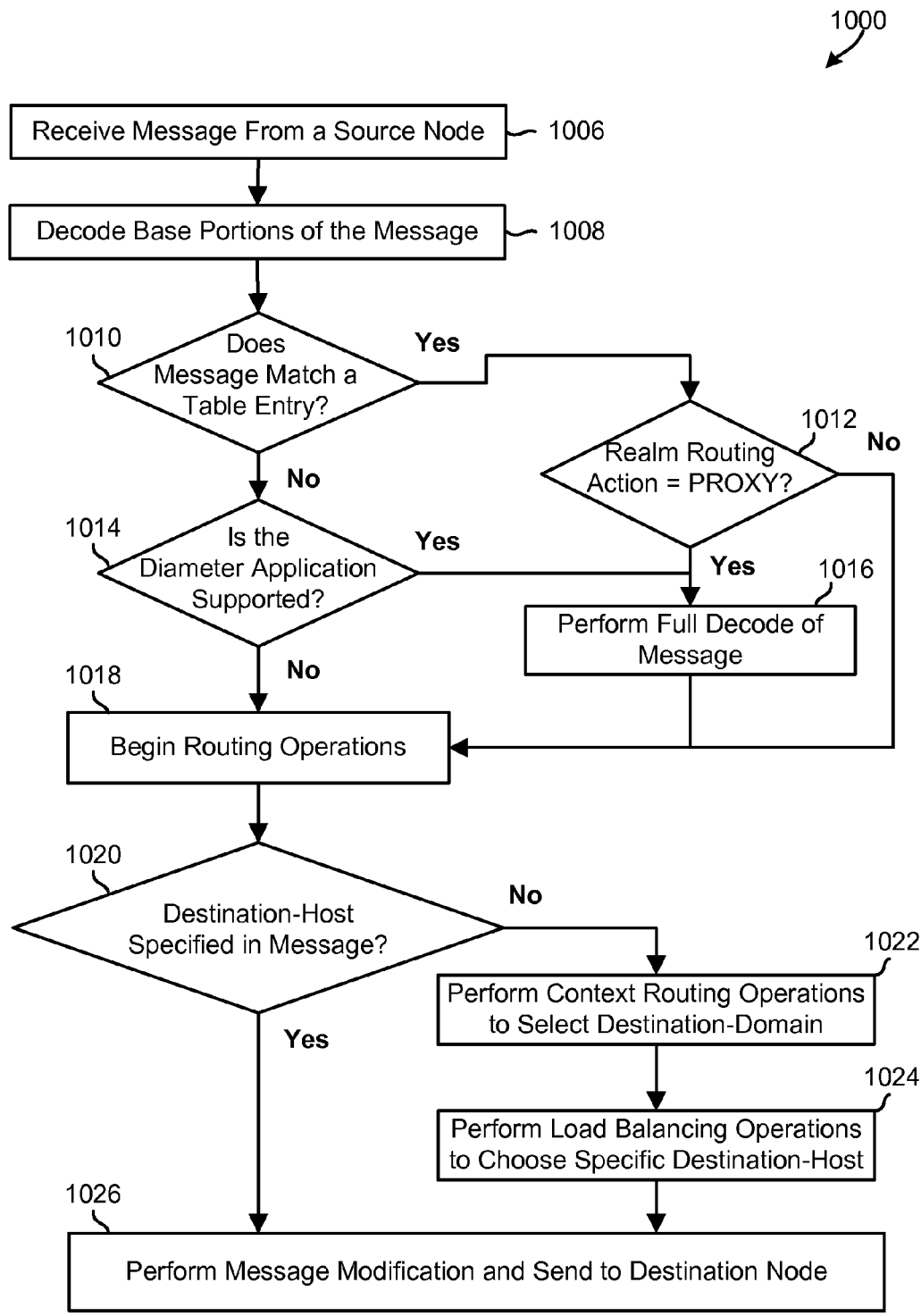
FIG. 10A is a process flow diagram illustrating an embodiment dynamic context router method for receiving, processing and transmitting signaling messages in accordance with various embodiments.

FIG. 10A illustrates an example dynamic context router method (DCR method) 1000 for receiving signaling messages from a source node and sending corresponding signaling messages to a destination node. As mentioned above, the dynamic context router may receive a connection/association request from a source node and establish a connection with the requesting source node. In step 1006, the dynamic context router may receive one or more Diameter messages over such connection. In step 1008, dynamic context router may decode a base portion of the Diameter message. In determination step 1010, dynamic context router may perform message-based (e.g., realm-based) routing table look-up operations to determine if an entry corresponding the Diameter message exists in the routing table (i.e., the Diameter message matches a routing table entry). If the dynamic context router determines the Diameter message matches a routing table entry (i.e., determination step 1010="Yes"), in determination step 1012, the dynamic context router may determine if a "realm routing action" is a proxy operation. If it is determined that the realm routing action is a proxy operation (i.e., determination step 1012="Yes"), in step 1016, the dynamic context router may perform operations to fully decode the message, and in step 1018, begin routing operations. If the realm routing action is not a proxy operation (i.e., determination step 1012="No"), in step 1018, the dynamic context router may begin routing operations.

If in determination step 1010 the dynamic context router determines the Diameter message does not match a routing table entry (i.e., determination step 1010="No"), in determination step 1014, the dynamic context router may determine if a Diameter application associated with the Diameter message is supported. If the Diameter application associated with the Diameter message is supported (i.e., determination step 1014="Yes"), in step 1016, the dynamic context router may perform operations to fully decode the message. If the Diameter application is not supported (i.e., determination step 1014="No"), in step 1018, the dynamic context router may begin routing operations.

In determination step 1020, the dynamic context router determines if the destination-host is specified in the Diameter message. If the destination-host is specified in the Diameter message (i.e., determination step 1020="Yes"), in step 1026, the dynamic context router performs operations to modify the contents of the message (e.g., augments the message) and sends the modified message to the destination node. If the destination-host is not specified in the Diameter message (i.e., determination step 1020="No"), in step 1022 the dynamic context router performs context routing operations to select a destination domain. In step 1024, the dynamic context router performs load balancing operations to choose a specific instance of the selected destination domain. In an embodiment, the dynamic context router may match message parameters against internal or external reference data to identify a suitable instance of the destination node. In various embodiments, the dynamic context router may identify and select the first available instance of the destination node, the most available instance of the destination node, or the most underutilized instance of the destination node, all of which may be performed with the assistance of dynamic information obtained in real-time from external systems (e.g., external resources 812 illustrated in FIG. 8). In an embodiment, the dynamic context router may identify and select an instance of the destination node, such that the processing workload is distributed across the nodes, the communication traffic is minimized, the network resources are optimally utilized, network throughput is maximized, and/or response time is minimized.

As mentioned above, in step 1026, the dynamic context router performs message modification operations (e.g., augments the message) and sends the modified message to the selected instance of the destination node.

Figure 10B:
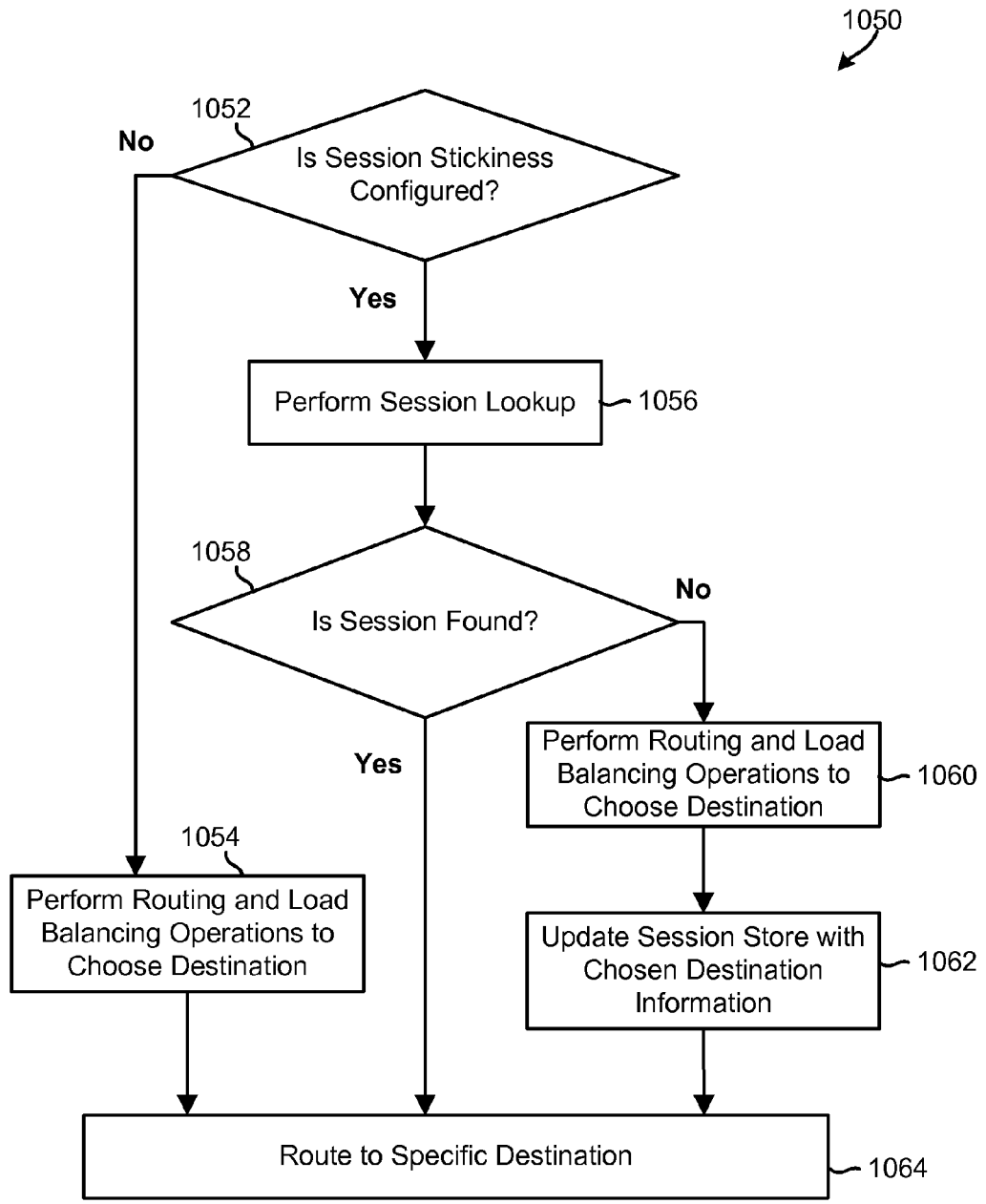
FIG. 10B is a process flow diagram illustrating an embodiment dynamic context router method for determining if a specific instance of a destination node is required to perform load balancing and context routing operations in accordance with various embodiments.

FIG. 10B illustrates an example dynamic context router method 1050 for determining if a specific instance of a destination node is required. In step 1052, the dynamic context router may determine if session stickiness has been configured for a particular Diameter message. The dynamic context router may determine if a session exists by, for example, comparing message information to a session identifier stored in a session store. If session stickiness has not been configured (i.e., determination step 1052="No"), in step 1054, the dynamic context router may perform routing and load balancing operations to choose a destination node.

By establishing session stickiness the DCR may select the instance of the destination node to which a previous message related to that session was sent and send all future signaling messages associated with that session to the same instance of the destination node. In this manner, signaling messages belonging to the same session, but originating in different source nodes (e.g., Nodes A and C illustrated in FIG. 9), may be directed to the same instance of the destination node (e.g., 906a-d illustrated in FIG. 9). If the dynamic context router determines that session stickiness has been configured (i.e., determination step 1052="Yes"), in step 1056, the dynamic context router may perform a session look up. In determination step 1058, the dynamic context router may determine if the session exists by, for example, comparing session information extracted from the Diameter message to session identifier information stored in a session store. If the session is found (i.e., determination step 1058="Yes"), the dynamic context router may, in step 1064, route the message to a specific destination associated with the identified session. If the session is not found (i.e., determination step 1058="No"), in step 1060, the dynamic context router may perform routing and load balancing operation to choose a destination node. In step 1062, the dynamic context router may update the session store with the chosen destination node.

As mentioned above, in the various embodiments, as part of the application-level routing operations, the dynamic context router may determine that a specific instance of a destination node is required. For example, the dynamic context router may determine that a Diameter message must always be sent to a specific node due to a context based routing operation requiring all mobile subscriber integrated services digital network numbers (MSISDNs) matching a certain pattern go to a specific node, or due to a context based routing operation requiring that all messages in the session go to the same destination node.

Figure 11:
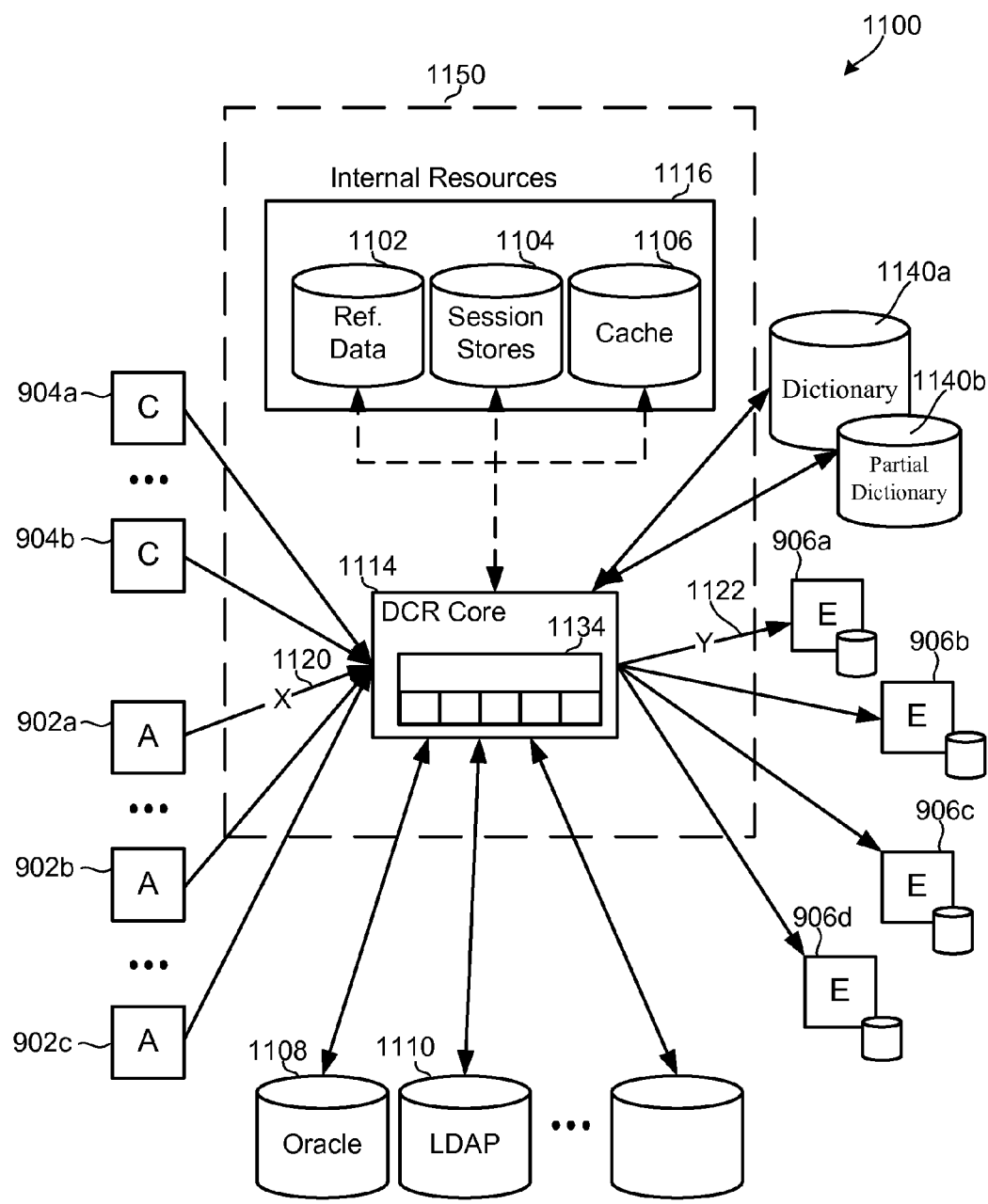
FIG. 11 is an architectural diagram illustrating example logical components and information flows of an example dynamic context router system in accordance with an embodiment.

FIG. 11 illustrates logical components and information flows 1100 of an example dynamic context router system (DCR system) 1150 configured to receive messages from multiple instances (e.g., 902a-904b) of multiple source nodes (e.g., Nodes A, C) and send corresponding signaling messages to destination nodes (e.g., Node E, 906a-d). The DCR system 1150 may include a dynamic context router core (DCR Core) 1114 module, a plurality of internal resources 1116 and communication links to various external resources, such as a dictionary server 1140a, an Oracle database 1108, a Lightweight Directory Access Protocol (LDAP) database 1110, etc. The internal resources 1116 may include a reference database 1102, session stores 1104 and a cache memory 1106.

FIG. 11 illustrates that the DCR core 1114 may receive signaling messages from one or more source nodes (902a-904b). Each signaling message may encapsulate signaling information (e.g., charging rules, authentication information, enforcement of policy rules, etc.). Signaling messages, such as Diameter messages, may be sent to the DCR core 1114 using interface 1120. Each Diameter message may have encoded base protocol portions and encoded application-specific portions. The base protocol portions may be decoded by any Diameter application/node and/or relayed or proxied accordingly. The application-specific portions may only be decoded if all of the application-specific decoding rules are known by the receiving node.

Thus, in an embodiment, the dynamic context router may receive a Diameter message, decode the base Diameter portions of the Diameter message into base parameters/AVPs, decode the application-specific portions of the Diameter message into application parameters/AVPs, use the decoded parameters/AVPs to identify a proper destination node, re-encode the base and application parameters/AVPs into a new Diameter message, and send the Diameter message to the identified destination node.

As mentioned above, the network nodes generally can only decode the application-specific portions of Diameter messages if all of the application-specific decoding rules are known to the network node. FIG. 11 illustrates that the dynamic context router communicates with a dictionary database 1140a, and may request these application-specific decoding rules from the dictionary database 1140a. For example, the DCR core 1114 may send a request message identifying a protocol, node, or message to a dictionary server (not illustrated), which receives the request, queries the dictionary database 1140a for the correct set of rules and sends the rules to the DCR core 1114. The DCR core 1114 may then use these rules to decode the application-specific portions of the messages. However, access to the external resources, such as the dictionary database 1140a, is generally an expensive and time consuming process. In addition, once the DCR core 1114 receives the decoding rules, it must spend considerable processing resources to perform the actual decoding operations.

To improve efficiency and reduce latency, in an embodiment, the DCR core 1114 may access partial dictionaries 1140b and/or perform the decoding operations in two phases. Partial dictionaries 1140b are dictionaries that do not contain a complete set of rules for a particular protocol, message, node or application. In an embodiment, partial dictionaries 1140b may be created out of necessity when the information stored in the complete dictionary cannot fully describe both a newer and an older standard, both of which may exist simultaneously in the network. In an embodiment, partial dictionaries 1140b may contain only the minimum amount of rules required to successfully communicate with a given protocol. Since partial dictionaries may contain less information than complete dictionaries, in an embodiment, the DCR core 1114 may utilize partial dictionaries to receive and process the messages much faster when a partial dictionary is available.

In an embodiment, the DCR core 1114 may perform decoding operations in two or more phases. This multi-phase decoding allows the dynamic context router to decode a small portion of the message and, if necessary, perform addition decoding operations in small targeted increments until a suitable destination node is identified or it is determined that a suitable destination node cannot be determined from additional decoding operations. For example, the DCR core 1114 may incrementally decode additional portions of the base and/or message body until: a suitable destination node can be identified; the entire message is decoded; or the DCR core otherwise determines that a suitable destination node cannot be determined from further decoding of the message.

In an embodiment, the DCR core 1114 may perform protocol translation operations. Protocol translations may be performed at several different levels, and multiple translations may be performed together. For example, FIG. 11 illustrates that the DCR core 1114 may receive a Diameter message 1134 from a particular instance of a source node (e.g., 902a). The message 1134 may be implemented in a first protocol (e.g., SOAP) and require transmission to a destination node (e.g., 906a) that requires a second protocol (e.g., Diameter). Since the first and second protocols differ, the destination node will not be able to receive the message. In an embodiment, the DCR core 1114 converts the message from the first protocol into the second protocol. For example, the DCR core 1114 may receive the SOAP message 1134, decode the message, perform operations to identify the destination node, perform operations to identify the protocol supported by the destination node (e.g., Diameter), access the dictionary databases 1140a-b for the message requirements of the second protocol (e.g., Diameter), re-encode the decoded message to implement the second protocol and send the re-encoded message to the destination node.

In various embodiments, the first protocol may be the same as the second protocol, a subset of the second protocol, a superset of the second protocol, compatible with the second protocol, or completely independent of the second protocol.

In an embodiment, the DCR core 1114 may perform protocol translation operations even when the first and second protocols are compatible or the same. Often, nodes/logical components (e.g., 902a-906d) vary in their implementation of the same set of standards, especially when the nodes/logical components (e.g., 902a-906d) are manufactured by different vendors. For example, a vendor's implementation of a standard may be less than compliant to the standards, outdated, contain proprietary extensions to the standard, or the standards may have changed since the nodes were deployed. In such cases, messages originating from a source node may not be accepted by a destination node, even though both the source node and the destination node implement the same protocol. In an embodiment, the DCR core 1114 changes the values of the Diameter message. In doing so, the DCR core 1114 may perform operations of: receiving and decoding a Diameter message; decoding the AVPs contained therein; examining the contents of the AVPs; identifying a destination node; identifying the values/fields that need to be added, removed, and/or changed in order for the message to be accepted by the identified destination node; requesting information from the internal and/or external resources; augmenting the message by adding, removing, or changing the identified values/fields; re-encoding the AVPs into a Diameter message that conforms to the standards; and sending the message to the destination node.

As mentioned above, the dynamic context router may perform routing operations, e.g. proxy, relay, and redirect operations. In order to perform these routing operations, the DCR core 1114 may determine if the message to be routed contains information identifying a specific destination host. If the message identifies a specific destination host, then the DCR core 1114 may forward the message to the specified destination host (e.g., 906a). If the message does not identify a specific destination host, then the DCR core 1114 may analyze the message to determine if the message contains information identifying a specific destination realm to which the message is to be sent. If the message identifies a specific destination realm, the DCR core 1114 may perform one or more routing/load balancing operations to identify a suitable destination host, supplement the message with additional information (e.g., augment the message), and send the message to the identified destination host.

As part of the context routing operations, the DCR core 1114 may communicate with external resources (e.g. 1108, 1110, etc.) to receive the additional information that may be used to augment the messages and/or aid the context routing decisions. For example, the DCR core 1114 may generate one or more keys based on values/fields of the decoded messages and send the generated keys to the external resources (e.g., 1108, 1110, etc.). The external resources (e.g., 1108, 1110, etc.) may use the keys to locate (e.g., lookup, pull, etc.) supplementary information that may be used to aid the routing/load balancing operations and send the supplementary data to the DCR core 1114. The DCR core 1114 may receive the supplementary information, identify the proper destination host, add the information to the message, and send the augmented message to the proper destination host.

As mentioned above, the DCR may send and receive messages to and from any Diameter application, as well as other similar protocols (e.g., SOAP, RADIUS, HTTP, etc.). Also as mentioned above, the DCR may send and receive messages from network nodes (e.g., a subscriber profile repository, an online charging system, etc.) and may route messages to and from such nodes. In an embodiment, the DCR core 1114 communicates with a subscriber profile repository (e.g., SPR 122 discussed above with reference to FIG. 7B) and uses the information contained therein (e.g., subscriber information) to augment the messages and/or identify a destination node. In an embodiment, the DCR core 1114 communicates with an online charging system (e.g., OCS 120a-c discussed above with reference to FIG. 7B) and uses the information contained therein (e.g., charging information) to augment the messages and/or identify a destination node. In an embodiment, the DCR core 1114 accesses an off-line charging system (e.g., OFCS 118a-c discussed above with reference to FIG. 7B) and uses subscriber billing/charging information to augment the messages and/or identify a destination node.

As previously discussed, nodes/logical components (e.g., 902a-906d) may vary in their implementation of the same set of standards, especially when they are manufactured by a number of different vendors. In some cases, different instances of the same component may vary in their implementation of the same standard even when manufactured by the same vendor. For example, vendors typically upgrade their components piecemeal, as opposed to all-at-once, and it may take the vendors a number of years to fully upgrade all of their components. During this time, the upgraded components may use a newer, updated, or modified version of the standards (e.g., updated message structure, rules, etc.) compared to the yet-to-be upgraded components (i.e., the unimproved components). Since the newer/upgraded components use a different version of the standards than the older/unimproved components, during the upgrade period, the vendor may reduce complete dictionaries to partial dictionaries. In such cases, the partial dictionary is created out of necessity because the information stored in the complete dictionary cannot fully describe both the newer standards and the older standards, both of which exist simultaneously in the network. The various embodiments may address such situations by performing protocol translation operations to cause the different versions to interoperate, by utilizing peer specific dictionaries, by performing partial decoding operations and/or by performing tolerant decoding operations. The partial decoding operations may include using a partial dictionary and/or only decoding parts of the message, as discussed in more detail above.

In an embodiment, the dynamic context router may operate in an opaque proxy mode that supports piecemeal upgrades. The opaque proxy mode may be logically situated between the relay and proxy modes. The dynamic context router may operate in an opaque proxy mode when the dictionary information is insufficient and/or when the dynamic context router system seeks to improve performance (e.g., intentional partial dictionary).

The dynamic context router may perform tolerant decoding operations, which may be performed as part of the opaque proxy operations. The tolerant decoding operations may include decoding the complete message while allowing errors to exist (e.g., tolerating errors). For example, the rules specified in the complete dictionary may be relaxed to allow messages with missing mandatory AVPs (or messages with AVPs in the wrong position) to be processed as if they do not include errors.

As discussed above, the dynamic context router may decode only a portion of the Diameter messages. When dynamic context router operates in the opaque proxy mode (i.e., as an opaque proxy agent), the dynamic context router may access a partial Diameter dictionary and decode only those fields available to it (e.g., inadvertent partial dictionary) or only those fields required by the destination node (e.g., intentional partial dictionary). For example, if a partial dictionary provides only five (5) out of ten (10) total definitions, instead of sending an error message to the source node, the dynamic context router may decode the message using the available definitions and leave the rest of the message in the original format (e.g., binary wire format). The dynamic context router may then re-encode the decoded portions, couple them to the un-encoded portions to create an opaque message, and send the opaque message to a destination node. If, in response to sending the opaque message, the dynamic context router receives an error message from the destination node, the dynamic context router may re-process the message by accessing a complete dictionary and perform a full decoding operation (e.g., in the case of intentional partial dictionary), or send an error message to the source (e.g., in the case of an inadvertent partial dictionary).

In an embodiment, the dynamic context router system may perform routing/load balancing operations by hierarchy. For example, the dynamic context router system may organize the network topology into a logical structure that facilitates load balancing and high availability. The logical structure may define the nodes/resources available to the dynamic context router system and enable the dynamic context router system to quickly and efficiently locate nodes/resources. The logical structure may also identify available alternatives to each node/resource for fail-over operations, support the intelligent placing of new assets in peer groups, allow for dynamic addition/removal of nodes/resources to the dynamic context router network, and support intelligent routing between dynamic peers. In an embodiment, the logical structure may be a topology tree stored in memory.

Figure 12:
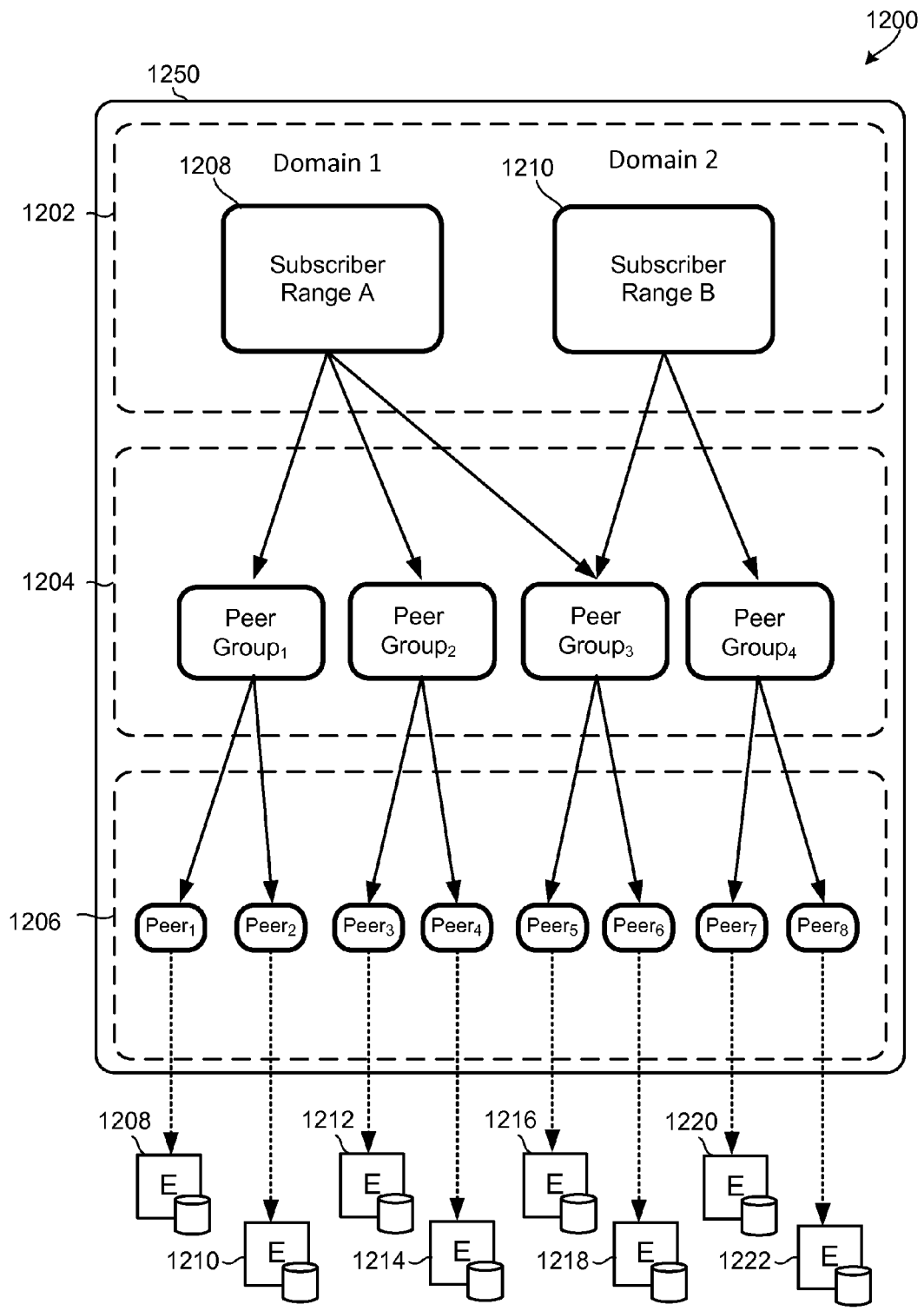
FIG. 12 is an illustration of an example dynamic context router topology tree that may be used for performing routing and load balancing operations by hierarchy in accordance with various embodiments.

FIG. 12 illustrates an example DCR topology tree 1200 that may be used by the dynamic context router for performing routing/load balancing operations by hierarchy. FIG. 12 also illustrates example DCR logical components 1250 for performing operations on the DCR topology tree 1200. The DCR logical components 1250 may include a business logic module 1202, a peer group-level module 1204 and a peer module 1206.

It should be noted that the DCR topology tree 1200 may be implemented using a wide variety of data structures, including arrays, trees, linked-lists, maps, vectors, and graphs. The DCR topology tree 1200 may be configured to support root nodes, internal nodes and terminal nodes. The DCR topology tree 1200 may be configured to allow each node to have more than one parent. The DCR topology tree 1200 may be configured to allow multiple root nodes. Thus, in various embodiments, the DCR topology tree 1200 may be implemented using a wide variety of data structures (e.g., arrays, trees, graphs, etc.) and is not limited to a tree structure.

In an embodiment, the DCR topology tree 1200 may include domains as root nodes, at least one peer-group as an internal node for each of the one or more domains, and at least one peer as a terminal node for the at least one peer-group. In an embodiment, the dynamic context router may perform application level routing operations to identify a root node in the topology tree and identify a terminal node destination component using the identified root node and hierarchical groups of the topology tree. In an embodiment, identifying a terminal node destination component using the identified root node and the hierarchical groups of the topology tree includes identifying and selecting the root node by performing business rule operations, identifying and selecting internal nodes by performing at least one of partitioning operations and availability operations and identifying and selecting the terminal node based on load balancing requirements.

Returning to FIG. 12, the DCR topology tree 1200 may be arranged such that peer nodes (e.g., peers 1-8) are grouped into peer groups (e.g., peer groups 1-4), and peer groups are grouped into domains (e.g., domain 1, domain 2) 1208, 1210. The peer nodes may be grouped such that each peer node belonging to a particular peer group is capable of performing the same functions as every other peer node belonging to the same peer group. Sine all of the nodes may be equivalent, this grouping enables the performance of efficient load balancing operations. Domains within the DCR topology tree may be defined according to business rules, e.g. domains can represent geographical areas, datacenters, subscriber ranges, and/or other any other logical group. Each peer may represent a destination node 1208-1222 and/or contain a reference to a destination node 1208-1222. In an embodiment, each peer group may belong to more than one domain, and each peer may belong to more than one peer group. In an embodiment, peer groups may belong to other peer groups, which may facilitate embodiments having multiple layers of internal nodes.

Each peer group may advertize itself as being in either an available state or in a not-available state. Each peer group may define the number peer nodes that need to be available before the peer group changes its state from not-available to available. Thus, Peer groups may be defined up front; pre-configured peers may be added up front; and non pre-configured peers may be added to peer-groups at run time via regular expression matching.

The business logic module 1202 may select a domain 1208, 1210 by performing business-level operations by defining a set of rules, regular expressions and/or patterns. In an embodiment, the peer group-level module 1204 may select a peer group by availability (e.g., first available in a chosen domain). Within the selected peer group, a specific peer node may be chosen according to a configured load balancing algorithm.

In an embodiment, the topology tree may be created such that peers are explicitly configured to belong to peer groups when the peers are added. In an embodiment, the topology tree may be created such that peers may be assigned to peer groups based on the regular expression method. In an embodiment, the rules, regular expressions and/or patterns for the intelligent placing of new assets in peer groups may be defined in a configuration file accessible to the operator network.

Peer nodes may be pre-configured such that the nodes are placed into a particular peer group as they are added to the topology tree. For example, a peer node may define a specific host and realm, which may be used by the dynamic context router to place the node within a particular peer group in the topology tree. Peer nodes that connect to the dynamic context router system without having been pre-configured to be placed explicitly in a specific peer group may be inserted into the topology tree by matching their host and realm information to a peer group using a regular expression template. The dynamic context router may add each type of peer node (e.g., pre-configured, dynamically defined, etc.) in a manner that allows both types of peer nodes to exist within in the topology tree.

In certain situations, a Diameter message may be routed to a peer node that fails before a response is received by the dynamic context router. In such situations, the dynamic context router may coordinate failover operations by re-traversing the topology tree to find an appropriate alternative peer to which to resend the message. For example, if a selected peer node fails, the dynamic context router may traverse up the DCR topology tree 1200 to identify the peer group to which the failing peer node belongs, identify another available peer node within that peer group. If no peers are available in the peer group, the dynamic context router may traverse another level of the hierarchy tree to identify the first available peer group within the same domain, and traverse down the tree to a peer node within the identified peer group.

In an embodiment, the DCR topology tree 1200 may be generated or updated as part of the dynamic context router performing general processing and routing operations. For example, the dynamic context router may annotate peer destinations as they are processed to create one or more logical overlay networks, which may be represented by the DCR topology tree 1200. The logical overlay networks may lend themselves to simpler routing configurations by allowing routing logic to refer to an entire logical network, instead of having to refer to each constituent destination. For example, if it is determined that a certain geographical area is under heavy load, the dynamic context router may change one or more global context settings for that geographical area to allow multiple applications and routes to be updated in the DCR topology tree 1200, thereby avoiding the congested area (i.e., the geographical area under heavy load).

In an embodiment, the dynamic context router may prioritize the peers within a peer group. In an embodiment, the dynamic context router may give each of the peers within a peer group equal priority, while in other embodiments peers may be prioritized in a flexible manner. In an embodiment, the dynamic context router may create logical sub groupings of the peer nodes. For example, the dynamic context router may group peer nodes at various locations around the topology by annotating them as belonging to a group (e.g., "New York," "Data Center X," etc.). In this manner, the dynamic context router can control a large number of independent peers and control the execution of many different routing rules through a single command (e.g., "avoid New York").

As discussed above, the business logic module 1202 may select a domain 1208, 1210 by performing business-level operations, which may be defined by configuration. Allowing the business-level operations to be based on the configuration provides a flexible method of grouping destinations so that the routing operations may select a suitable destination node based on a number of factors. For example, the DCR system may be configured to define the domains 1208, 1210 to represent a subscriber range (e.g., subscriber range A, subscriber range B), in which case, geography only comes into play at the peer group-level module 1204. In this manner, the DCR system may be configured to provide geo-redundancy, load balancing and/or failover capabilities within a single datacenter, as required.

In an embodiment, the dynamic context router may perform message destination address hunting operations within a network when that information is not ascertainable from the message itself. As discussed above with reference to FIG. 9, every instance of a node (e.g., destination nodes 906a-d) may maintain data that is unique to each node/subscriber/session, and some messages must be routed to a specific instance to access this data. However, on some occasions, the correct instance of the destination node cannot be ascertained from the information included within the message or otherwise available to the dynamic context router. If the decoded message does not include information identifying a specific realm or destination node, and information retrieved from the external and internal resources (e.g., reference databases, session stores, etc.) is not sufficient to identify a proper destination node, the dynamic context router may perform one or more hunting operations to locate the proper instance of the destination node.

Figure 13:
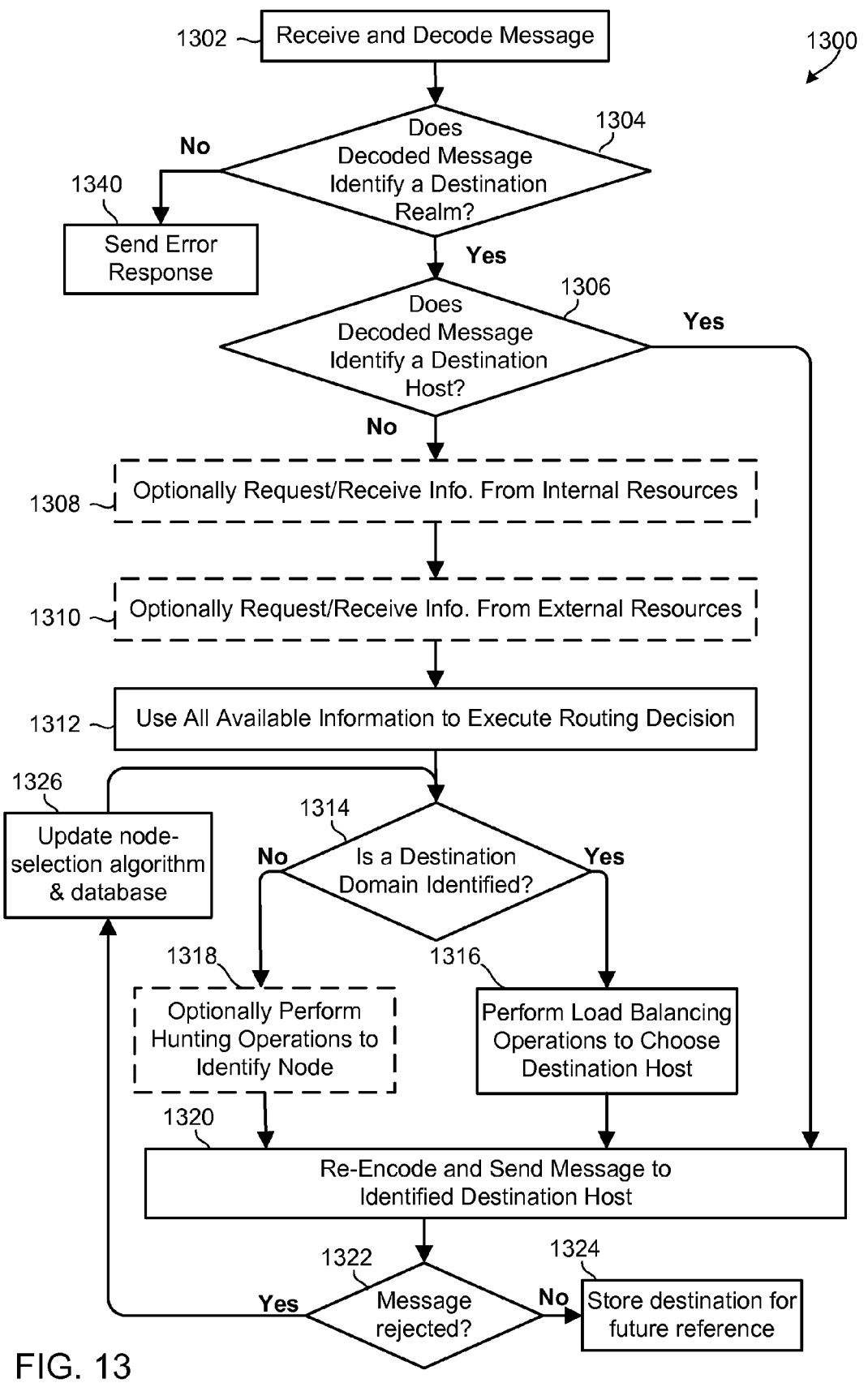
FIG. 13 is a process flow diagram illustrating an embodiment dynamic context router method for processing Diameter messages in accordance with various embodiments.

FIG. 13 illustrates a dynamic context router (DCR method 1300 for receiving and sending Diameter messages in accordance with an embodiment. In step 1302, the dynamic context router may receive and decode a Diameter message. In determination step 1304, the dynamic context router may determine if the decoded message identifies a destination realm. If the decoded message does not identify a destination realm (i.e., determination step 1304="No"), in step 1340, the dynamic context router may send an error response message to the network node from which the message was received. If, on the other hand, the decoded message does identify a destination realm (i.e., determination step 1304="Yes"), in determination step 1306, the dynamic context router may determine if the decoded message identifies a destination host. If the decoded message identifies a destination host (i.e., determination step 1306="Yes"), in step 1320 the dynamic context router may re-encode the message into a proper format and/or send the re-encoded message to the identified destination host. If the decoded message does not identify a suitable destination host (i.e., determination step 1306="No"), in step 1308, the dynamic context router may request/receive information from internal resources if needed. In step 1310 the dynamic context router may request/receive information from external resources if needed. In step 1312, the dynamic context router may use all of the information available (e.g., information from the message, internal memories, external resources, etc.) to perform application-level routing operations as discussed above.

In determination step 1314, the dynamic context router may determine if the above-mentioned routing operations identify a suitable destination domain. If the routing operations identify a suitable destination domain (i.e., determination step 1314="Yes"), in step 1316, the dynamic context router may perform load balancing operations to choose a destination host (e.g., a specific instance of a network node). If the routing operation does not identify a suitable destination domain (i.e., determination step 1314="No"), in step 1318, the dynamic context router may perform message destination hunting operations to identify a destination host (if configured to do so), and in step 1320, re-encode and send the message to the destination node identified from such hunting operations.

The node-selection operations may include selecting a node from the hierarchy tree, selecting a node based on heuristics, selecting the first available node, selecting a random node, performing a routing operation, performing a randomization operation, and/or performing a learning operation. Using one of these methods, the dynamic context router may select a node, encode the message into a suitable format/protocol, send the message to the selected destination node, and wait for a response from the destination node. In determination step 1322, the dynamic context router may determine whether it a negative response from the selected destination node, such as the selected destination node rejects the message. If the dynamic context router receives a message acknowledgement or otherwise does not receive a negative response from the selected destination node (i.e., determination step 1322="No"), which indicates that the correct destination node has been identified, the dynamic context router may store information correlating the subscriber and/or session to the correct destination node in a cache memory (e.g., cache memory 1016) in step 1324 so that all future messages associated with that subscriber and/or session may be sent to that same node.

However, if the dynamic context router receives a negative response from the selected destination node (i.e., determination step 1322="Yes"), the dynamic context router may add the selected node to a "do-not-use" list in memory, and update the node-selection algorithm in step 1326. In an embodiment, the "do-not-use" list may be a list of destination nodes known not to be correlated to certain subscribers/sessions, which the dynamic context router may reference to exclude certain nodes for future consideration. In an embodiment, adding the selected node to a "do-not-use" list in memory may include performing operations for updating a topology tree stored in memory to include or exclude the selected node. After receiving a negative response and updating the memory/algorithms in step 1326, the dynamic context router may un-select the node and repeat the above-mentioned process with the updated memory/algorithms by returning to determination step 1314 or step 1318. This process may continue until a correct destination node has been identified, as indicated by the message being accepted (i.e., determination step 1322="No"). Again, the dynamic context router may store information correlating the subscriber and/or session to the correct destination node in a cache memory (e.g., cache memory 806) in step 1324 so that all future messages associated with that subscriber and/or session may be sent to that same node.

Figure 14:
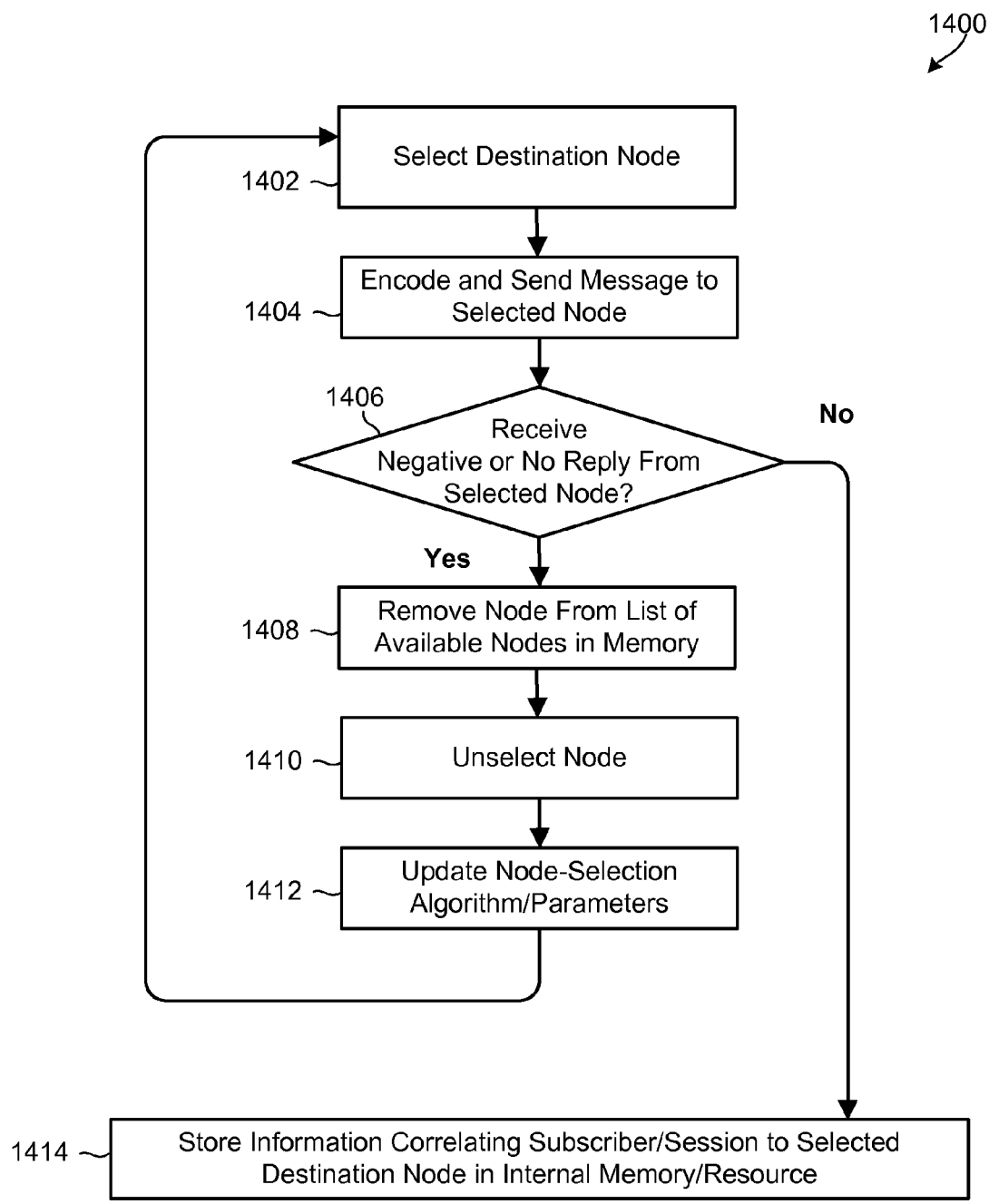
FIG. 14 is a process flow diagram illustrating an embodiment dynamic context router method for performing hunting operations in accordance with various embodiments.

Message destination hunting operations may include checking (e.g., via customer routing logic) a user defined cache (e.g., user defined caches 2024 illustrated in FIG. 20) to determine if a destination for a particular subscriber being routed is already known. FIG. 14 illustrates in more detail a dynamic context router (DCR) method 1400 for performing message destination hunting operations. In step 1402, the dynamic context router may select a destination node. In step 1404, the dynamic context router may encode the Diameter message into the correct format/protocol and send the message to the selected node. In determination step 1406, the dynamic context router may determine if a reply has been received from the selected node. If a positive reply has been received from the selected node (i.e., determination step 1406="No"), in step 1414, the dynamic context router may store (e.g., in an internal memory or resource) information correlating subscriber and/or session information to the selected destination node, and terminate further destination hunting operations for the received message. If, on the other hand, either a negative reply has been received or no reply has been received from the selected node (i.e., determination step 1406="Yes"), in step 1408, the DCR may remove the selected node from a list of available nodes, which may be stored in an internal memory. In step 1410, the dynamic context router may unselect the selected node. In step 1412, the dynamic context router may update its node selection algorithms and parameters and re-initiate the node-selection operations (step 1402).

In an embodiment of message destination hunting operations, the dynamic context router may generate a list of possible destinations and route the message to the first destination on the list in steps 1402 and 1404. In this embodiment, the dynamic context router may issue a request to the Diameter library to store the rest of the list in an outstanding transactions queue. In determination step 1406, the dynamic context router system may examine (e.g., via custom logic in the response handling module/pipeline described below) response messages received in response to routing the message to the first destination. If a response message indicates "success" (i.e., determination step="No"), the dynamic context router system may terminate further hunting operations and update the user defined cache in step 1414. If, on the other hand, the responses indicate that the message was not successfully transmitted to an appropriate destination node (i.e., determination step="Yes"), the dynamic context router system may determine if there are more destinations in the generated list, select the next destination from the list, and send the message to the selected destination as part of re-performing step 1402. This process of steps 1402 through 1412 may be repeated until a "successful" response message is received (i.e., an appropriate destination node is discovered) or until all of the destinations in the list have been attempted (e.g., list is empty). If there are no more destinations, then the dynamic context router system may deem the hunting operations as unsuccessful and send an error to the originating node.

In an embodiment, as part of performing the message destination hunting operations, the dynamic context router may perform operations that implement a randomization algorithm. The randomization algorithm may use parameters (e.g., uniformly random parameters, concentration parameters, etc.) to guide the dynamic context router's node-selection behavior. The randomization parameters may be selected/updated such that the average-case node-selection performance is greater than selecting the nodes at random.

In an embodiment, the hunting operations may include identifying and selecting nodes based on network latency, node performance, speed, capacity, workload and/or availability. In this manner, if the selected node is not the correct destination, the dynamic context router may quickly receive the rejection response and update the memories/algorithms accordingly.

In an embodiment, the hunting operations may continue for a predetermined amount of time or until the correct instance is identified. In an embodiment, the message destination hunting operations may implement one or more learning algorithms. In an embodiment, the hunting operations may be based on heuristics.

In various embodiments, the message destination hunting operations may be performed to locate information for a particular subscriber or a session. For example, if subscriber related information is partitioned across multiple data nodes and messages need to be routed to a particular node based on the location of the subscriber information, subscriber-based hunting algorithms may be applied to avoid provisioning all nodes with information about the employed partitioning scheme. Likewise, if an ephemeral session state is maintained in a particular network node and other network nodes need to either query or update that session state, the node location may be unpredictable (e.g., due to a non-deterministic routing during session set-up). In such cases, session hunting algorithms may be performed to locate a node storing the pertinent session information.

In an embodiment, the caching operations may be integrated with message destination hunting operations.

As discussed above, telecommunications operator networks are expanding. As these networks expand and new resources are introduced, it is more likely that a component (server, processor, hard drive, DCR core, memory, etc.) in the system will fail. The various embodiments enable management of component failure by configuring dynamic context routers to perform failover operations that automatically switch over to a redundant component (e.g., blade, server, DCR core, memory, network node, etc.) upon the failure or abnormal termination of a component. The dynamic context router may be configured to perform multi-level and multi-tier failover operations to ensure continued operations in the event of multiple component failures. Moreover, the various embodiments provide scalable, distributed, highly available dynamic context router systems capable of fast and efficient expansion by supporting the addition of resources (e.g., additional cores, memories), while maintaining high-availability.

Figure 15A:
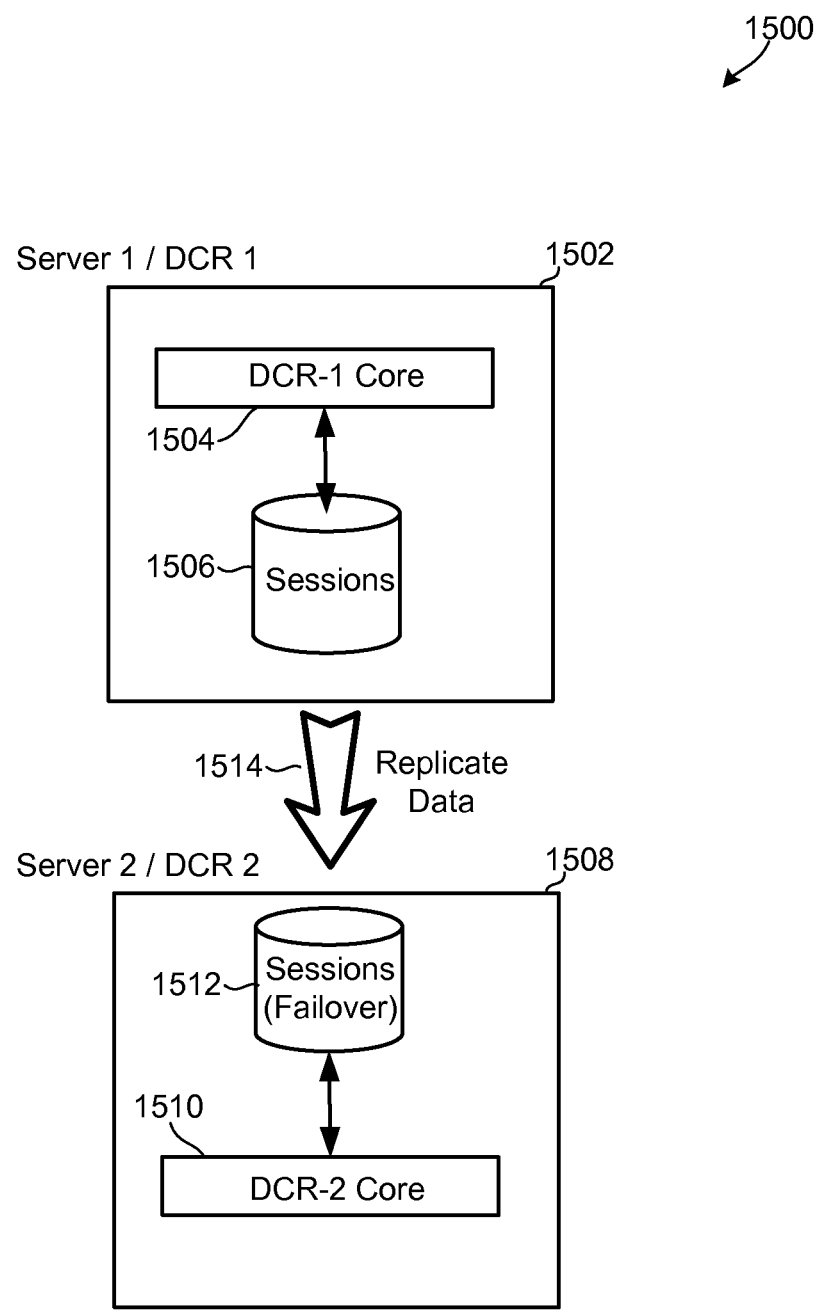
FIGS. 15A-17C are network architectural diagrams illustrating logical components and information flows of example dynamic context router systems configured to perform failover operations in accordance with various embodiments.

FIGS. 15A-17C illustrate example logical components and information flows in embodiment DCR systems that perform failover operations and maintain session state information in the event of a component failover. FIG. 15A illustrates example logical components in a DCR system 1500 configured to maintain session state information in the event of a failover. The DCR system 1500 may include one or more pairs of servers/DCRs, each pair including a first DCR 1502 having a first DCR core 1504 and a first memory 1506 and a second DCR 1508 having a second DCR core 1510 and a second memory 1512. The first and second memories 1506, 1512 may be any internal resource (e.g., reference database 1102, session stores 1104, cache 1106 discussed above with reference to FIG. 11) for storing information.

The DCR system 1500 may also include a communication link 1514 connecting the first and second DCRs 1502, 1508. The second memory 1512 may store a replica of the information stored by the first memory 1506, which may be initiated by the DCR system. In an embodiment, the communication link 1514 may connect the first and second memories 1506, 1512 on the first and second DCRs 1502, 1508 such that any information added to the first memory 1506 is automatically added to the second memory 1512. Likewise, any information removed/expired from the first memory 1506 may be automatically removed/expired from the second memory 1512.

Session information may be stored in the first and second memories 1506, 1512 using a structure (e.g., associative array, hashtable, tree, etc.) that allows the sessions to be quickly located and retrieved from the memories. In an embodiment, the first and second memories 1506, 1512 may store information so that the same decision logic locates the stored information in each physical memory. In this manner, the logic used to locate the session states in memory is the same for both memories, despite the session state information being physically stored in separate memories (e.g., first and second memories 1506, 1512).

Figure 15B:
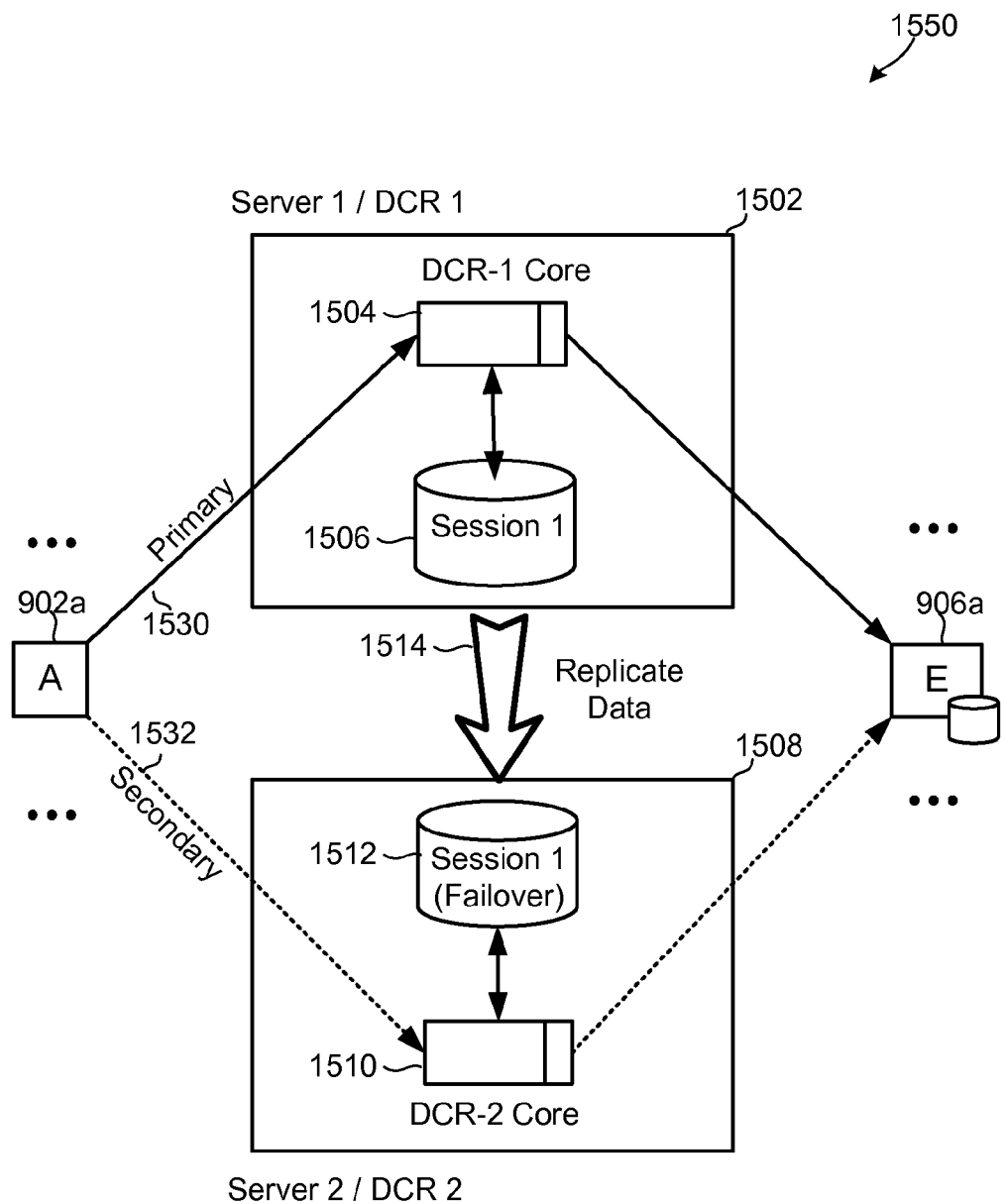

FIG. 15B illustrates example information flows in an example DCR system 1550 configured to maintain session state information in the event of a failover. Specifically, FIG. 15B illustrates that a source node 902a may send a signaling message to the first DCR core 1504 over a primary communications link 1530 and maintain a reference to a secondary communication link 1532 to the second DCR core 1510. The first DCR core 1504 may receive the message, identify a proper destination node (e.g., 906a) and/or perform other DCR operations on the message. The first DCR core 1504 may also establish session stickiness by storing session information (e.g., session 1) in the first memory 1506, which is automatically replicated in the second memory 1512 via the communication link 1514.

If the first DCR core 1504 fails or does not respond to the source node 902a in a predetermined amount of time, the source node 902a may fail over to the second DCR core 1510 by sending the signaling message over the secondary communication link 1532. Since the second memory is a replicate of the first memory 1506, the second DCR core 1510 may retrieve the session information from the second memory 1512 and perform any and all operations originally requested from the first DCR core 1504, including sending the message to the destination node 906a. In this manner, session state is maintained and the DCR system is resilient to the failure event.

It should be understood that the DCR systems discussed herein may operate in both an active-hot standby configuration, as well as in an active-active configuration, and that each of the DCR cores may simultaneously serve as both a primary DCR core and a secondary DCR core.

Figure 15C:
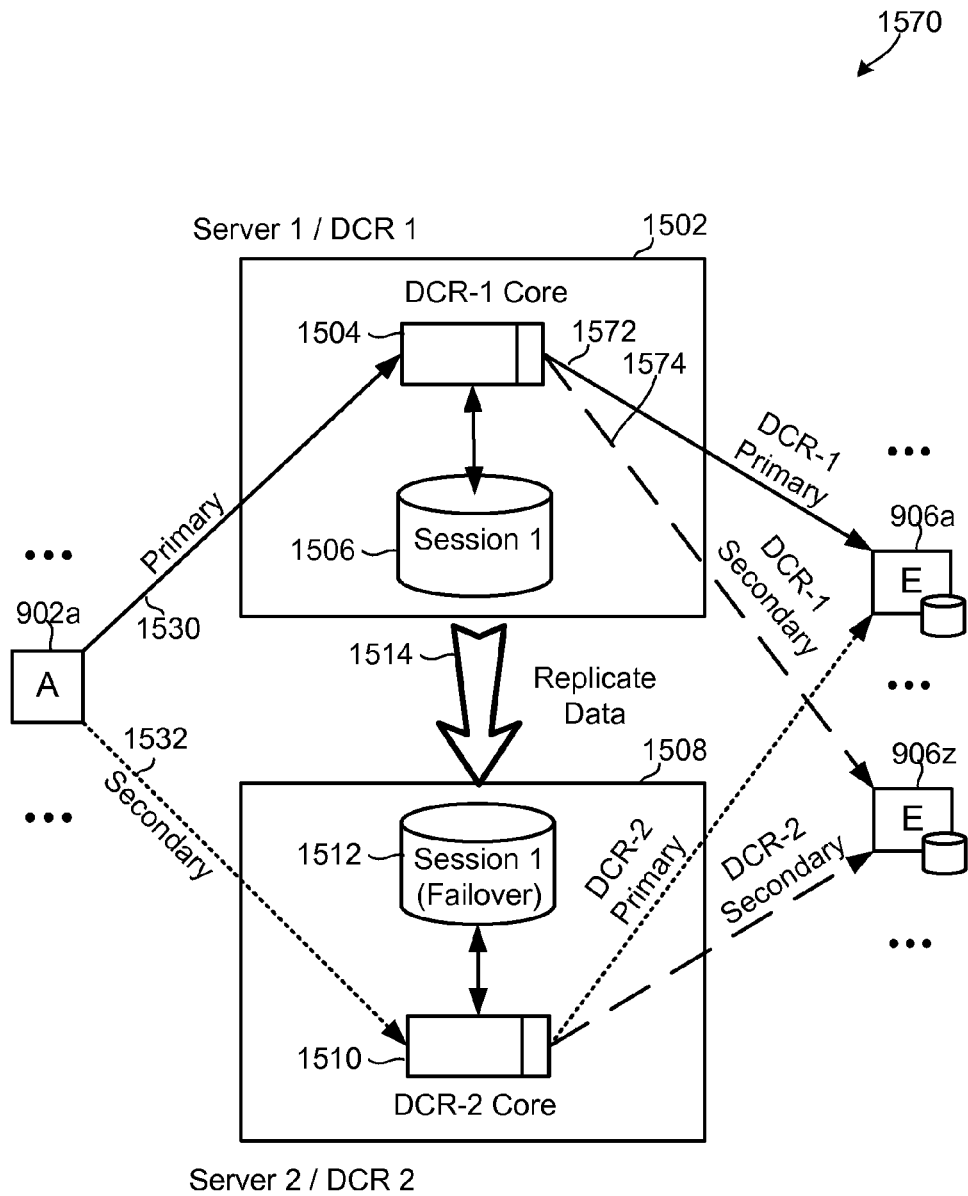

FIG. 15C illustrates example information flows in an embodiment DCR system 1570 configured to provide failover support on two layers. Similar to the system described above, the source node 902a sends a signaling message to the first DCR core 1504 over the primary communications link 1530 and maintains a reference to the secondary communication link 1532 to the second DCR core 1510. The first DCR core 1504 receives the message and performs DCR operations, which may include identifying suitable destination nodes and storing session information (e.g., session 1) in the first memory 1506, which is automatically replicated in the second memory 1512 via communication link 1514. The first and second memories 1506, 1512 and the primary and secondary communication links 1530, 1532 provide a first layer of failover support.

In the illustrated example of FIG. 15C, the DCR core sends messages to destination node 906a using DCR-1 Primary. When destination node 906a becomes unresponsive, the DCR may select destination node 906z (using the topology tree) and start sending future messages to it using DCR-1 Secondary. In other words, destination node 906z may not be chosen before destination node 906a fails.

In the various embodiments, dynamic context routers may be grouped into pairs (DCR Pairs) such that each dynamic context router system includes an even number of DCR cores. This allows the session stores to be deployed in an active-hot standby configuration while the DCR cores operate in an active-active configuration. That is, each DCR core within the DCR Pair may remain active (i.e., may receive and process network traffic) while one session store within the DCR pair remains active and a second session store within the DCR pair remains on active standby.

Figure 16:
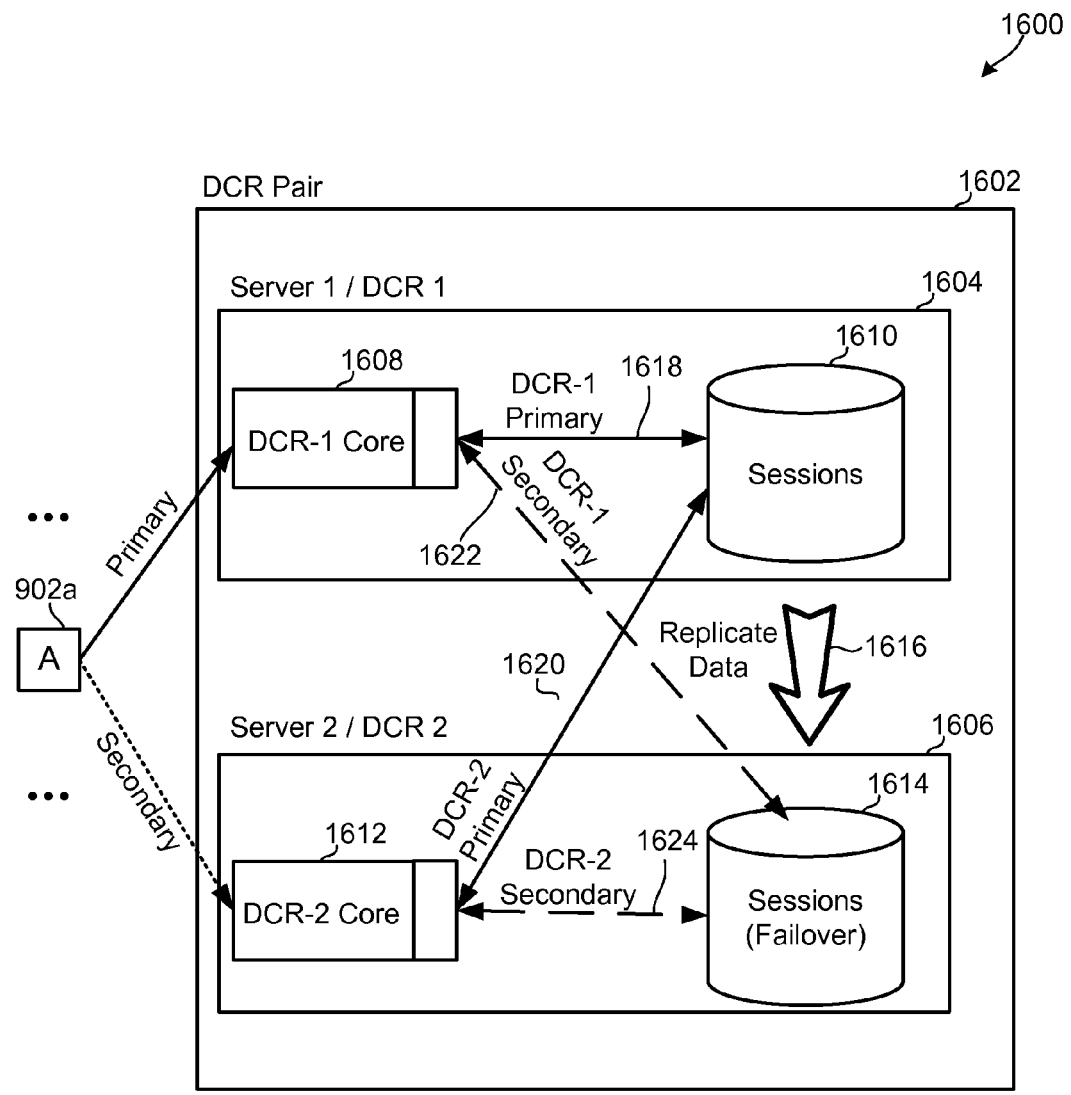

FIG. 16 illustrates logical components and informational flows in another example DCR system 1600 configured to maintain session state information in the event of a failover. The DCR system 1600 may include a DCR pair 1602 having a first DCR 1604 and a second DCR 1606. Similar to the DCR system 1500 described above, the first DCR 1604 may include a first DCR core 1608 and a first memory 1610, the second DCR 1606 includes a second DCR core 1612 and a second memory 1614, and a communication link 1616 connects the first DCR 1604 to the second DCR 1606, and information may be transferred such that the second memory 1614 contains a replica of the session information stored by the first memory 1610. The DCR system 1600 also includes primary communications links (DCR-1 Primary) 1618, (DCR-2 Primary) 1620 connecting the first and second DCR cores 1608, 1612 to the first memory 1610. Likewise, secondary communications links (DCR-1 Secondary) 1622, (DCR-2 Secondary) 1624 connect the first and second DCR cores 1608, 1612 to the second memory 1614. Each of the first and second DCR cores 1608, 1612 may remain active (e.g., receives and processes Diameter messages), while one of the first and second memories 1610, 1614 remains active. The non-active memory (e.g., 1610 or 1614) may remain in a standby mode.

A source node 902a may send a signaling message to the first DCR core 1608 over a primary communication link and maintain a secondary communication link to the second DCR core 1612. If the first DCR core 1608 fails or does not respond to the source node in a predetermined amount of time, the source node 902a may fail over to the second DCR core 1612 and send the signaling message using the secondary communication link. Likewise, both the first and second DCR cores 1608, 1612 may read and write information to the first memory 1610 (e.g., via the primarily communications links

1618, 1620). If the first memory fails, both the first and second DCR cores 1608, 1612 may fail over to the second memory 1614 to access the replicated data. In this manner, DCR system 1600 is resilient to the database/memories 1610, 1614 failing, the DCR cores 1608, 1612 failing, and the DCRs 1604, 1606 failing. In addition, the failure of any one component does not affect the availability of the other components.

Figure 17A:
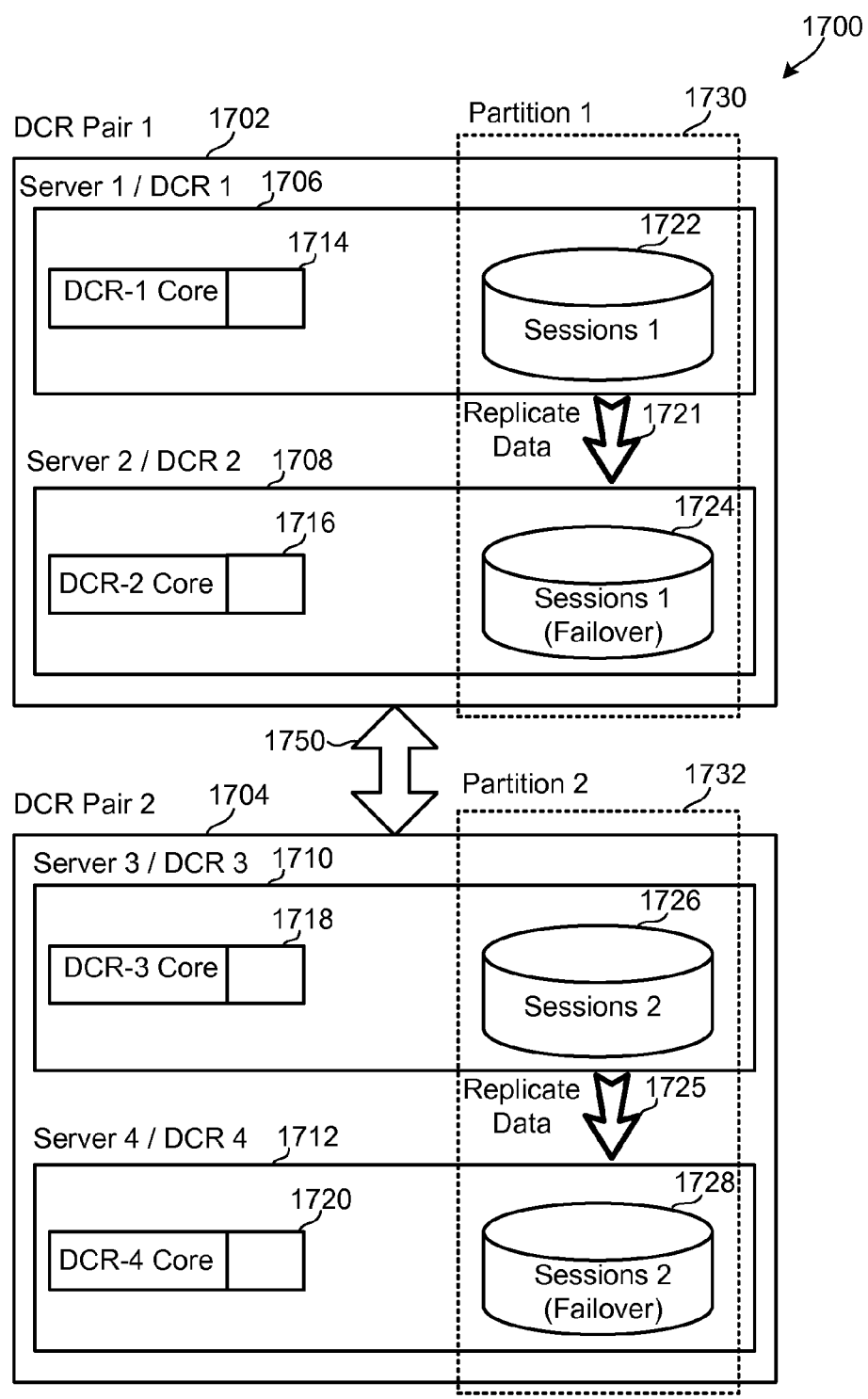
Figure 17B:
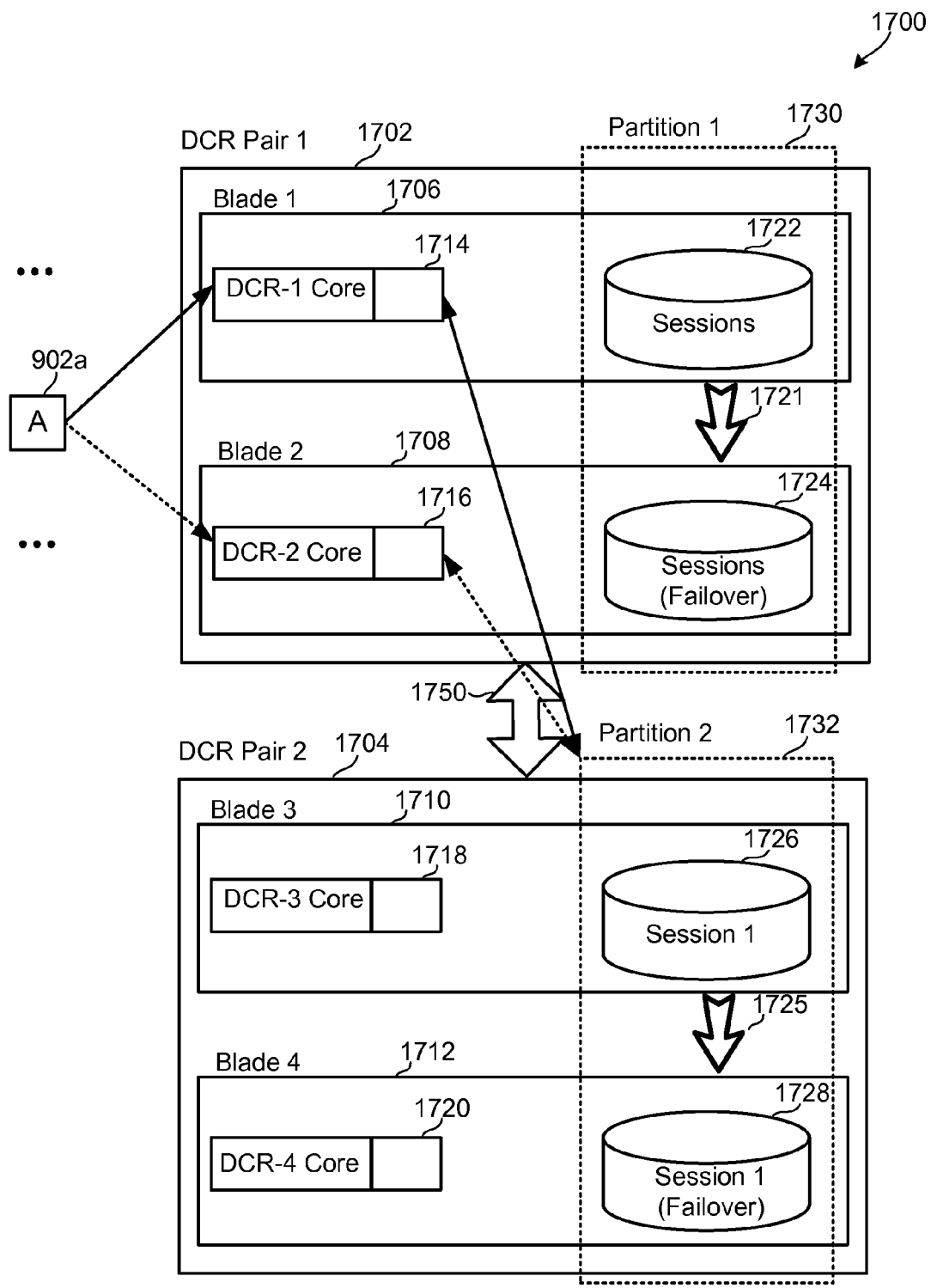
Figure 17C:
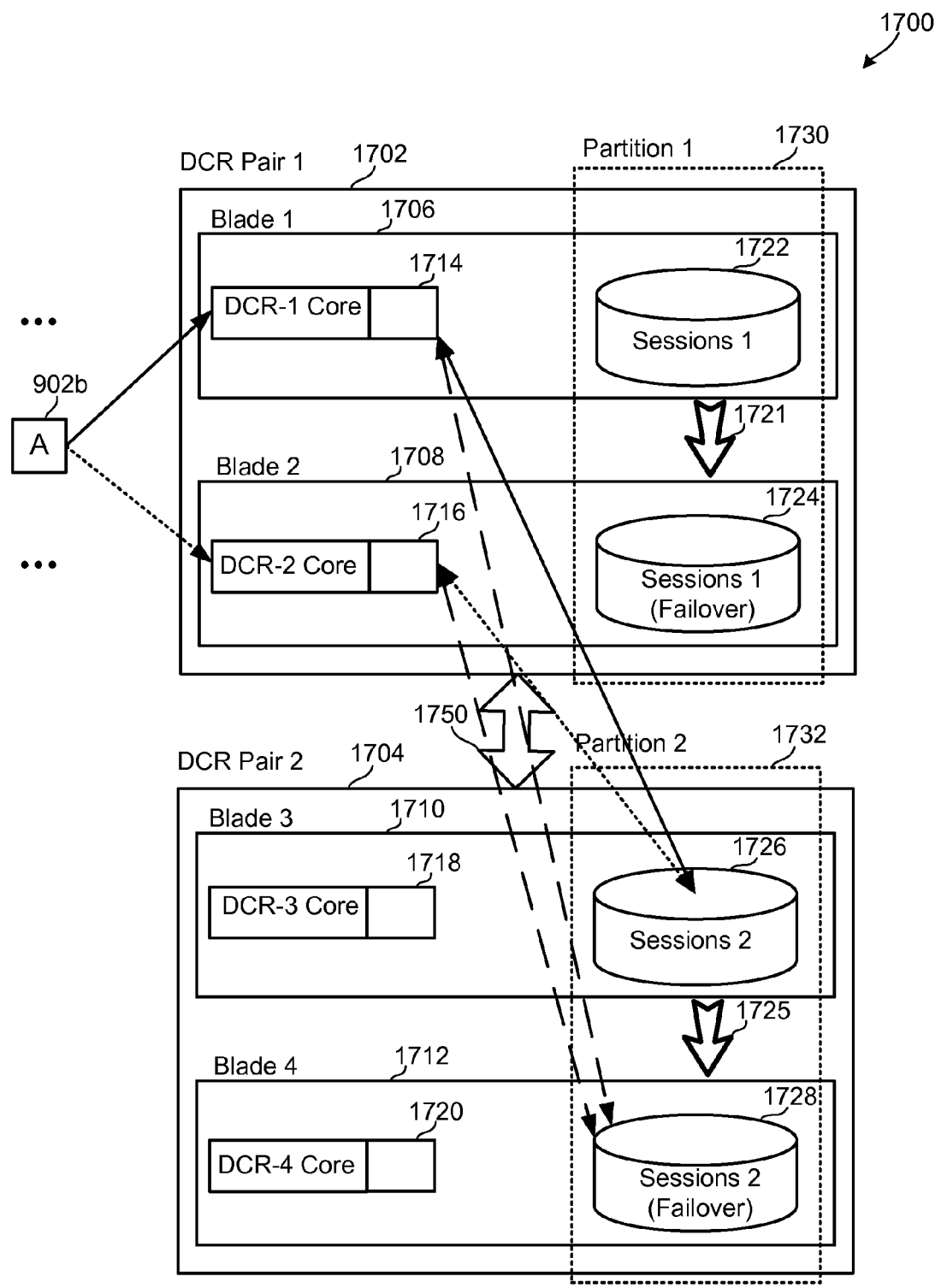

FIGS. 17A-17C illustrate example information flows and logical components in an example DCR system 1700 configured to provide failover support and maintain session state information across partitions (e.g., partitions 1730 and 1732). As discussed above, operator networks must expand to meet the increase in user demand, support the array of new services and provide fast, reliable communications. As the operator networks grow, more DCR components must be deployed in each DCR system. To support scalability, the various embodiments provide scalable DCR systems capable of partitioning resources (e.g., logically grouping resources physically located on different DCRs and/or included in different DCR pairs) and storing information across the network. In an embodiment, the partitioning of resources may include performing partitioning or domaining operations.

FIG. 17A illustrates example logical components that may be included in a scalable DCR system 1700 configured to maintain session state information across partitions. The DCR system 1700 may include a first DCR pair 1702 and a second DCR pair 1704. Each DCR pair 1702, 1704 may be similar to the DCR pair 1602 described above with reference to FIG. 16. For example, each DCR pair 1702, 1704 may include two DCRs (e.g., DCRs 1-2, 3-4) 1706, 1708, 1710, 1712, each DCR having a DCR core 1714, 1716, 1718, 1720 and a memory 1722, 1724, 1726, 1728. Each of the DCRs 1706, 1708, 1710, 1712 within the first and second DCR pairs 1702, 1704 may also be connected to each other by a communications link 1721, 1725 and the DCR cores 1714, 1716, 1718, 1720 may be configured to replicate the information stored in the primary memory (e.g., first memory 1722, third memory 1726) to the secondary memory (e.g., second memory 1724, fourth memory 1728). The first DCR pair 1702 may be connected to the second DCR pair 1704 via a communications link 1750. The first and second memories 1722, 1724 may be logically grouped together into a first memory group (i.e., the first partition 1730), and the third and fourth memories 1726, 1728 may be grouped together into a second memory group (i.e., the second partition 1732).

This architecture enables a greater level of redundancy and enables graceful failover operations in the event of failure of any one component. This is revealed by the information flows illustrated in FIGS. 17B and 17C.

FIG. 17B illustrates example DCR information flows in the DCR system 1700 in receiving messages from a source node 902a. Source node 902a may be configured to communicate with a particular DCR core as the primary DCR, and configured with a backup address to a secondary DCR core. Under normal circumstances, each source node will communicate with its primary DCR core. However, in the event that the primary DCR core is unavailable or does not respond to messages, the source node may begin communicating with its secondary DCR core. This is illustrated in FIG. 17 B by the source node 902a sending a signaling message to the first DCR core (DCR-1 Core) 1714 (illustrated with the solid arrow) while maintaining an address for a secondary DCR core (DCR-2 Core) 1716 (illustrated with the dotted arrow). While FIG. 17 B shows the secondary DCR core being positioned within the same DCR pair 1702, the primary and secondary DCR cores for any particular source node need not be within the same DCR pair, and may be located in other pairs (e.g., the secondary DCR core could be located in DCR pair 2 1704). Provisioning source nodes with primary and secondary DCR addresses is similar to the configurations discussed above with reference to FIGS. 15B, 15C and 16. In processing messages received from the source node 902a and performing DCR operations, the first DCR core 1714 storing session information within a primary memory, which may not be in the same DCR pair. Further, each DCR core may store session data in any one of the primary or secondary memories within the server. This may be implemented in a manner that spreads session data from all of the DCR cores among all of the primary memories in a semi-random manner. By distributing DCR core assignment and primary and secondary memory correlations across several DCR pairs within a given server installation may improve reliability and guard against systematic failures.

In an embodiment, the first DCR core 1714 may determine the particular primary memory or memory group for saving session data associated with a particular source node or even for a particular session by performing an address assignment operation. Thus, in the illustrated example of messages being received from source node 902a, the primary DCR core 1714 may perform an assignment operation on an address or session identifier portion of the received message to determine that associated session data should be stored in the second memory partition 1732. Using this addressing information, the primary DCR core 1714 stores the session information in the primary memory 1726 of the second memory partition 1732. As discussed above, the session data may be stored within the memory partition in the primary memory 1726, which may then be replicated in the secondary memory 1728. While not shown in this figure, when the primary DCR core 1714 receives messages associated with a different session, performing the address assignment operation may result in the session data being stored in memory partition 1 1730.

The address assignment function implemented on the primary DCR core 1714 may also be implemented on the secondary DCR core 1716, or on all the DCR cores within the network. This enables another DCR core (e.g., the secondary core 1716) to access session data (e.g., data stored in memory 1726) in the event that the source node 902a begins sending it messages related to a session originally managed by the primary DCR core 1714. This also enables another DCR core (e.g., the secondary core 1716) to access session data (e.g., data stored in memory 1726) in the event that a different source node references the same session as source node 902a begins sending it messages. Thus, by applying the same function to information contained in a portion of messages received from the source node 902a, the secondary DCR core 1716 may obtain the memory partition storing the associated session data without requiring any communication of memory addressing from the primary DCR core beforehand. This functionality enables the DCR core to resolve the Rx-Gx correlation problem that can arise when the source notes are the AF and the PCEF, for example.

FIG. 17C illustrates a message flow that may occur in the event that the primary memory 1726 within the second partition 1732 fails. As discussed above, the memory contents of the primary memory 1726 may be replicated to the secondary memory 1728 of the same partition. Thus, in an embodiment, memory accesses and storage communications from the primary DCR core 1714 directed to the memory partition 1732 may be serviced by the secondary memory 1728.

It should be appreciated that secondary DCR core assignments need not be fully redundant. Instead, each DCR core may serve as a primary DCR for a number of source nodes and as the secondary DCR for another group of source nodes. By distributing session data among memory partitions based upon an addressing function which uses information from received messages as the input, load-balancing and memory allocation can be accomplished autonomously in a manner which can avoid systematic failure while eliminating the need to share addressing information among the various DCR cores.

In the various embodiments, the DCR may be configured to divide (or "fork") a single request message (e.g., create a full or partial duplicate of the message, create child messages, etc.) that is destined for a single destination into multiple messages addressed to multiple destinations. As part of this message forking process, the dynamic context router may generate one or more child messages from the original message being forked (i.e., the parent message). Each resulting message (i.e., child message) may be equal to the original message, a subset of the original message, or contain additional information not contained by the original message.

Figure 18:
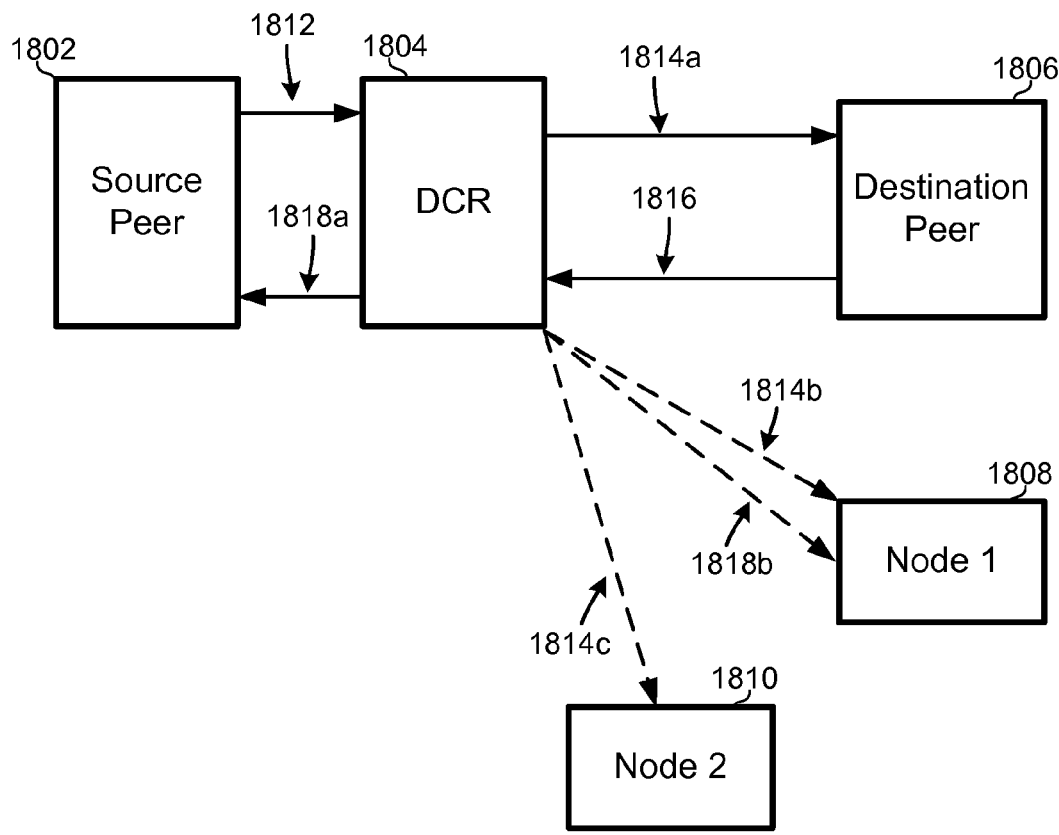
FIG. 18 is a network architectural diagram illustrating example logical components and information flows of an example dynamic context router system configured to perform fork routing operations.

FIG. 18 illustrates example logical components and data flows in a dynamic context router system 1800 configured to enable a single "request" message, as well as a corresponding "response" message, to be forked at the application level and distributed to one or more additional nodes in accordance with an embodiment. In the illustrated example, the dynamic context router 1804 communicates with a source peer 1802, a destination peer 1806, a first network node (Node 1) 1808, and a second network node (Node 2) 1810, each of which may be any of logical network components described above (e.g., PCEF, PCRF, OFCS, OCS, SPR, AF, etc.). The dynamic context router 1804 may receive (e.g., via data flow 1812) a request message from the source peer 1802 and perform operations to identify an appropriate destination peer 1806 to which the message is to be sent. The dynamic context router 1804 may send the request message (e.g., via data flow 1814a) to the identified destination peer 1806, send a duplicate of the request message (e.g., via data flow 1814b) to the first network node 1808, and send (e.g., via data flow 1814c) a new message containing values from the request message to the second network node 1810. The dynamic context router 1804 may receive (e.g., via data flow 1816) a response message from the destination peer 1806 and determine the appropriate source node to which the response message is to be sent (e.g., source peer 1802). The dynamic context router may send the response message (e.g., via data flow 1818a) to the identified source node (i.e., source peer 1802) and send a duplicate of the response message (e.g., via data flow 1818b) to the first network node 1808.

In an embodiment, the dynamic context router may be configured to discard responses to forked messages. For example, in such configurations, if the first network node (Node 1) 1808 generates a response to a request message sent via data flow 1814b, the dynamic context router may choose to not to send this message back to the source peer. In an embodiment, the dynamic context router may use information from the message (e.g., to update a cache that may be later utilized to make future routing decisions) before the message is discarded. In this manner, the first network node 1808 may be an existing network node that does not need to be informed that it has received a forked message (as opposed to a standard message). In an embodiment, such configurations may be used to perform operations for "hunting in parallel," in which a request may be sent to three candidate nodes, for example, and the first node to respond is used for further requests, while the two slower responses may be discarded.

When a parent message is forked into one or more child messages, each child message may be generated via any protocol/application/format supported by the dynamic context router. Each child message may be in the same format/protocol as the parent message, or in a different format/protocol than the parent. Multiple child messages may be generated from each parent. Each message may be sent to multiple destinations independent of the destinations of the other child or parent messages. Application level information from within received messages and/or contextual information (which may be obtained from one or more of the methods described above) may be used to determine which messages should be forked and which destination the forked messages are to be sent.

By forking request messages (as well as corresponding response messages) at the application level for distribution to additional nodes, the dynamic context router functions not only as an application-level router, but also as a source node capable of generating messages based on the content of the messages being routed. The forked messages (i.e., child messages) may be used, for example, by other network components to collect information about the type and content of messages being communicated. The dynamic context router's ability to generate new messages (via forking) in addition performing application-level routing operations allows the DCR system to provide operator networks with a level of functionality not typically provided by, or expected from, intermediate network nodes (e.g., application-level routers).

Figure 19:
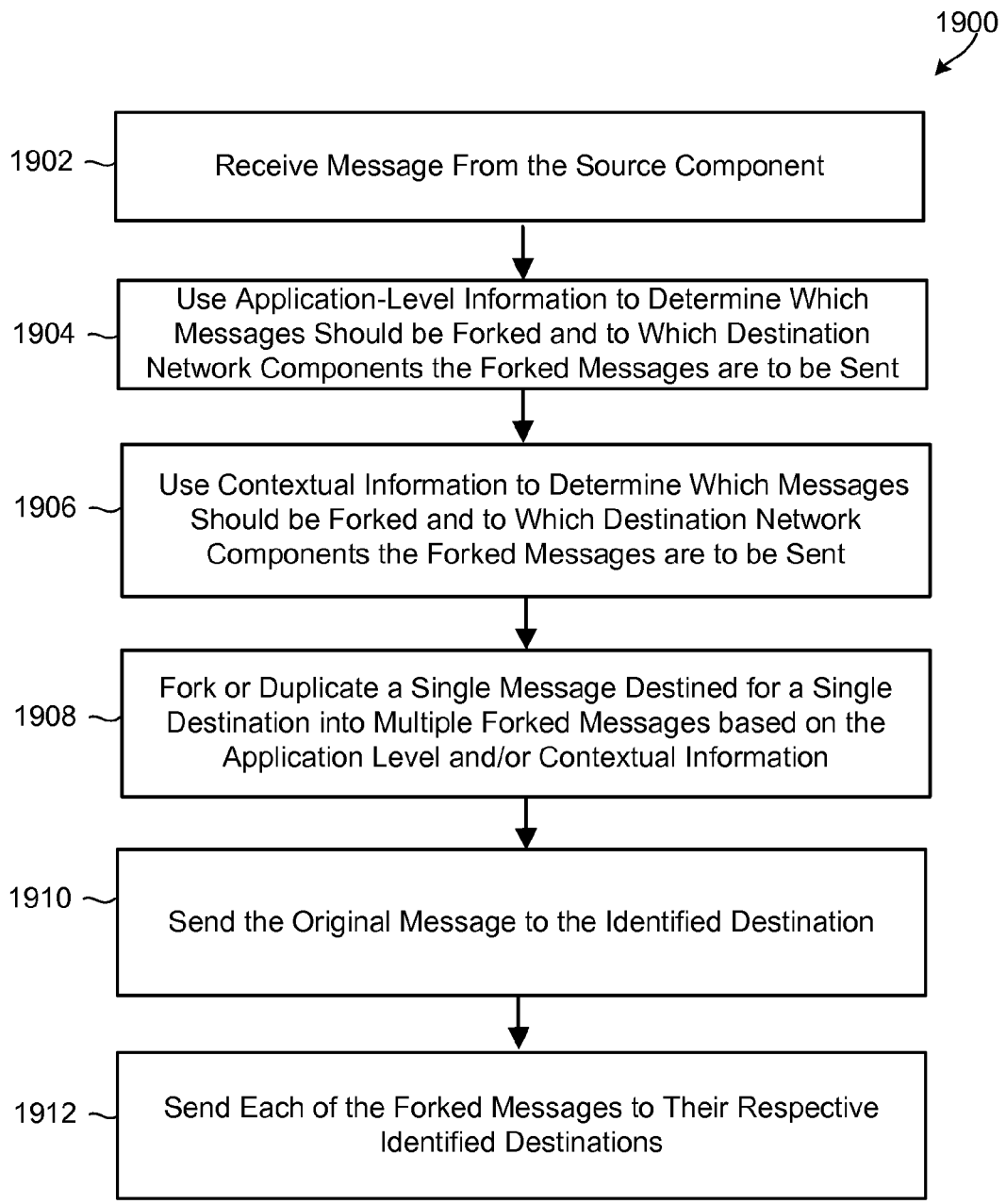
FIG. 19 is a process flow diagram illustrating an embodiment dynamic context router method for performing fork routing operations in accordance with various embodiments.

FIG. 19 illustrates a fork-routing method 1900 that may be performed by the dynamic context router in accordance with an embodiment. In step 1902, the dynamic context router may receive a first message from the source component. In step 1904, the dynamic context router may use application-level information obtained from the message to determine which messages should be forked, and to which destination network components each of the messages are to be sent. In step 1906, the dynamic context router may use contextual information to further determine which messages should be forked and to further identify destination network components to which the messages are to be sent. In step 1908, the dynamic context router may fork or duplicate a single message destined for a single destination into multiple forked messages based on the application level and/or contextual information. In step 1910, the dynamic context router may send the original message to the appropriate identified destination. In step 1912, the dynamic context router may send each of the forked messages to their respective identified destinations.

In an embodiment, the dynamic context router may support the communication of messages between network components implementing different flavors of the same application/protocol/message format by adding extra attribute-value pairs (AVPs) into received messages, dropping AVPs from received messages, or both. In an embodiment, the dynamic context router may maintain references to specific dictionary databases for applications supported by each of the network components with which the dynamic context router communicates. The dynamic context router may communicate with the referenced dictionaries to determine which AVPs are to be added into the message and/or which AVP are to be removed from the message. In this manner, the dynamic context router may support multiple flavors of the same application/protocol/message format even when the specific flavors cannot be ascertained from the type or contents of the message being communicated (e.g., the message being communicated is a Diameter message, which does not include such information).

In an embodiment, the dynamic context router may modify messages such that they can be received and processed by the receiving network component and/or without causing the receiving network component to send an error message. In an embodiment, the dynamic context router may convert the messages into the specific flavors required by network components with which it communicates.

Figure 20:
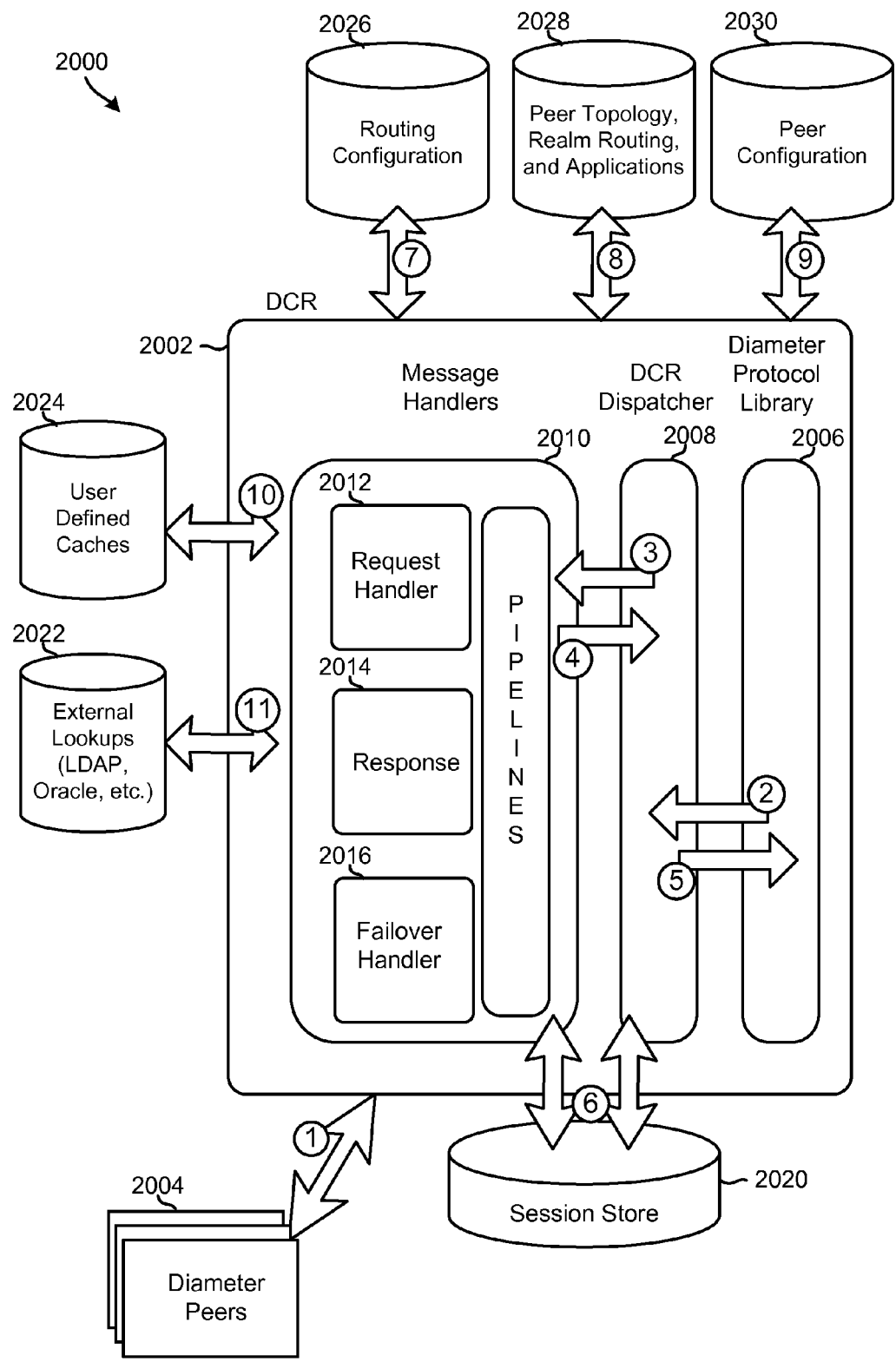
FIG. 20 is a component block diagram illustrating the logical components and interfaces of an example dynamic context router system in accordance with the various embodiments.

FIG. 20 illustrates logical components and interfaces in an example dynamic context router system (DCR system) 2000 configured to facilitate the communication of signaling messages between Diameter peers 2004. The DCR system 2000 may include a DCR core 2002 having a Diameter protocol library module 2006, a dynamic context router dispatcher module 2008 and a message handler module 2010. The message handler module 2010 may include a request handler module 2012, a response module 2014, and a failover handler module 2016, each of which may be a pipeline, which are discussed in more detail further below.

In the illustrated example of FIG. 20, the DCR core 2002 includes a number of interfaces 1-11 that facilitate communications between the modules (e.g., library module 2006, dispatcher module 2008, message handler module 2010, etc.) and with external resources, such as session stores 2020, external lookup databases 2022, user defined caches 2024, routing configuration data-stores 2026, databases storing peer topology, realm routing and application information 2028, and peer configuration data-stores 2030. For example, the DCR core 2002 may receive DCR Diameter configuration information over interface 8, initialize a Diameter protocol library by specifying application support over interface 5, and register any call-backs required for the Diameter protocol library to DCR notification interface (i.e., interface 2). Each of the interfaces 1-11 are discussed in more detail below.

The DCR core 2002 interacts with the Diameter Peers 2004 over interface 1, which may be used to perform base protocol interactions (e.g., performing capabilities exchanges, watchdog exchanges, etc.); maintain state information for each configured peer; send and receive Diameter application messages to and from each peer; maintain a transaction queue of unanswered messages sent to each peer; match responses received with entries in the transaction queues; handle redirect responses received from peers; maintain redirect caches; and perform other similar operations.

The Diameter protocol library module 2006 may communicate with the DCR dispatcher module 2008 and the message handler module 2010 over interface 2, which may be used to pass Diameter messages (requests or responses) to the DCR message handler module 2010 for processing; pass notifications of any peer transport failures to the DCR dispatcher module 2008; pass all outstanding messages for a failed peer to the DCR dispatcher module 2008 in Diameter failover situations (so that an alternative destination can be chosen); periodically pass information on the sizes of peer transaction queues to the DCR dispatcher module 2008 to enable it to make informed load balancing decisions; and perform other similar operations. In an embodiment, the DCR dispatcher module 2008 may receive notifications about the state of the Diameter peers 2004 from the Diameter protocol library module 2006 over interface 2, and manage such notifications accordingly. In an embodiment, the management of notifications may include storing state information in a local peer topology configuration data-store.

The DCR dispatcher module 2008 may send communications to message handling modules/pipelines (e.g., request handler pipeline 2012, etc.) over interface 3. For example, the DCR dispatcher module 2008 may dispatch messages (both requests and responses) received from the Diameter library module 2006 to the request handler pipeline module 2012 over interface 3.

The DCR dispatcher module 2008 may receive messages from the message handler module 2010 over interface 4 and perform operations that assist in the identification of a suitable Diameter peer destination for the received messages. These operations may include: converting non-specific domain destinations populated by routing logic into specific destination hosts using the DCR dispatcher's 2008 knowledge of the peer topology (which may be loaded from interface 8) and each peer's availability; and selecting a specific destination based on failover and load balancing configuration information embedded in the peer topology definition.

The DCR dispatcher module 2008 may communicate with the Diameter protocol library module 2006 over interface 5, which may be used to: forward a Diameter message to a nominated destination-host; generate a Diameter response to the originating diameter node (e.g., instead of forwarding to another Diameter node); generate a redirect response to the originating diameter node; and perform other similar operations. Interface 5 may also be used by the DCR core 2002 to initialize a Diameter protocol library (e.g., by specifying application support).

The Diameter protocol library 2006 may include system libraries (e.g., libdbprotocol.so, libdbparser.so, etc.) as well other information that may be used to implement base diameter protocol functionality. Information retrieved from the Diameter protocol library 2006 may also be used to: perform capabilities exchanges with each configured peer (which may be loaded via interface 9); maintain connectivity using device watchdogs; provide an application programming interface (API) that allows the DCR core 2002 to send and receive messages from other Diameter nodes; and provide a notification interface so that the DCR core 2002 can be made aware of important Diameter events.

The message handler modules 2010 and the DCR dispatcher module 2008 may communicate with a session store 2020 via interface 6. The DCR core 2002 may receive routing configuration information over interface 7.

The DCR core 2002 may receive DCR Diameter configuration information over interface 8. The DCR Diameter configuration information may include a DCR realm based routing table and a topology tree that organizes the Diameter peers 2004 into a topology that may be used to derive load balancing and failover rules.

In an embodiment, the routing configuration information and logic may be decoupled from other aspects related to Diameter connectivity. This allows the DCR core 2002 to support failover and load balancing operations across all of the configured peers, while at the same time, not cluttering the routing logic with all of the peer and connectivity knowledge.

In an embodiment, the DCR routing configuration information may only include information for choosing an appropriate destination domain. For example, the DCR may be configured such that a telecommunications operator with a requirement to route messages to one of two data centers according to some business rules can define domains representing the possible destinations.

The DCR core 2002 may receive peer configuration information over interface 9, which may be used to load configured peers. The DCR core 2002 may send data requests to user defined caches via interface 10, and to external lookup engines/databases via interface 11.

As mentioned above, the DCR system may arrange network elements into a logical tree topology. The base Diameter library (on top of which messages processed by the DCR system may be built) maintains the peer configuration as a simple unstructured list. In an embodiment, the DCR system may, through configuration, arrange the elements of the base Diameter library's peer configuration list into a logical tree topology reflecting: at the top level, the high level routing domains (e.g., destinations chosen by routing logic); within a domain, a prioritized list of peer groups for availability purposes; and within a peer group, an unordered list of peers for load balancing purposes. This topology arrangement enables the DCR dispatcher 2008 to be given a high level destination domain and to route messages to specific peers by applying failover and load balancing rules. This also enables components which load the topology configuration at run time to be informed of peer availability.

In an embodiment, the topology arrangement may include at least one domain in a DCR deployment, at least one peer-group per domain, and at least one peer per peer-group. Peer groups within a domain may be prioritized, such that routing within a domain may be directed to the highest priority peer group that is available. Peer groups may specify how many peer failures can be tolerated before the peer group is to be considered unavailable. Peer groups may also specify the load balancing algorithms (e.g., round robin, weighted round robin, least outstanding messages, etc.) that are to be used when routing messages to the peer group's constituent peers.

In an embodiment, the DCR system may be configured to filter messages based on user defined criteria. This filtering may be performed at the beginning, middle, or end of the request processing operations. In an embodiment, filtering may be performed after the request processing operations to maximize the data available for use by the filtering operations. In an embodiment, the outcome from the filter process may be a Boolean value, which may be made available to the DCR dispatcher 2008, which may generate either an error response (if the message is to be filtered) or route the message to the destination node (message is not filtered).

In an embodiment, the dynamic context router system may be configured to append information, such as domain failover information, to the messages in the transaction queue. This enables the dynamic context router to subsequently take actions using this additional information which would otherwise not be possible. The DCR system may also store a destination domain in the transaction queue. In an embodiment, if a failover is later initiated, the DCR system may choose an alternative destination host based on the originally chosen destination domain.

In an embodiment, the DCR system may be configured to process messages by decoding a received message into an internal representation of the message (e.g., a structured message format proprietary to the DCR system), and passing it to a routing logic module/pipeline responsible for performing the routing operations. In an embodiment, the internal representation may be an AVS.

In an embodiment, the DCR system may implement a fixed pipeline model (e.g., a model in which each module includes a number of optional steps for performing a specific set of tasks) to control the processing of the message. For example, Diameter request messages received by the DCR system may be processed by a request pipeline, which may make routing decisions and/or manipulate the message using a discrete number of configurable steps.

As discussed above with reference to FIG. 20, each of the message handling modules (e.g., request handler module 2012, response module 2014, failover handler module 2016, etc.) may be a pipeline, and the various DCR message handling operations may be managed by a separate pipeline depending on the type of message or type of operation (e.g., requests, responses, failovers, etc.). For example, messages originating from the Diameter protocol library module 2006 may be passed (e.g., via the DCR dispatcher module 2008, etc.) to the appropriate pipelines/modules within the message handling module 2010 responsible for processing the message. Each pipeline may be configured in accordance with user preferences, network requirements, deployment environment and/or user requirements. Each pipeline may also be configured on a "per message type" and/or "per application" bases.

In the various embodiments, each pipeline may be minimally configured or extensively configured. For example, a pipeline may be minimally configured to handle situations where the Diameter realm based routing table provides all of the information necessary to route a message, or extensively configured to handle situations requiring custom processing involving lookups and routing logic.

Each of the message handling pipelines/modules may include a number of sub-modules (steps) that provide a set of highly customizable functions. For example, each module/step may be configured to perform a specific set of operations such as: interacting with the default session store (e.g., when session state only needs to store a destination choice); interacting with a user defined session store (e.g., for more complex session store operations); augmenting the incoming message by performing external and internal lookups (e.g., via interfaces 10 and 11 of FIG. 20) using keys from the incoming message or from the results of other lookups; examining the contents of augmented message to choose one or more destination domains or to perform message destination hunting operations; preparing message to be routed by modifying, adding or removing AVPs from one or more messages; filtering messages via a user defined white-list or black-list (e.g., refusing to route the message), etc. Each sub-module (step) may have a specific set of permissions that limit the allowable operations available to that step, which may be based on a number of configurable factors (e.g., type of module requesting the operation, deployment environment, network conditions, etc.).

In an embodiment, each pipeline may be a fixed message handling pipeline that aids the management of routing decisions and/or message manipulation operations.

In an embodiment, each pipeline may be configured at an application command level granularity. For example, each pipeline may be configured for Gx-based credit control requests.

In an embodiment, the DCR system may be configured to detect the existence of an empty pipeline (e.g., a pipeline that is not configured, is configured to exclude all steps, etc.) and perform routing operations using the routing functionality of the base Diameter protocol.

In the various embodiments, the DCR system may include one or more of a request handling pipeline, a response handling pipeline, and a failover handling pipeline.

Figure 21:
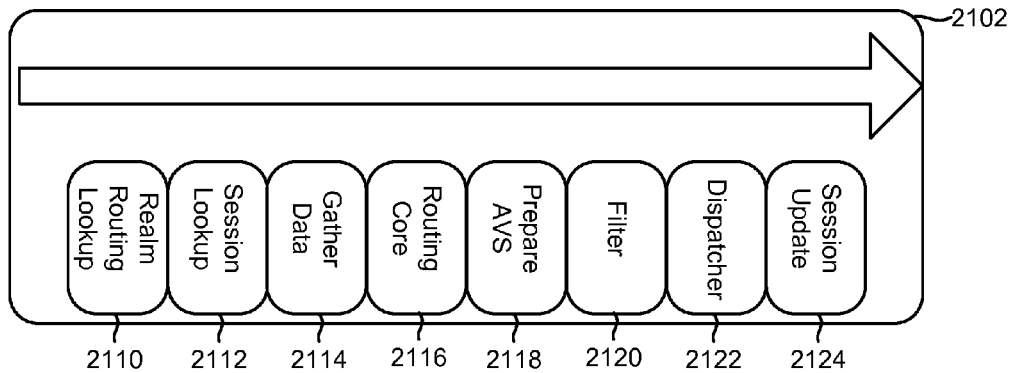
FIG. 21 is an illustration of an example request message processing pipeline in a dynamic context router system.

FIG. 21 illustrates a request pipeline 2102 for processing Diameter request messages. The request pipeline 2102 may be a part of the DCR core, which may utilize the request pipeline 2102 to make routing decisions (e.g., locating a destination node, determining that the message cannot be routed, etc.) and/or to manipulate messages. The routing logic used to process the messages may be specific to the received message or message type. In an embodiment, the routing logic may be dynamic and/or attached to each pipeline stage via a proprietary DCR scripting language.

In an embodiment, each incoming request message may be passed to the request pipeline 2102, which is then identified by application and command. An empty routing ticket may be constructed upon entry to the pipeline process, which is then populated with a decoded internal representation of the received request message.

The request pipeline 2102 may include a number of discrete steps, stages, or modules (herein steps which may be performed in sequence as a message passes through the pipeline 2102), with each step performing a distinct DCR operation. Each step of the pipeline may populate different portions of the routing ticket, which may include portions for: the decoded request message (AVS type structure); raw data (e.g., message data not decoded); a request action; lookup results; session state; destination domain(s); a filter decision; and redirect AVPs. In the example illustrated in FIG. 21, the request pipeline 2102 includes a realm routing lookup step 2110, a session lookup step 2112, a gather data step 2114, a routing core step 2116, a prepare AVS step 2118, a filter step 2120, a dispatcher step 2122, and a session update step 2124.

In the realm routing lookup step 2110, the request pipeline may perform a lookup on a configured realm based routing table. The realm based routing table may have the same or similar characteristics as a standard Diameter routing table (as described in Diameter standards RFC 3588), or may be a modified version of a standard Diameter routing table.

In an embodiment, the realm based routing table may include the following modifications over a standard Diameter routing table: a configuration column containing an "Override Destination" flag, which may express whether the destination read from a row in the table can be overridden; a configuration column containing an "Override Action" flag, which may express whether the action read from this row in the table can be overridden; a "Redirect host usage" column and a "Redirect max cache time" column, which may be used when the action is redirect and the redirect response message should populate correspondingly named AVPs; a server column renamed to domain, which may contain the name of a DCR configured domain rather than a specific host (as would be the case under Diameter standards RFC3588).

As mentioned above, the DCR system may be configured to perform decoding operations in multiple phases. In such configurations, the incoming request message may be partially decoded during the realm routing lookup step 2110 (e.g., only the header and base protocol routing AVPs may be extracted). The entire message may or may not be fully decoded (at a later stage) depending on an outcome of the lookup operations. For example, if there is no match resulting from the table look, or if the action is proxy and the destination domain is assigned, the message may be fully decoded. On the other hand, the message may be partially decoded if the action is relay or redirect, and the destination domain is assigned. The DCR system may also be configured to cause the message to be handled (e.g., routing the message, rejecting the message, etc.) at a later stage/step when there is no match on the table lookup by fully decoding the message but not setting a destination domain. In an embodiment, the outcome of the realm routing lookup step 2110 may be overridden depending on the value of the override flags in a matched table row.

The session lookup step 2112 may be performed as part of establishing session stickiness. In the session lookup step 2112, the DCR system may determine if the message belongs to a known and previously routed session. If so, the destination host and destination domain may be set in the routing ticket. In an embodiment, the session lookup step 2112 may be minimally configured for applications that do not need to maintain session state other than the routing destination. In an embodiment, the session lookup step 2112 may be more extensively configured (e.g., via a proprietary DCR language) to perform custom operations and/or to include a custom session store.

In the gather data step 2114, the DCR system may gather data upon which routing decisions may depend (e.g., via cache lookups, external lookups, reference data lookups, etc.), configure the execution of the required lookups, reference the predefined lookup definitions and/or provide keys from any data available in the routing ticket. In an embodiment, the DCR system may populate a lookup results section of the routing ticket with the results of lookups performed as part of the gather data step 2114.

In the routing core step 2116, the DCR system may make routing decisions based on any of the information available in the routing ticket. As part of the routing core step 2116, the DCR system may also populate the destination domain in the routing ticket (assuming it was not already set by previous stages or it is allowed to override a previously set value) and/or override request actions (e.g., proxy, relay, redirect, unset, etc.) populated in the realm table (e.g., via the realm table lookup step 2110 discussed above). In an embodiment, when the request action is "unset," as part of the routing core step 2116, the DCR system may choose a method of delivery (e.g., proxy, relay or redirect) in addition to making a routing decision. In an embodiment, routing decisions made in the routing core step 2116 may be configured via a proprietary DCR language to perform custom logic/operations.

In the prepare AVS step 2118, the DCR system may make modifications to the message before it is sent. These modifications may include the addition of new AVPs, the modification of existing AVPs or the removal of AVPs. In an embodiment, the prepare AVS step 2118 may be limited to modifying the message within the routing ticket. In an embodiment, details of how the messages are modified in the prepare AVS step 2118 may be configured via a proprietary DCR language.

In the filter step 2120, the DCR system may filter messages based on user defined criteria. In an embodiment, the user-defined criteria may be specified via a proprietary DCR language.

In the dispatcher step 2122, the DCR system may choose a specific host. If a destination host and a destination domain are not specified by earlier stages in the pipeline 2102 (i.e., no host, no domain), an error response message may be sent to the network node originating the message (e.g., the source node). If a destination host is provided but there is no destination domain (i.e., provided host, no domain), the message may be routed to the specified destination host, and an error response may be sent to the originator of the message if the host is unavailable. If a destination host and a destination domain are both provided (i.e., provided host, provided domain), the message may be routed to the provided destination host, and an alternative destination host may be attempted if the specified one is unavailable. If no destination host is provided (i.e., no host, provided domain), an appropriate destination host may be chosen from the specified destination domain (e.g., via performing failover and load balancing operations), and an error response may be sent to the originator of the message if there are no available hosts within the domain.

As discussed above, messages handling operations may be facilitated by passing a routing ticket along various stages of a message handling pipeline. The dispatcher step 2122 may receive the routing ticket populated with: an action (e.g., Proxy, Relay, Redirect, etc.); a non-specific list of destination domains or a specific destination-host (if the message arrived at the DCR with this already set); the message to be sent (which may be a modified message); redirect related AVPs (which may be specified if the action is redirect); and/or a decision (e.g., yes, no) from the filter stage of the request pipeline.

In an embodiment, in the dispatcher step 2122, the DCR system may examine the routing ticket and perform operations (e.g., make calls to the Diameter protocol library) based on the contents of the examined message.

In an embodiment, in the dispatcher step 2122, the DCR system may generate a response message to be sent back to the originating peer with the Result-Code AVP set to "DIAMETER_UNABLE_TO_COMPLY" if the message filtering flag is set.

In an embodiment, in the dispatcher step 2122, the DCR system may select a peer from the specified domain if the action is proxy or relay, the destination-host is not specified and the destination-domain is specified. The highest priority available peer group from the domain may be chosen and a peer from within the chosen peer group may be chosen by performing a load balancing algorithm. If there are no available peer groups, an error response may be generated with Result-Code set to "DIAMETER_UNABLE_TO DELIVER".

In an embodiment, in the dispatcher step 2122, the DCR system may route the message to a specified destination-host if the action is proxy or relay, the destination-host is specified and the Destination-Domain is not specified (e.g., when the destination-host is provided by the incoming message or else populated by session stickiness processing). A message may be sent to a peer regardless of the state of its containing peer group (e.g., when a parent peer group is unavailable but the required child peer is available). If the specified peer is unavailable then an error may be returned to the originator specifying a Result-Code set to "DIAMETER_UNABLE_ TO_DELIVER".

In an embodiment, in the dispatcher step 2122, the DCR system may send a message to a specified destination-host if the action is proxy or relay, the destination-host is specified, and the destination-realm is specified. If the destination-host it is not available, the dispatcher may choose an alternative destination-host from the nominated destination-realm.

In an embodiment, in the dispatcher step 2122, the DCR system may send a redirect response to the originating node specifying the accompanying redirect related AVPs, Redirect-Cache-Usage and Redirect-Max-Cache-Time if the if the action is Redirect.

In an embodiment, in the dispatcher step 2122, the DCR system may perform message manipulation operations (e.g., changing the end-to-end-id, Route-Record and Origin-Host AVPs) if the message is to be routed onward and the topology hiding option is configured for the message.

The dispatcher step 2122 may receive multiple possible destination domains as part of hunting operations. When the dispatcher is required to route a message and it detects that destination domain is actually a list of possible destinations, the dispatcher may strip the first destination from the list and use it as the destination domain. The rest of the list may be stored in the transaction queue of the Diameter protocol library module and used by the response handling pipeline to determine the next destination that is to be tried if a response message indicates a failure.

In an embodiment, if a destination host and a destination domain are not specified by earlier stages in the pipeline 2102 (i.e., no host, no domain), an error response message may be sent to the network node originating the message (e.g., the source node). If a destination host is provided but there is no destination domain (i.e., provided host, no domain), the message may be routed to the specified destination host, and an error response may be sent to the originator of the message if the host is unavailable. If a destination host and a destination domain are both provided (i.e., provided host, provided domain), the message may be routed to the provided destination host, and an alternative destination host may be attempted if the specified one is unavailable. If no destination host is provided (i.e., no host, provided domain), an appropriate destination host may be chosen from the specified destination domain (e.g., via performing failover and load balancing operations), and an error response may be sent to the originator of the message if there are no available hosts within the domain.

In the session update step 2124, the DCR system may update one or more session stores by inserting new session entries, updating existing sessions and/or deleting session entries.

Figure 22:
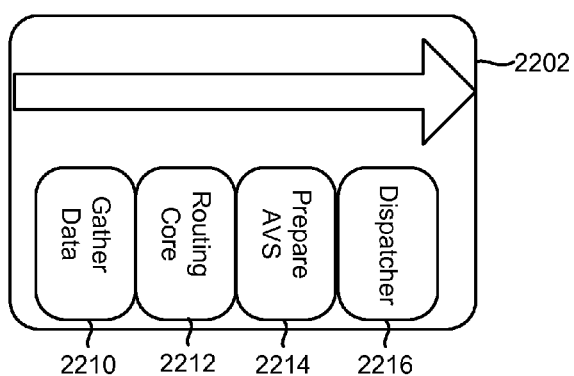
FIG. 22 is an illustration of an example response message processing pipeline in a dynamic context router system.

In an embodiment, the DCR system may be configured to process Diameter response messages via a response pipeline 2202, an example of which is illustrated in FIG. 22. The response pipeline 2202 may be a part of the DCR core. The response pipeline 2202 may include a number of discrete steps, stages, or modules (herein steps), each step performing a distinct DCR operation.

The DCR system may construct an empty routing ticket at an entry to the pipeline and populate the empty routing ticket with a decoded internal representation of the Diameter response message, as well as with data stored with the matching original request. Each step of the pipeline may populate different portions of the routing ticket, which may include portions for: the decoded response message (AVS type structure); raw data (e.g., message data not decoded); the originally decoded request message (AVS type structure); any data that was stored with the request in the transaction queue; destination domain list; lookup results; and a response action (e.g., Send, Send-Next, Respond, Redirect).

In an embodiment, the response pipeline 2202 may be a subset of the request pipeline and/or include steps that perform operations similar to those performed by the request pipeline steps. In the illustrated example of FIG. 22, the response pipeline 2202 includes a gather data step 2210, a routing core step 2212, a prepare AVS step 2214 and a dispatcher step 2216. In the gather data step 2210, the DCR system may gather data upon which routing decisions may depend (e.g., via cache lookups, external lookups, reference data lookups, etc.). The DCR system may also configure the execution of the required lookups, reference the predefined lookup definitions and provide keys from any data available in the routing ticket. In the routing core step 2212, the DCR system may make routing decisions based on any of the information available in the routing ticket. In the prepare AVS step 2214, the DCR system may make modifications to the message before it is sent (e.g., adding new AVPs, modifying existing AVPs or removing AVPs). In the dispatcher step 2216, the DCR system may choose a specific host.

Figure 23:
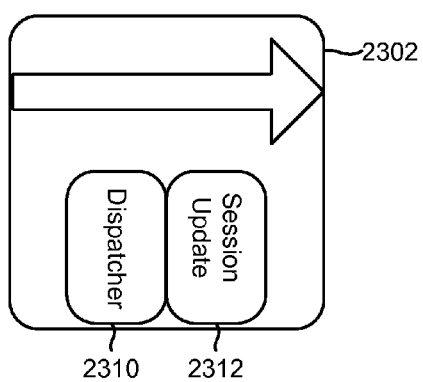
FIG. 23 is an illustration of an example failover message processing pipeline in a dynamic context router system.

In an embodiment, the DCR system may be configured to accommodate component, system node and partial network failures, as well as discrete message delivery failures, in failover operations using a failover pipeline 2302, an example of which is illustrated in FIG. 23. The failover pipeline 2302 may be a part of the DCR core. The failover pipeline 2302 may include a number of discrete steps, stages, or modules (herein steps), each step performing a distinct DCR operation. In the illustrated example of FIG. 23, the failover pipeline 2302 includes a dispatcher step 2310 and a session update step 2312.

For example, in an embodiment, the DCR system may detect a transport failure and initiate Diameter failover procedures by sending the outstanding messages destined for the failed peer to the DCR failover pipeline 2302 for reprocessing. The DCR failover pipeline 2302 may choose an alternative destination for the message (e.g., based on the original destination host and/or original destination domain) in the dispatcher step 2310, and update the session store with the updated destination in session update step 2312. If the DCR system determines that the message cannot be re-routed, the DCR system may generate a response message to be sent to the requesting node. If the DCR system determines that the message can be re-routed, the message is re-routed to the alternative destination determined in the dispatcher step 2310. In the session update step 2312, the session store may be updated with new destination information.

In an embodiment, the DCR system (e.g., in the DCR failover pipeline 2302) may be configured to determine when it is not possible to route to an alternative destination by determining if the message was originally sent to a fixed destination to which no alternative destination is acceptable (e.g., the message requires a specific destination node) and/or by determining if all acceptable alternative peers are unavailable.

Figure 24:
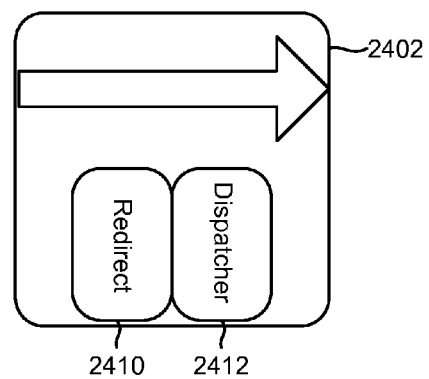
FIG. 24 is an illustration of an example message redirect processing pipeline in a dynamic context router system.

In an embodiment, the DCR system may perform application level operations in response to receiving a redirect message. As discussed above, the DCR system may receive redirect response messages from network peers, which may be processed without performing application-level operations in response to receiving the message. In an embodiment, the DCR system may be configured to perform application-level operations (e.g., update an application level cache in order to avoid unnecessary or incorrect routing of future messages) in response to receiving a redirect message. The DCR system may be configured to perform the application level redirect operations using a redirect pipeline 2402, an example of which is illustrated in FIG. 24. The redirect pipeline 2402 may be a part of the DCR core. The redirect pipeline 2402 may include a number of discrete steps, stages, or modules (herein steps), each step performing a distinct DCR operation. For example, the redirect pipeline may include a redirect step 2410 and a dispatcher step 2412.

In the various embodiments, the DCR system may create a cache with an identity, a configured key and an AVS for storage.

In the various embodiments, reference data may be configured by: defining a named reference data lookup by configuring the structure of the stored data; populating the reference data by importing a structured file, such as a file containing comma separated values; and/or allowing incremental updates to the reference data by importing file updates. Reference data may be non-volatile and persist across restarts.

As mentioned above, the DCR system may perform operations to establish session stickiness. For example, each time a session initialization message is routed though the DCR, the DCR system may make a determination as to whether session stickiness is required, and add session information to a session store if it is determined that session stickiness is required. Likewise, when the DCR system receives a session update message or a terminate message, the DCR system may update or remove entries from the session stores, respectively. In an embodiment, the various session sticky behaviors may be implemented in two separate parts of the DCR request processing pipeline. In an embodiment, the DCR system include a session store that uses known AVPs as keys and stores only routing information.

In an embodiment, the DCR system may perform topology hiding operations. Since Diameter is an end to end protocol, when Diameter client applications interact with server applications, the clients, through inspection of base routing AVPs, can learn about the multiplicity and addresses of server nodes, as well as the hops involved in reaching those servers. In some cases (e.g., where inter-PLMN routing of Diameter messages is performed) it is desirable to hide the server locations from client applications. In an embodiment, the DCR system may operate as a joint server and client Diameter node. In this manner, intermediate nodes cannot determine the true destination of a Diameter message because the information contained within the message will list the DCR system as the source/destination.

In an embodiment, the DCR system may perform topology hiding operations via AVP manipulation in order to make messages being routed by the DCR appear to originate from the DCR. In an embodiment, the manipulation of the AVPs for topology hiding may be performed within a dispatcher module or step (e.g., dispatcher step 2122) in a message processing pipeline. The dispatcher's topology configuration may include the ability to indicate if topology hiding should be applied on a per domain basis. For example, in a request processing pipeline (e.g., request pipeline 2102) the dispatcher (e.g., dispatcher step 2122) may receive a routing ticket with a destination domain(s) and a destination-host. If a selected destination domain requires topology hiding, then the dispatcher may modify the relevant AVPs such as the Origin-Host AVP and the Route-Record AVP to contain the DCR Diameter identity, and modify the End-to-End-Id AVP for the onward hop. In this case, the dispatcher (e.g., dispatcher step 2216) in the response processing pipeline (e.g., response pipeline 2202) may subsequently need to make equivalent topology hiding modifications. Topology hiding may also be applied in the same manner if it is required by the origin domain.

As discussed above, each of the request handling pipeline 2102, response handling pipeline 2202, failover handling pipeline 2302, and redirect pipeline 2402 may include a dispatcher step or module (herein dispatcher) responsible for mapping the destination domain decisions to specific destination hosts (with reference to the peer topology). In an embodiment, the dispatcher may map messages arriving from Diameter peers to the correct message handler, and handle notifications from the Diameter library about peer state changes and transaction queue sizes, such that the DCR system can make informed routing decisions.

In an embodiment, the DCR system may be configured to notify the dispatcher of peer state changes (e.g., via the Diameter library), which may be used by the dispatcher to make informed routing decisions by combining the peer topology and peer state.

In an embodiment, the dispatcher may translate a non-specific domain destination into a specific peer for routing by choosing the highest priority available peer group in the specified domain, and choosing a peer from the chosen peer group based on the configured load balancing algorithm.

Figure 25:
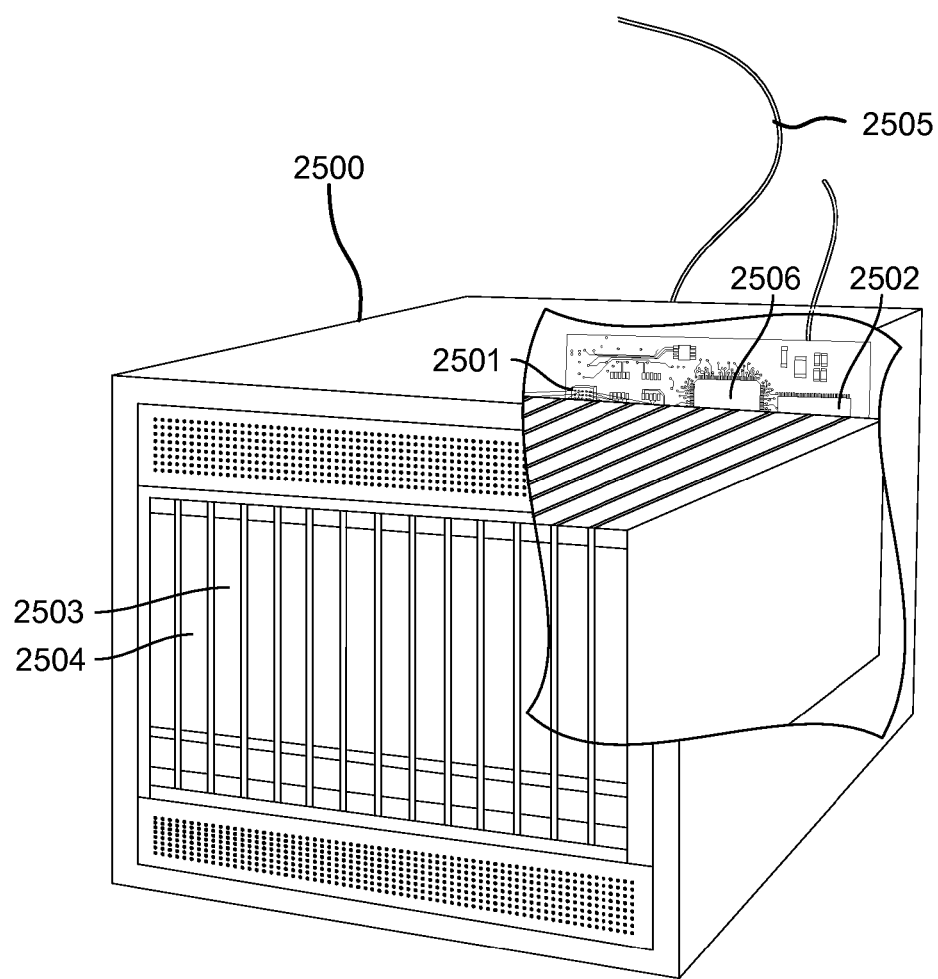
FIG. 25 is a component block diagram of a server suitable for use with an embodiment.

The various embodiments may be implemented on any of a variety of commercially available server devices, such as the server 2500 illustrated in FIG. 25. Such a server 2500 typically includes a processor 2501 coupled to volatile memory 2502 and a large capacity nonvolatile memory, such as a disk drive 2503. The server 2500 may also include a floppy disc drive, compact disc (CD) or DVD disc drive 2506 coupled to the processor 2501. The server 2500 may also include network access ports 2504 coupled to the processor 2501 for establishing data connections with a network 2505, such as a local area network coupled to other operator network computers and servers.

The processor 2501 may be any programmable microprocessor, microcomputer or multiple processor chip or chips that can be configured by software instructions (applications)

to perform a variety of functions, including the functions of the various embodiments described below. Multiple processors 2501 may be provided, such as one processor dedicated to wireless communication functions and one processor dedicated to running other applications. Typically, software applications may be stored in the internal memory 2502, 2503 before they are accessed and loaded into the processor 2501. The processor 2501 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such as, non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of communicating signaling information in a telecommunications signaling network, comprising:
   receiving in a processor of a server computing device from a source component a communication message that encodes signaling information;
   decoding the received communication message into an internal representation that stores the signaling information included in the received communication message in two or more structured information fields;
   performing application level routing operations that include using contextual information derived from the internal representation and information received from one of a business support system (BSS) and an operation support system (OSS) to identify a destination component;
   modifying the signaling information included in the internal representation based on the identified destination component;
   encoding the signaling information included in the internal representation into a modified communication message; and
   sending the modified communication message to the identified destination component.

2. The method of claim 1, wherein modifying the signaling information included in the internal representation based on the identified destination component comprises modifying the signaling information so that sending the modified communication message to the identified destination component comprises sending the identified destination component one of:
   a message that includes at least one field having a value that differs from a value of a corresponding field in the received communication message;
   a message that includes a superset of the signaling information included the received communication message; and
   a message that includes a subset of the signaling information included the received communication message.

3. The method of claim 1, wherein modifying the signaling information included in the internal representation based on the identified destination component comprises:

removing network specific information from the internal representation.

4. The method of claim 1, further comprising:
determining whether to add, remove or change an information field in the received communication message based on the identity of the destination component.

5. The method of claim 1, wherein:
receiving the communication message that encodes signaling information comprises receiving a first message that encodes the signaling information using a first protocol; and sending the modified communication message to the identified destination component comprises sending the modified communication message to the identified destination component using a second protocol that is different from the first protocol.

6. A server computing device in a telecommunications signaling network, comprising:
a processor configured with processor-executable instructions to perform operations comprising:
receiving a communication message that encodes signaling information from a source component;
decoding the received communication message into an internal representation that stores the signaling information included in the received communication message in two or more structured information fields;
performing application level routing operations that include using contextual information derived from the internal representation and information received from one of a business support system (BSS) and an operation support system (OSS) to identify a destination component;
modifying the signaling information included in the internal representation based on the identified destination component;
encoding the signaling information included in the internal representation into a modified communication message; and
sending the modified communication message to the identified destination component.

7. The server computing device of claim 6, wherein the processor is configured with processor-executable instructions to perform operations such that modifying the signaling information included in the internal representation based on the identified destination component comprises modifying the signaling information so that sending the modified communication message to the identified destination component comprises sending the identified destination component one of:
a message that includes at least one field having a value that differs from a value of a corresponding field in the received communication message;
a message that includes a superset of the signaling information included the received communication message; and
a message that includes a subset of the signaling information included the received communication message.

8. The server computing device of claim 6, wherein the processor is configured with processor-executable instructions to perform operations such that modifying the signaling information included in the internal representation based on the identified destination component comprises:
removing network specific information from the internal representation.

9. The server computing device of claim 6, wherein the processor is configured with processor-executable instructions to perform operations further comprising:
determining whether to add, remove or change an information field in the received communication message based on the identity of the destination component.

10. The server computing device of claim 6, wherein the processor is configured with processor-executable instructions to perform operations such that:
receiving the communication message that encodes signaling information comprises receiving a first message that encodes the signaling information using a first protocol; and sending the communication message to the identified destination component comprises sending the modified communication message to the identified destination component using a second protocol that is different from the first protocol.

11. A non-transitory computer readable storage medium having stored thereon processor-executable software instructions configured to cause a processor to perform operations for communicating signaling information in a telecommunications signaling network, the operations comprising:
receiving a communication message that encodes signaling information from a source component;
decoding the received communication message into an internal representation that stores the signaling information included in the received communication message in two or more structured information fields;
performing application level routing operations that include using contextual information derived from the internal representation and information received from one of a business support system (BSS) and an operation support system (OSS) to identify a destination component;
modifying the signaling information included in the internal representation based on the identified destination component;
encoding the signaling information included in the internal representation into a modified communication message; and
sending the modified communication message to the identified destination component.

12. The non-transitory computer readable storage medium of claim 11, wherein the stored processor-executable software instructions are configured to cause a processor to perform operations such that modifying the signaling information included in the internal representation based on the identified destination component comprises modifying the signaling information so that sending the modified communication message to the identified destination component comprises sending the identified destination component one of:
a message that includes at least one field having a value that differs from a value of a corresponding field in the received communication message;
a message that includes a superset of the signaling information included the received communication message; and
a message that includes a subset of the signaling information included the received communication message.

13. The non-transitory computer readable storage medium of claim 11, wherein the stored processor-executable software instructions are configured to cause a processor to perform operations such that modifying the signaling information included in the internal representation based on the identified destination component comprises removing network specific information from the internal representation.

14. The non-transitory computer readable storage medium of claim 11, wherein the stored processor-executable software instructions are configured to cause a processor to perform operations further comprising:
   determining whether to add, remove or change an information field in the received communication message based on the identity of the destination component.

15. The non-transitory computer readable storage medium of claim 11, wherein:
   the stored processor-executable software instructions are configured to cause a processor to perform operations such that receiving the communication message that encodes signaling information comprises receiving a first message that encodes the signaling information using a first protocol; and
   the stored processor-executable software instructions are configured to cause a processor to perform operations such that sending the modified communication message to the identified destination component comprises sending the modified communication message to the identified destination component using a second protocol that is different from the first protocol.

* * * * *